US012048951B2

(12) United States Patent
Fischer et al.

(10) Patent No.: US 12,048,951 B2
(45) Date of Patent: Jul. 30, 2024

(54) AUTOMATED SYSTEMS FOR USE IN SORTING SMALL OBJECTS, AND RELATED METHODS

(71) Applicant: Monsanto Technology LLC, St. Louis, MO (US)

(72) Inventors: William M. Fischer, St. Peters, MO (US); John M. Jensen, St. Charles, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 0 days.

(21) Appl. No.: 17/359,091

(22) Filed: Jun. 25, 2021

(65) Prior Publication Data

US 2021/0402441 A1 Dec. 30, 2021

Related U.S. Application Data

(60) Provisional application No. 63/046,432, filed on Jun. 30, 2020.

(51) Int. Cl.
*B07C 5/36* (2006.01)
*B07C 5/02* (2006.01)
*B07C 5/34* (2006.01)

(52) U.S. Cl.
CPC ................ *B07C 5/362* (2013.01); *B07C 5/02* (2013.01); *B07C 5/34* (2013.01); *B07C 2501/0063* (2013.01); *B07C 2501/0081* (2013.01)

(58) Field of Classification Search
CPC ............ B07C 5/34; B07C 5/361; B07C 5/362
(Continued)

(56) References Cited

U.S. PATENT DOCUMENTS 2,756,903 A 7/1956 Kreidler
3,530,372 A 9/1970 Laukien
(Continued)

FOREIGN PATENT DOCUMENTS

CN 2724862 Y 9/2005
DE 19845883 A1 5/1999
(Continued)

OTHER PUBLICATIONS

Archibald et al., "Development of Short-Wavelength Near-Infrared Spectral Imaging for Grain Color Classification," SPIE vol. 3543, 1998, pp. 189-198.
(Continued)

*Primary Examiner* — Michael McCullough
*Assistant Examiner* — Molly K Devine
(74) *Attorney, Agent, or Firm* — Harness, Dickey & Pierce, P.L.C.

(57) ABSTRACT

An automating seed sorting system is provided comprising a tray subsystem, a de-lidding subsystem, an extraction subsystem, and a collection subsystem. The tray subsystem is configured to remove at least one tray from a cart and, subsequently, return the at least one tray to the cart. The de-lidding subsystem is structured and operable to remove a lid from the at least one tray. The extraction subsystem is configured to extract one or more seeds from the at least one tray and release the one or more seeds into a funnel assembly. And, the collection subsystem includes the funnel assembly, wherein the collection subsystem is structured and operable to align at least one receptacle with the funnel assembly and direct the one or more seeds into the at least one receptacle via the funnel assembly.

23 Claims, 16 Drawing Sheets

(58) Field of Classification Search
USPC .......................................................... 209/509
See application file for complete search history.

(56) References Cited

U.S. PATENT DOCUMENTS

| | | | |
|---|---|---|---|
| 3,567,075 | A | 3/1971 | Neri |
| 3,597,181 | A | 8/1971 | Prendergast |
| 3,642,128 | A | 2/1972 | Westwood et al. |
| 3,743,123 | A | 7/1973 | Kinsbury |
| 3,798,337 | A | 3/1974 | Abato |
| 3,861,788 | A | 1/1975 | Webster |
| 4,037,970 | A | 7/1977 | Webster et al. |
| 4,040,747 | A | 8/1977 | Webster |
| 4,260,262 | A | 4/1981 | Webster |
| 4,278,183 | A | 7/1981 | Billington |
| 4,375,854 | A | 3/1983 | Hedel |
| 4,480,765 | A | 11/1984 | Tonus |
| 4,573,606 | A | 3/1986 | Lewis et al. |
| 4,654,592 | A | 3/1987 | Zens |
| 4,734,584 | A | 3/1988 | Rosenthal |
| 4,737,181 | A | 4/1988 | Lopez-Zermeno et al. |
| 4,752,689 | A | 6/1988 | Satake |
| 4,874,281 | A | 10/1989 | Bergerioux et al. |
| 4,931,061 | A | 6/1990 | Young |
| 5,036,569 | A | 8/1991 | Linnecke |
| 5,051,699 | A | 9/1991 | Hanawa et al. |
| 5,067,631 | A | 11/1991 | Baba |
| 5,132,538 | A | 7/1992 | Norris |
| 5,193,685 | A | 3/1993 | Trevithick |
| 5,221,518 | A | 6/1993 | Mills |
| 5,253,302 | A | 10/1993 | Massen |
| 5,308,981 | A | 5/1994 | Perten |
| 5,321,212 | A | 6/1994 | Wadell |
| 5,475,221 | A | 12/1995 | Wang |
| 5,533,145 | A | 7/1996 | Shofner et al. |
| 5,584,395 | A | 12/1996 | Homma |
| 5,668,374 | A | 9/1997 | DiFoggio et al. |
| 5,751,421 | A | 5/1998 | Wright et al. |
| 5,764,819 | A | 6/1998 | Orr et al. |
| 5,833,947 | A | 11/1998 | Rocklage et al. |
| 5,837,458 | A | 11/1998 | Minshull et al. |
| 5,864,984 | A | 2/1999 | McNertney |
| 5,904,501 | A | 5/1999 | Ohara et al. |
| 5,918,977 | A | 7/1999 | Borggaard et al. |
| 5,971,162 | A | 10/1999 | Allagnat et al. |
| 5,991,025 | A | 11/1999 | Wright et al. |
| 6,032,571 | A | 3/2000 | Brous et al. |
| 6,098,838 | A | 8/2000 | Saho et al. |
| 6,100,526 | A | 8/2000 | Mayes |
| 6,150,158 | A | 11/2000 | Bhide et al. |
| 6,237,286 | B1 | 5/2001 | Williames |
| 6,266,864 | B1 | 7/2001 | Barber |
| 6,377,648 | B1 | 4/2002 | Culbert |
| 6,397,678 | B1 | 6/2002 | Popper |
| 6,537,826 | B1 | 3/2003 | Horigane |
| 6,640,428 | B2 | 11/2003 | Barber |
| 6,646,264 | B1 | 11/2003 | Modiano et al. |
| 6,688,037 | B2 | 2/2004 | Keller et al. |
| 6,705,827 | B2 | 3/2004 | Keller et al. |
| 6,706,989 | B2 | 3/2004 | Hunter et al. |
| 6,809,819 | B1 | 10/2004 | Vinjamoori et al. |
| 7,044,306 | B2 | 5/2006 | Deppermann |
| 7,258,237 | B2 | 8/2007 | Nielsen |
| 7,367,155 | B2 | 5/2008 | Kotyk et al. |
| 7,591,101 | B2 | 9/2009 | Deppermann |
| 7,915,006 | B2 | 3/2011 | Cope et al. |
| 8,189,901 | B2 | 5/2012 | Modiano et al. |
| 8,245,439 | B2 | 8/2012 | Deppermann et al. |
| 9,387,518 | B2 | 7/2016 | Deppermann |
| 9,435,818 | B2 | 9/2016 | McKeen et al. |
| 10,132,725 | B2 | 11/2018 | Deppermann |
| 11,084,064 | B2 | 8/2021 | Deppermann |
| 2001/0014750 | A1 | 8/2001 | Ulrich et al. |
| 2002/0144458 | A1 | 10/2002 | Hunter et al. |
| 2004/0072143 | A1 | 4/2004 | Timmis et al. |
| 2004/0221335 | A1 | 11/2004 | Shewmaker et al. |
| 2005/0082207 | A1 | 4/2005 | Deppermann |
| 2005/0137744 | A1 | 6/2005 | Winkelmolen et al. |
| 2006/0042528 | A1 | 3/2006 | Deppermann |
| 2006/0046264 | A1 | 3/2006 | Deppermann et al. |
| 2006/0201856 | A1 | 9/2006 | Deppermann |
| 2007/0207485 | A1 | 9/2007 | Deppermann et al. |
| 2008/0014073 | A1 | 1/2008 | Moore et al. |
| 2016/0339481 | A1 | 11/2016 | Deppermann et al. |

FOREIGN PATENT DOCUMENTS

| | | | |
|---|---|---|---|
| DE | 102004063769 | A1 | 7/2006 |
| EP | 0511184 | A1 | 10/1992 |
| EP | 0636310 | A1 | 2/1995 |
| EP | 0730164 | A1 | 9/1996 |
| EP | 0750188 | A1 | 12/1996 |
| EP | 1566434 | A2 | 8/2005 |
| GB | 1174480 | A | 12/1969 |
| GB | 1355612 | A | 6/1974 |
| JP | 401156233 | A | 6/1989 |
| JP | 406284806 | A | 10/1994 |
| JP | 10319106 | | 12/1998 |
| WO | WO-9420230 | A1 | 9/1994 |
| WO | WO-9624830 | A1 | 8/1996 |
| WO | WO-9700887 | A1 | 1/1997 |
| WO | WO-9844140 | A1 | 10/1998 |
| WO | WO-9940419 | A1 | 8/1999 |
| WO | WO-9941383 | A1 | 8/1999 |
| WO | WO-9958959 | A1 | 11/1999 |
| WO | WO-0052990 | A1 | 9/2000 |
| WO | WO-0071993 | A1 | 11/2000 |
| WO | WO-0122043 | A2 | 3/2001 |
| WO | WO-0144828 | A1 | 6/2001 |
| WO | WO-0186703 | A2 | 11/2001 |
| WO | WO-0189288 | A1 | 11/2001 |
| WO | WO-0216090 | A2 | 2/2002 |
| WO | WO-0259586 | A2 | 8/2002 |
| WO | WO-0654154 | A1 | 5/2006 |
| WO | WO-0802985 | A2 | 1/2008 |
| WO | WO-2020098960 | A1 | 5/2020 |

OTHER PUBLICATIONS

Bauman, et al., Inheritance of Variation of Oil Content of Individual Corn Kernels, Crop Science, vol. 5, pp. 137-138, 1965.
Daun et al., "Comparison of Three Whole Seed Near-Infrared Analyzers for Measuring Quality Components of Canola Seed," vol. 71, No. 10, 1994, pp. 1063-1068.
Delwiche, "Single Wheat Kernel Analysis by Near-Infrared Transmittance: Protein Content," Analytical Techniques and Instrumentation, vol. 72, No. 1, 1995, pp. 11-16.
Dowell et al., "Automated Single Wheat Kernel Quality Measurement Using Near-Infrared Reflectance," ASAE Annual International Meeting, 1997, paper No. 973022.
Dowell, "Automated Color Classification of Single Wheat Kernels Using Visible and Near-Infrared Reflectance," Cereal Chemistry, vol. 75(1), 1998, pp. 142-144.
Dowell, Floyd E., "An Intelligent Automated System for Determining Peanut Quality," IEEE International Workshop on Intelligent Robot Systems, Jul. 1990.
Dr. Jolanta Soos, "Industrial Process Monitoring Requires Rugged AOTF Tools," Laser Focus World, Aug. 1994.
Gambhir, et al., Simultaneous Determination of Moisture and Oil Content in Oilseeds by Pulsed Muclear Magnetic Resonance, JOACS, vol. 62, No. 1, Jan. 1985.
Guy Rubel, "Simultaneous Determination of Oil and Water Contents in Different Oil Seeds by Pulsed Nuclear Magnetic Resonance," XP 001080188, JAACS, vol. 71, No. 10, Oct. 1994.
J.M. Halloin et al., "Proton Magnetic Resonance Imaging of Llpd in Pecan Embryos", XP 001080187, Journal of the American Oil Chemists' Society, vol. 70, No. 12, Dec. 1993.
J.R. Heil, et al., "Magnetic Resonance Imaging and Modeling of WaterUp-take into Dry Beans", XP 002202044, Dept. of Food Science and Technology, University of California, Davis, CA, Jan. 23, 1992.

(56) References Cited

OTHER PUBLICATIONS

K. Saito, et al., "Application of Magnetic Resonance Imaging to Non-Destructive Boid Detection in Watermelon," XP 000656797, Cryogenics, vol. 36, No. 12, 1996.
M.R. Lakshiminarayana et al., "Spatial distribution of oil in groundnut and sunflower seeds by nuclear magnetic resonance imaging," XP 002201726, J. Biosci., vol. 17, No. 1, Mar. 1992, pp. 87-93.
MacNamara, et al., "Multiplex Sample NMR: an Approach to High-Throughput NMR Using a Parallel Coil Probe," Analytica Chimica Acta; vol. 397, No. 1/03; Elsevier Science B.V.; Oct. 1999, pp. 9-16.
Massie and Norris, "Spectral Reflectance and Transmittance Properties of Grain in the Visible and Near Infrared", Transactions of the ASAE, Winter Meeting of the American Society of Agricultural Engineers, 1965, pp. 598-600.
McEntyre, et al., Comparison of Water Absorption Patterns in Two Barley Cultivars, Using Magnetic Resonance Imaging, AACCI, Cereal Chemistry, vol. 76, No. 6, pp. 792-795, 1998.
McGinty, et al., "A System for Automatic Weight Determination of Individual Grain Kernels: Principles and Evaluation", Cereal Science Today, vol. 19, No. 5, May 1974.
Orman and Schumann, "Comparison of Near-Infrared Spectroscopy Calibration Methods for the Prediction of Protein, Oil, and Starch in Maize Grain," J. Agric. Food Chem. vol. 39, 1991, pp. 883-886.
P.A. Hailey—Pfizer Central Research, "The Role of NIR Spectroscopy in the Measurement of Pharmaceutical Manufacture," <http://www.brimrose.com/hailey.html>; date unknown.
Paige, et al., "Apparatus for Automatic Measurement of Kernel Weight, Length, and Thickness," Crop Science, vol. 31, pp. 1314-1318, 1991.
Robutti, "Maize Kernel Hardness Estimation in Breeding by Near-Infrared Transmission Analysis," Analytical Techniques and Instrumentation vol. 72, No. 6, 1995, pp. 632-636.
Sander et al., "System for Automatic Weight Determination of Individual Gran Kernels", Transactions of the American Society Agricultural Engineers, vol. 16, No. 6, pp. 1146-1147, Nov./Dec. 1973.
Siebenmorgen, et al., A Data Acquisition/Control System for Individual Kernel and Thin-Layer Grain Drying Research, The American Society of Agricultural Engineers, No. 91-3042, Jun. 1991.
Song et al., Non-invasive Measurement of Moisture Distribution in Individual Wheat Kernels by Magnetic Resonance Imaging, SPIE vol. 2345, Nov. 2-4, 1994.
Yoshida et al., "An Automatic Sequential Single-Seed Weighing System: Variation in Soybean Seed Weight," Journal of the Faculty of Agriculture, Hokkaido University, vol. 61 Pt. 2, 1983.
Seed Meister Luminar 3076, Brimrose Corporation of America, Baltimore, MD, http://www.brimrose.com/seed_meister.html, dated Mar. 27, 2007.

AUTOMATED SYSTEMS FOR USE IN SORTING SMALL OBJECTS, AND RELATED METHODS

CROSS-REFERENCE TO RELATED APPLICATION

This application claims the benefit of, and priority to, U.S. Provisional Application No. 63/046,432 filed on Jun. 30, 2020. The entire disclosure of the above-referenced application is incorporated herein by reference.

FIELD

The present disclosure generally relates to automated systems for sorting small objects such as, for example, seeds, etc., and related methods.

BACKGROUND

This section provides background information related to the present disclosure which is not necessarily prior art.

Sorting small agricultural, manufactured and/or produced objects such as seeds, pharmaceutical tablets or capsules, small electrical components, ball bearing, small food products, etc., can be cumbersome and wrought with human error. For example, in seed breeding, large numbers of seeds are sampled and analyzed to determine whether the seeds possess a particular genotype or trait of interest. This may include imaging the seeds to obtain samples for analysis. Or, this may include removing tissue from the seeds for analysis. In the latter, portions of each seed may be removed, while leaving the remaining seed viable for planting. The removed portions, or chips, and the corresponding seeds are then cataloged to track the seeds and the respective corresponding chips. In both cases, the resulting chip is then analyzed to identify various attributes of the respective chip and seed, such as DNA characteristics and/or traits. Thereafter, the seeds are individually sorted according to attributes of each respective seed.

SUMMARY

This section provides a general summary of the disclosure, and is not a comprehensive disclosure of its full scope or all of its features.

Example embodiments of the present disclosure generally relate to automated systems for sorting seeds and other small objects. In one example embodiment, a sorting system generally includes a tray subsystem, a de-lidding subsystem, an extraction subsystem, and a collection subsystem. The tray subsystem is configured to remove at least one tray from a cart and return the at least one tray to the cart. The de-lidding subsystem is configured to remove a lid from the at least one tray, for example, as the at least one tray is removed from the cart. The de-lidding subsystem is also configured to store the lid (e.g., on the cart, near the cart, etc.) and, as desired, replace the lid on the at least one tray (e.g., when there are still seeds to be retrieved from the at least one tray but there is not space in a receptacle for the seeds to be sorted into, etc.) before (or otherwise) the tray subsystem returns the at least one tray to the cart. The extraction subsystem is configured to then extract one or more seeds from the at least one tray and release the one or more seeds into a funnel assembly of the collection subsystem. And, the collection subsystem is configured to align at least one receptacle with the funnel assembly and direct the one or more seeds into the at least one receptacle via the funnel assembly.

Example embodiments of the present disclosure also generally relate to automated methods for sorting seeds. One example method includes removing at least one tray of seeds from a cart including multiple trays, at the seed sorting system; removing a lid from the at least one tray, after the at least one tray is removed from the cart; extracting one or more seeds from the at least one tray and transporting the one or more seeds to at least one funnel assembly; aligning at least one receptacle with the at least one funnel assembly; and receiving the one or more seeds into the at least one funnel assembly and directing the one or more seeds, by the at least one funnel assembly, to the at least one receptacle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
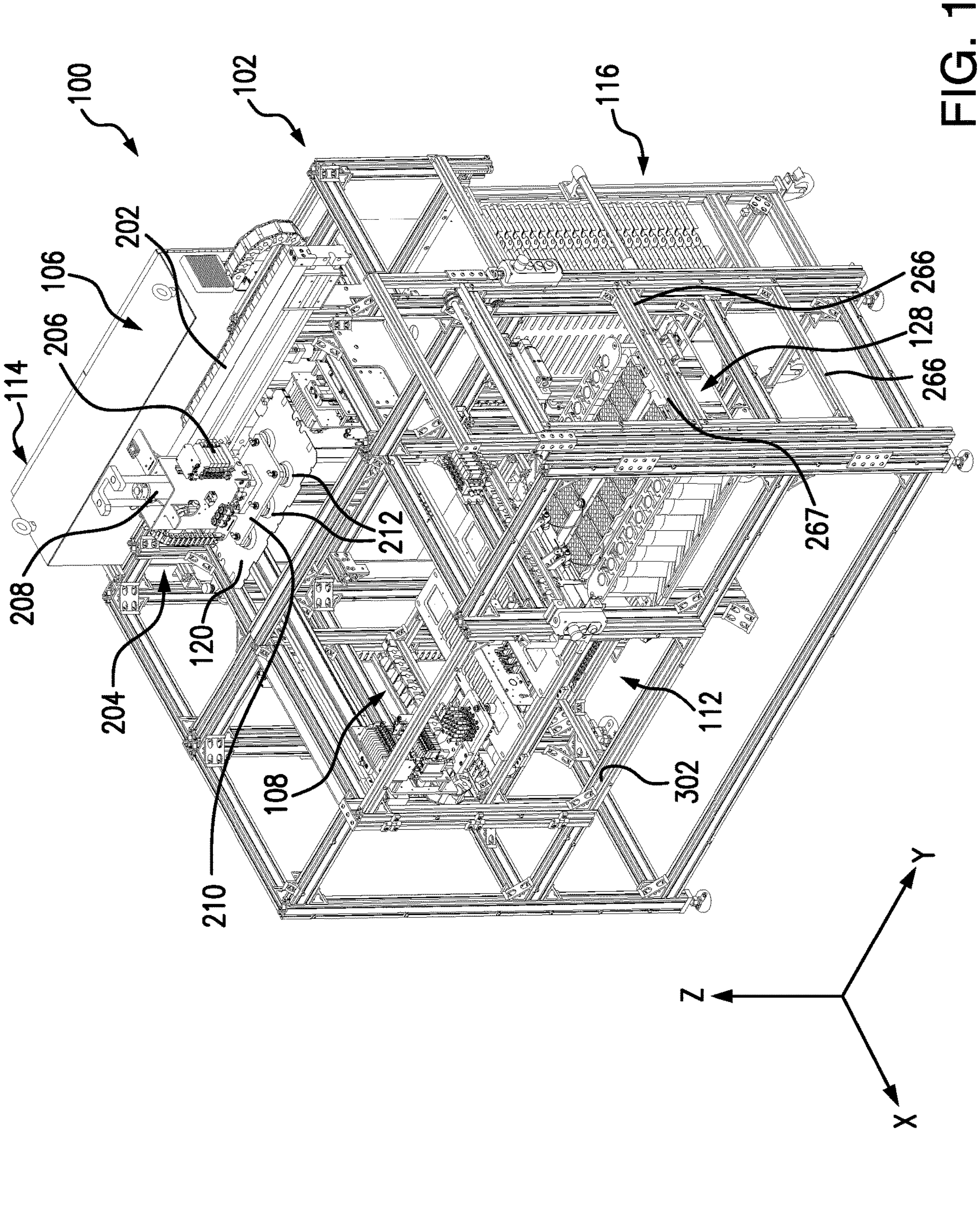
FIGS. 1-3 are perspective views of a sorting system including one or more aspects of the present disclosure and configured to automatically sort small objects such as seeds and deposit the sorted objects into selected receptacles.
Figure 2:
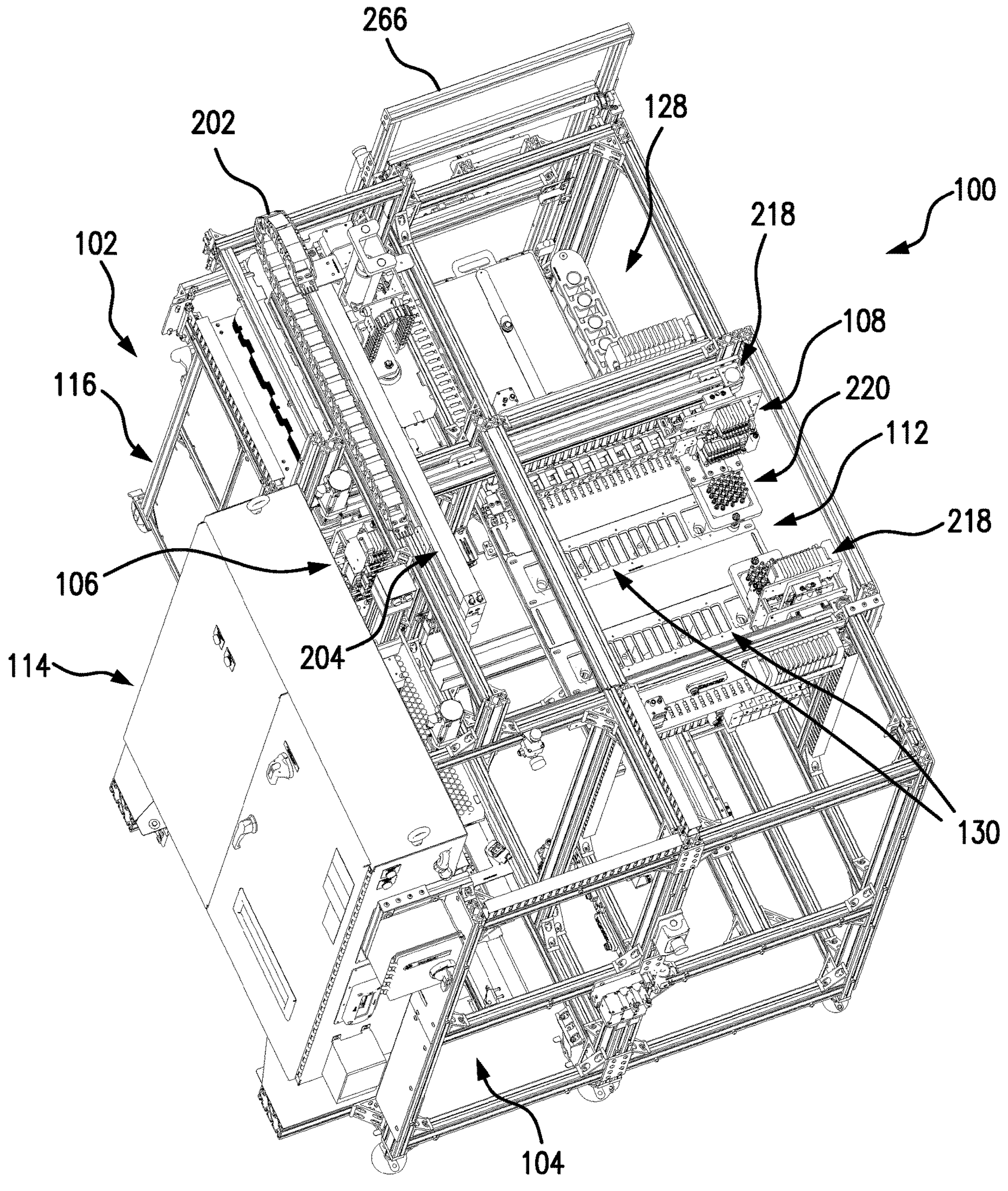
Figure 3:
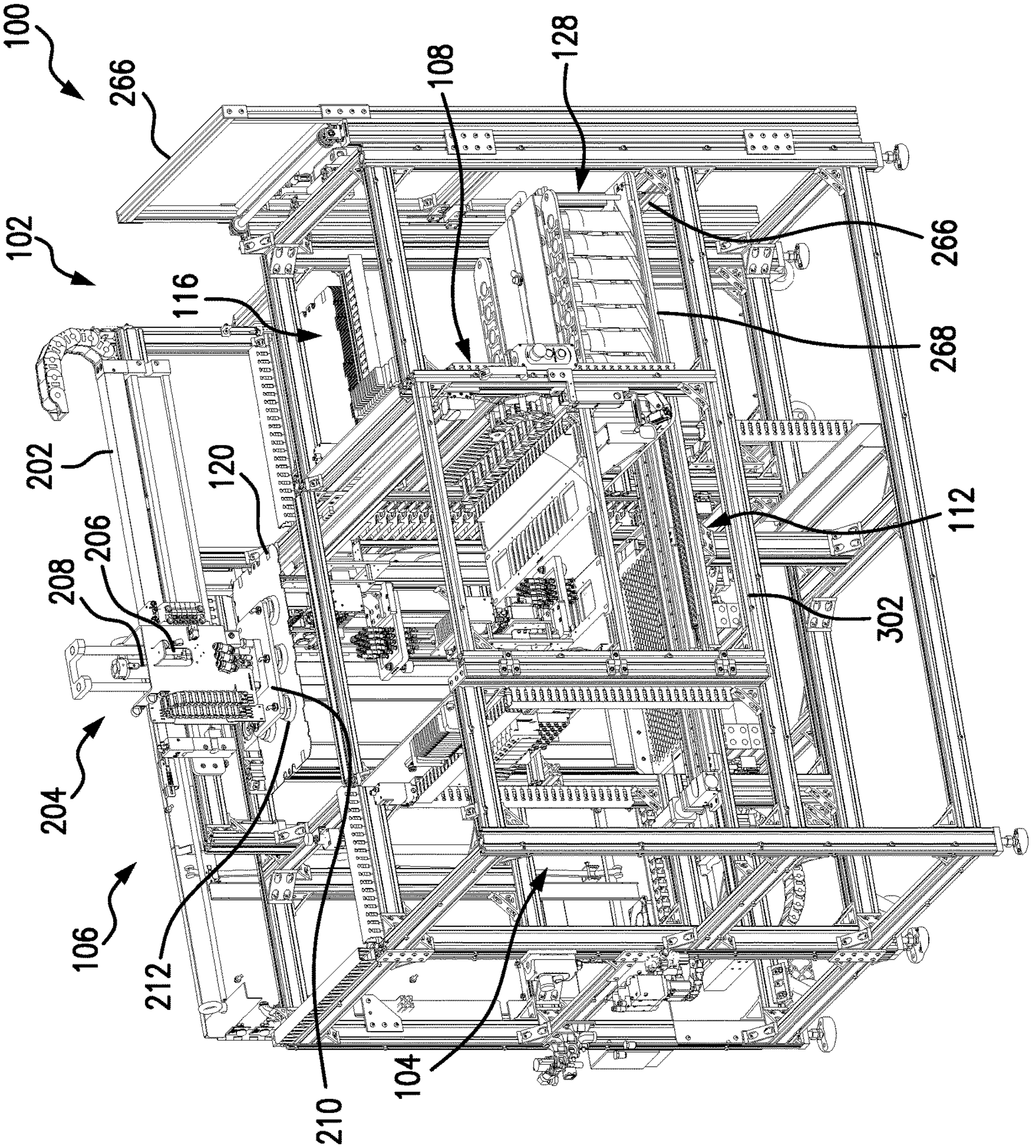
Figure 6:
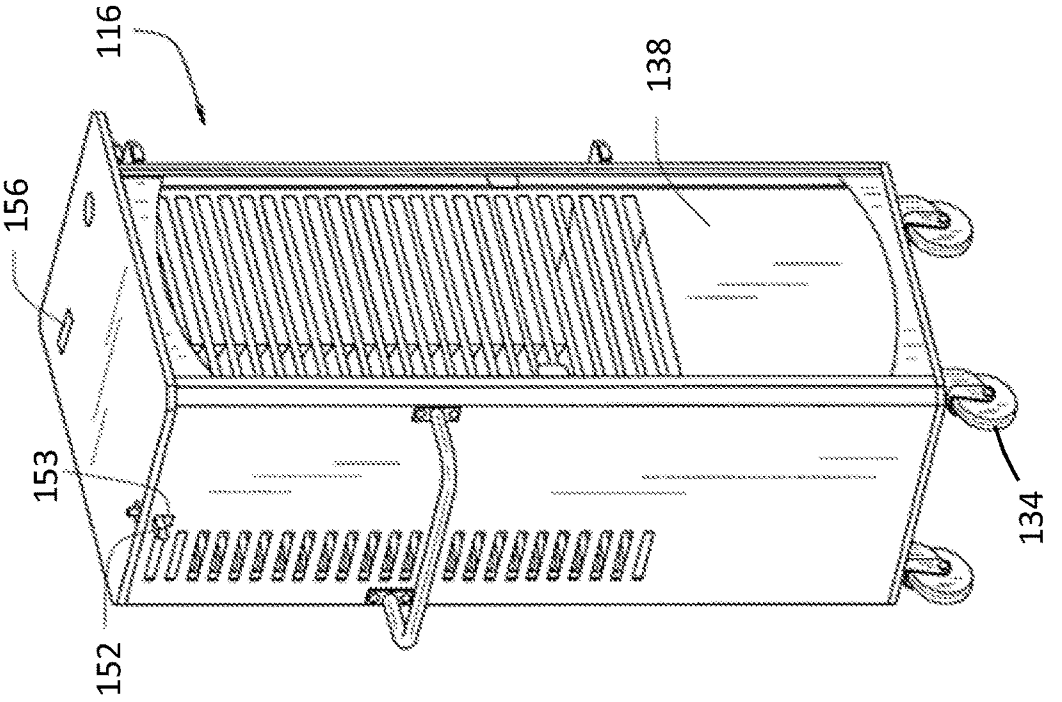
FIGS. 5 and 6 are perspective views of a cart configured for use with the docking station of the sorting system of FIG. 1.
Figure 5:
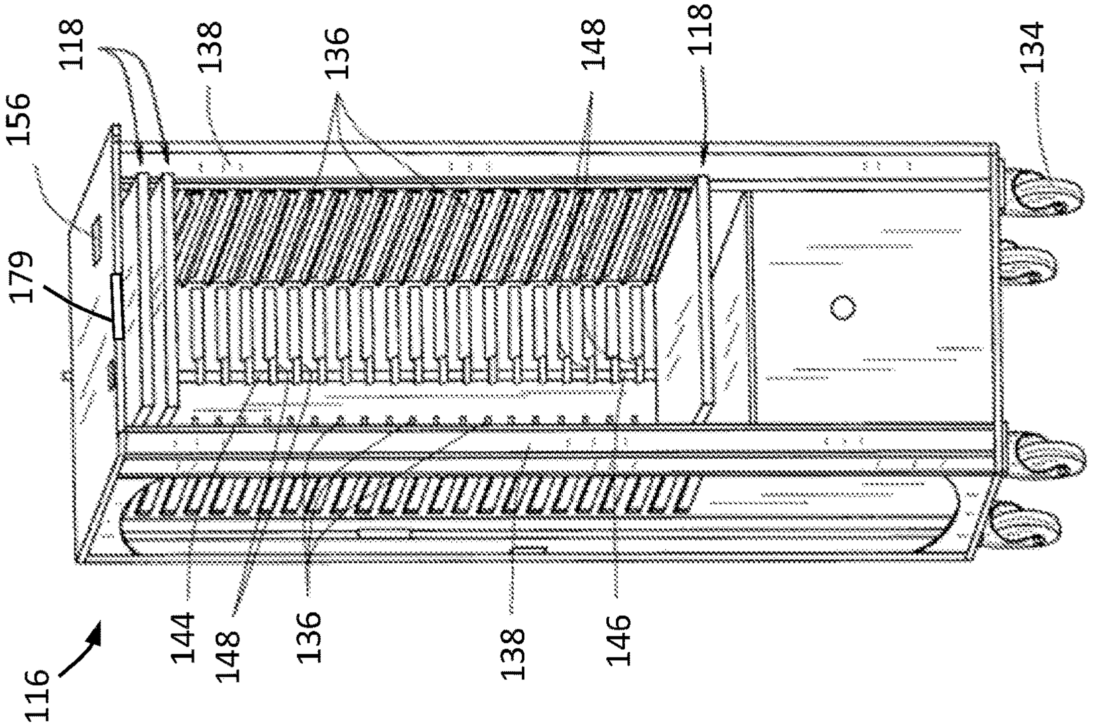
Figure 7:
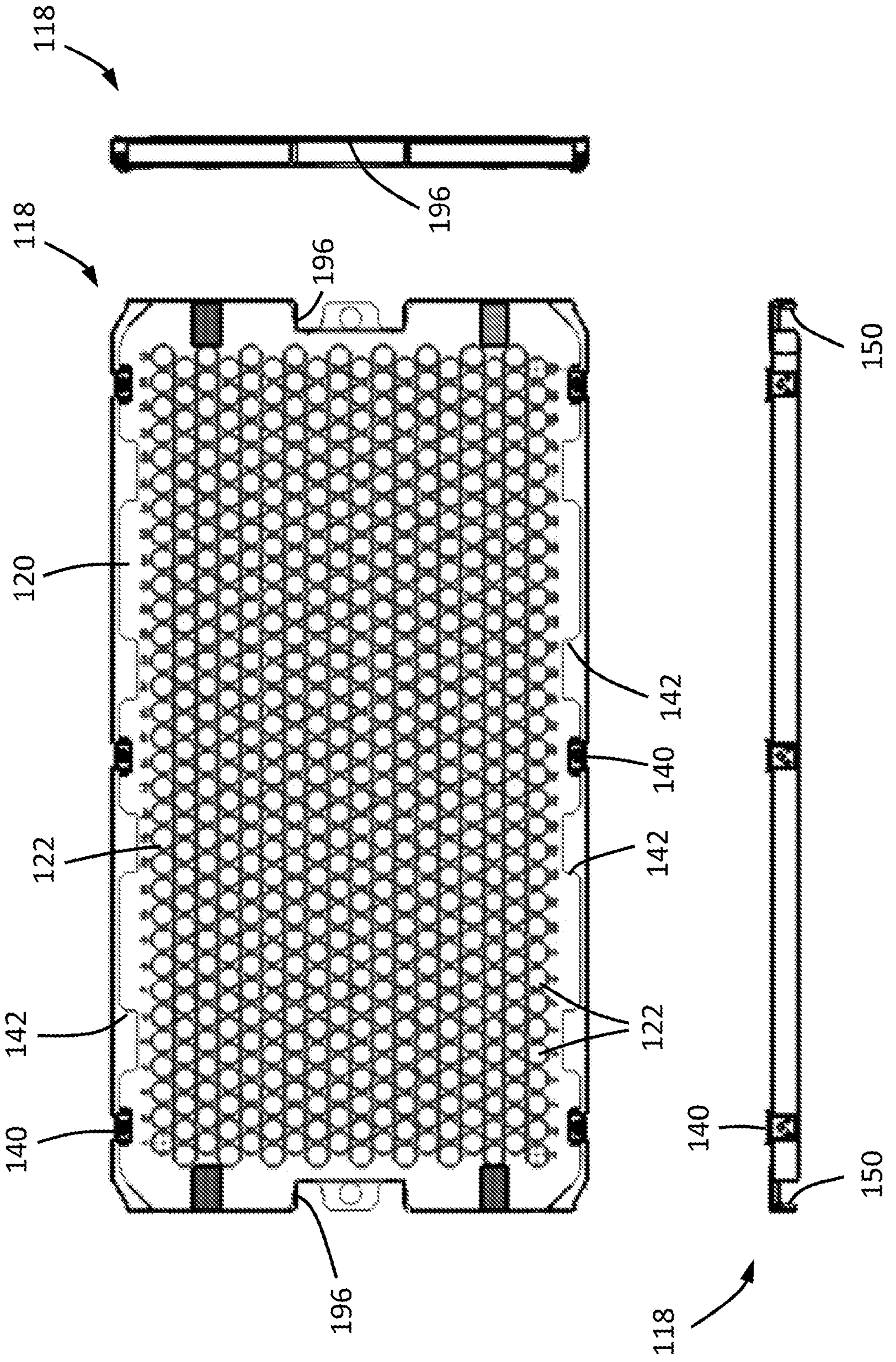
Figure 8:
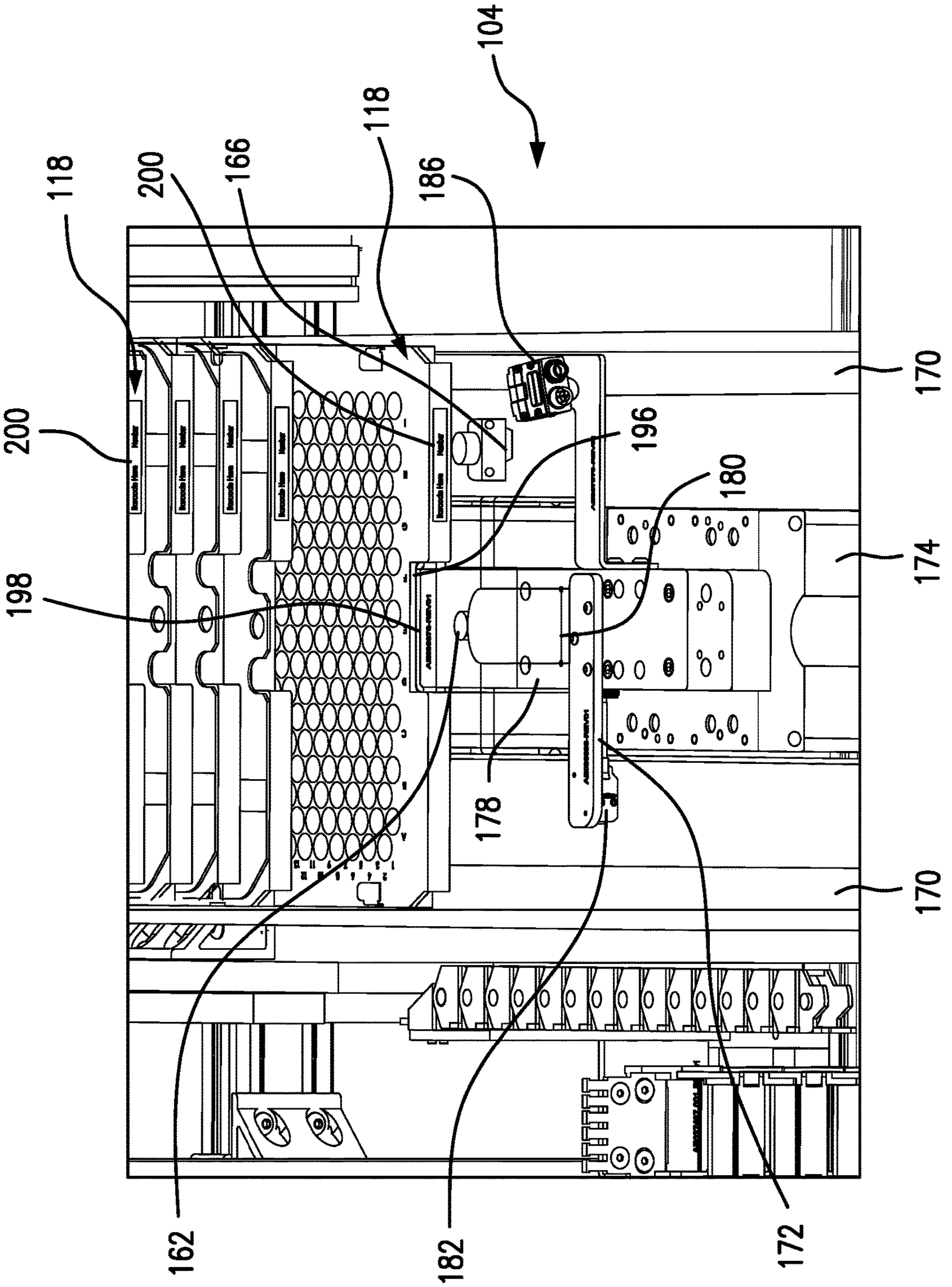
Figure 9:
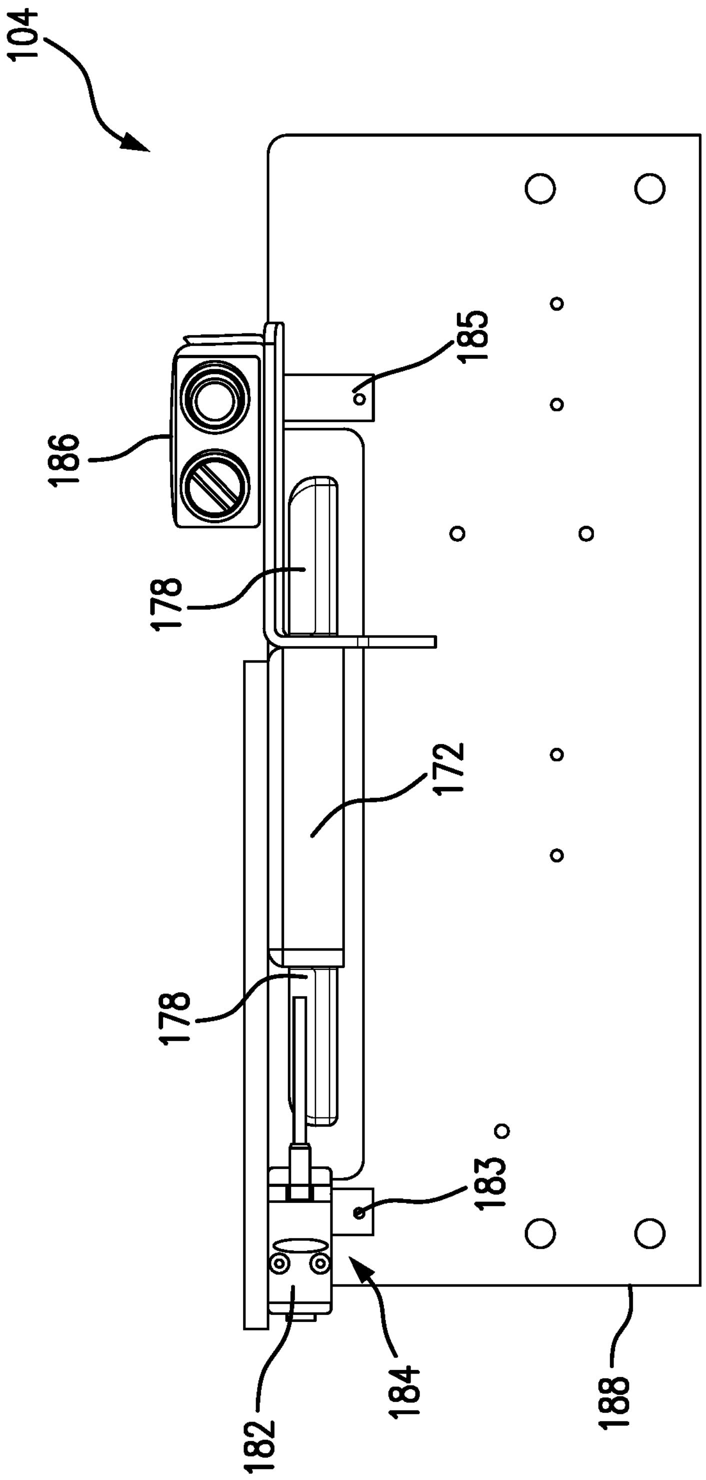
Figure 10:
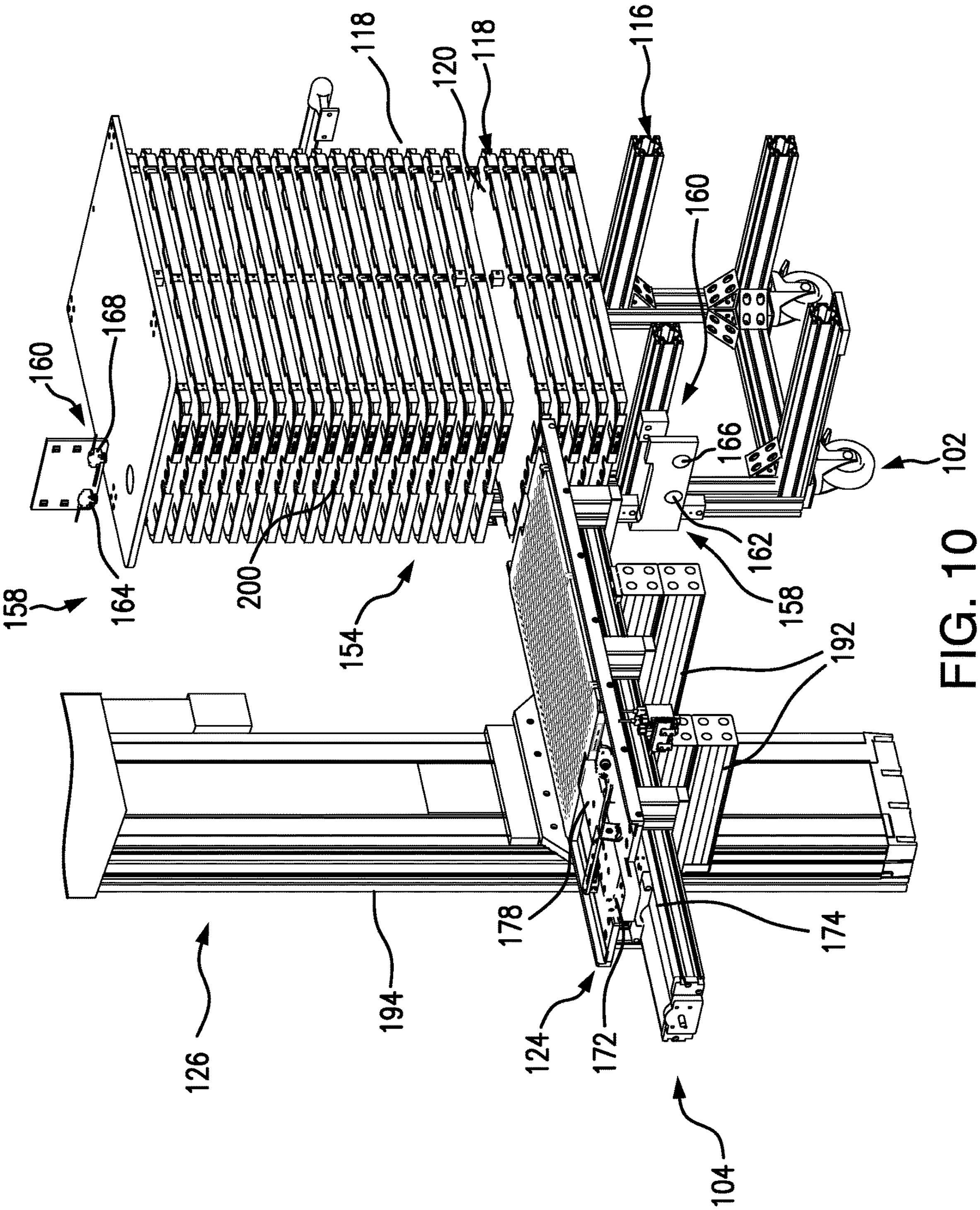
Figure 11:
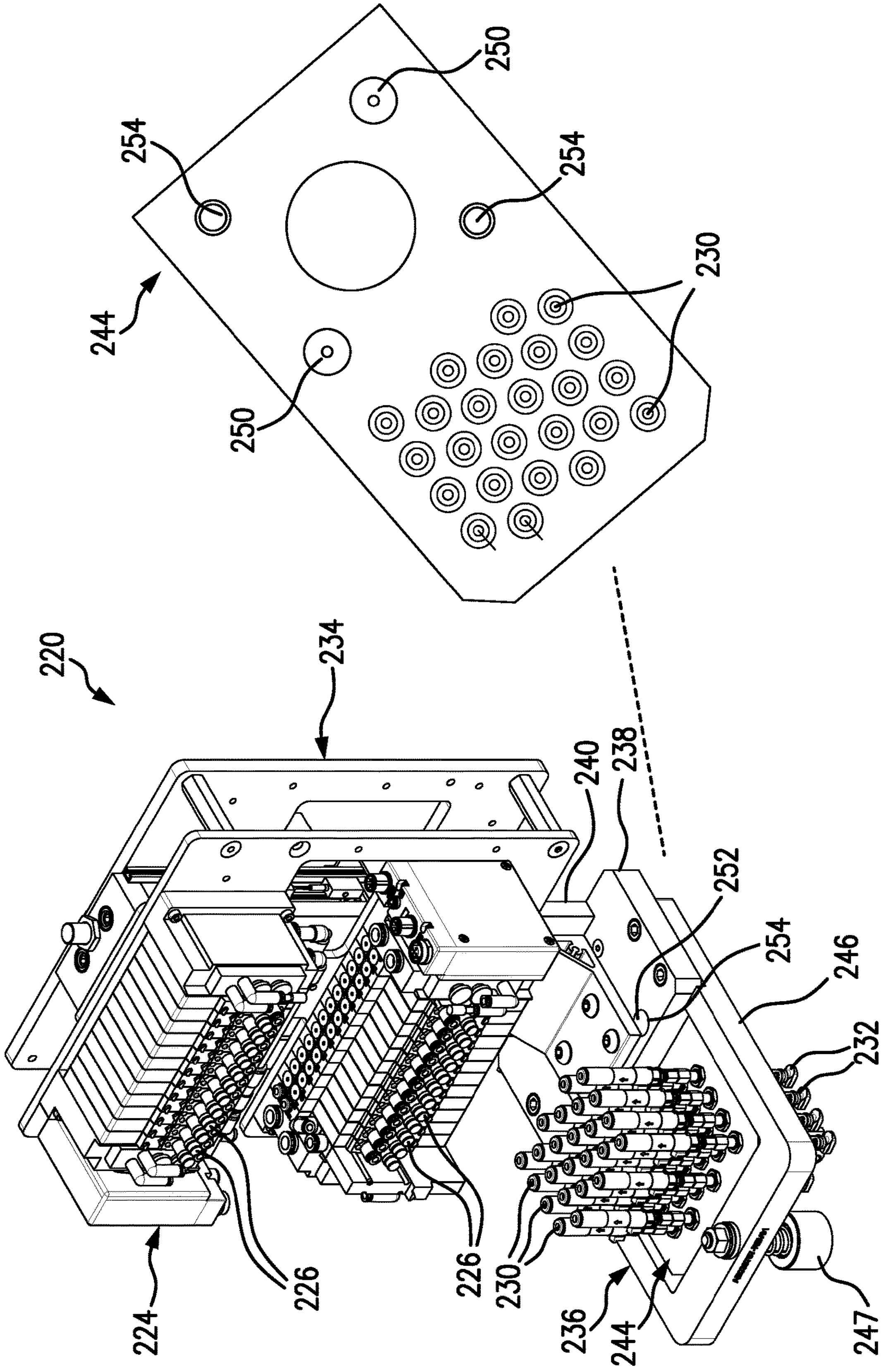
Figure 12:
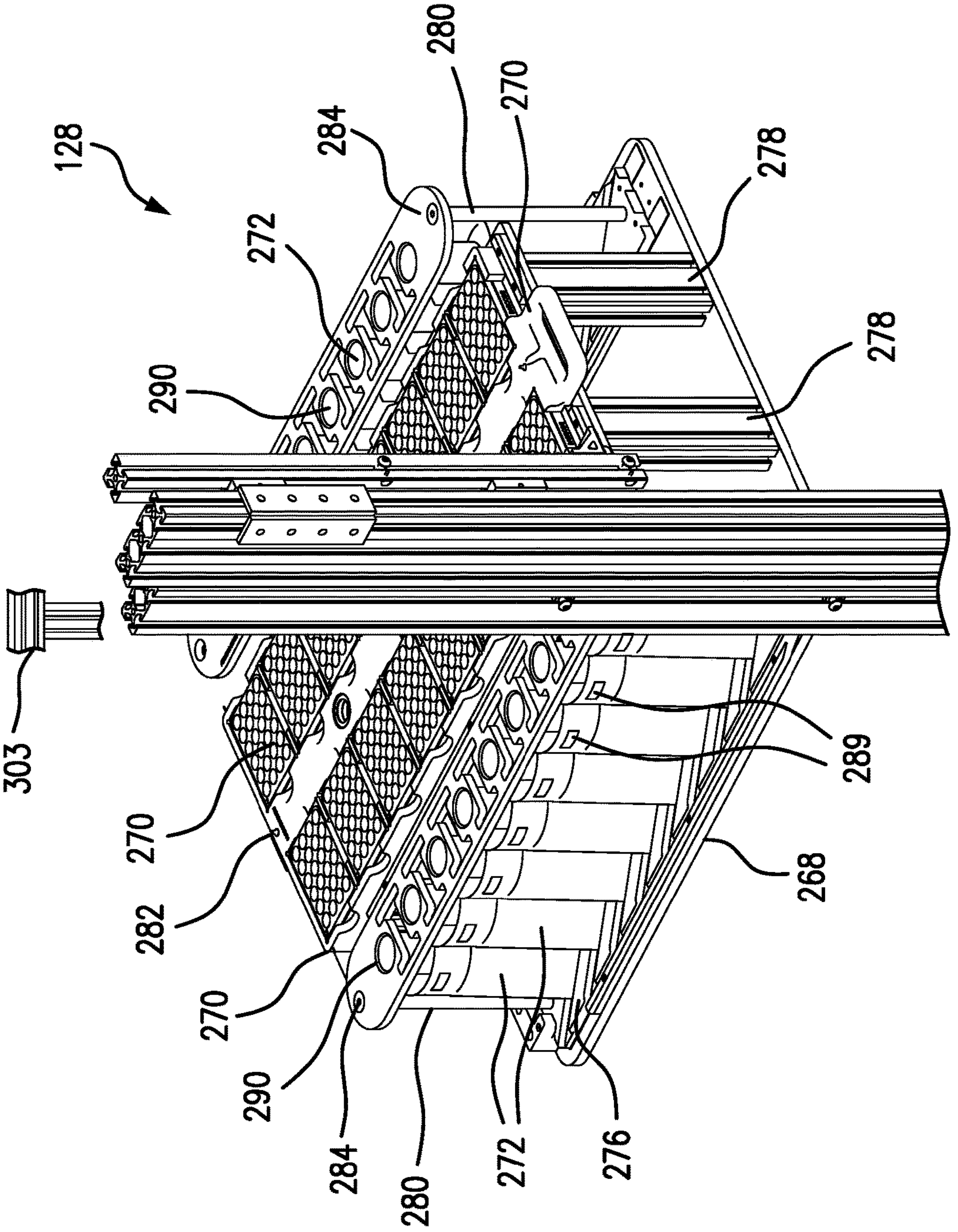
Figure 13:
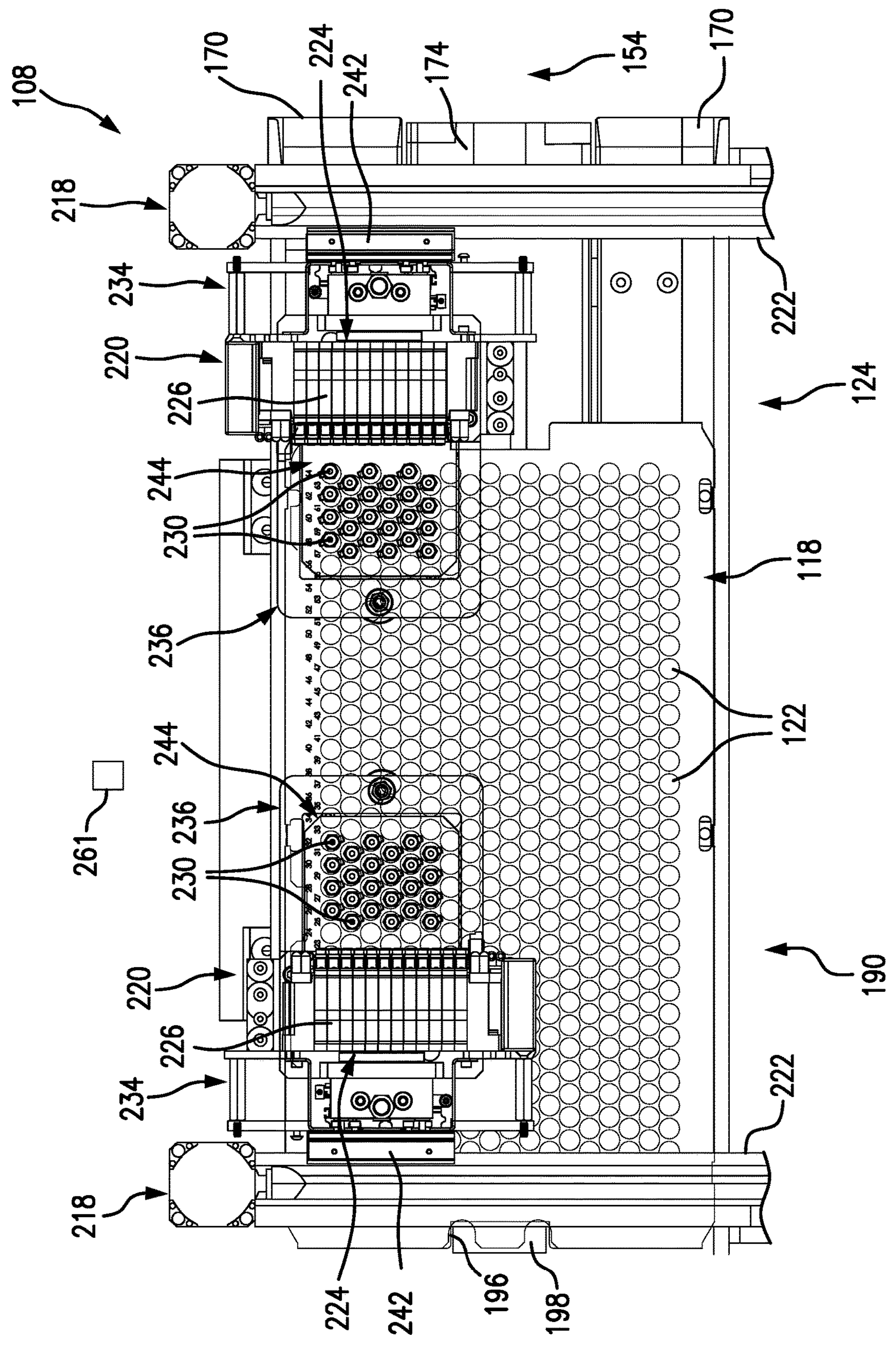
Figure 14:
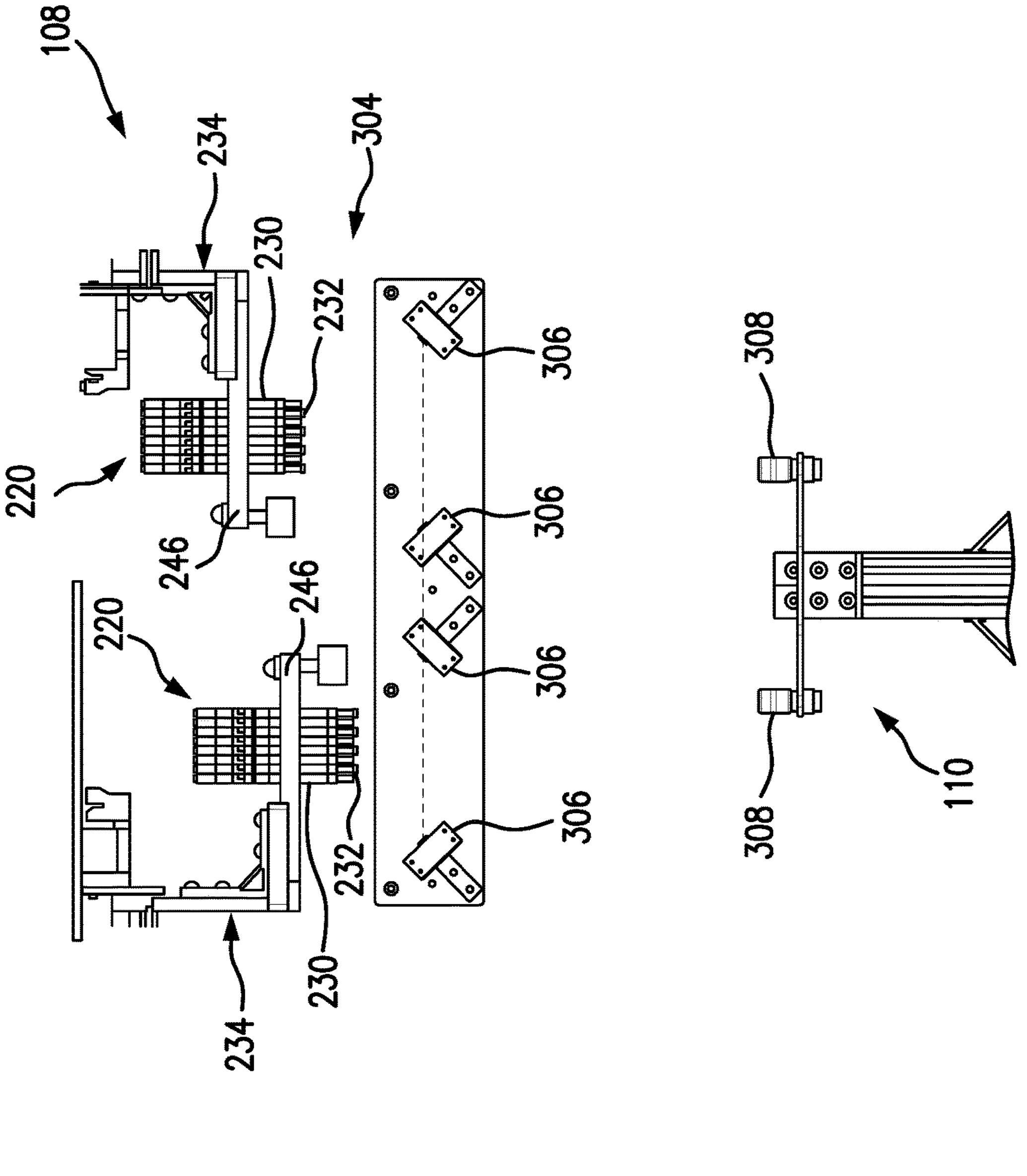
Figure 15:
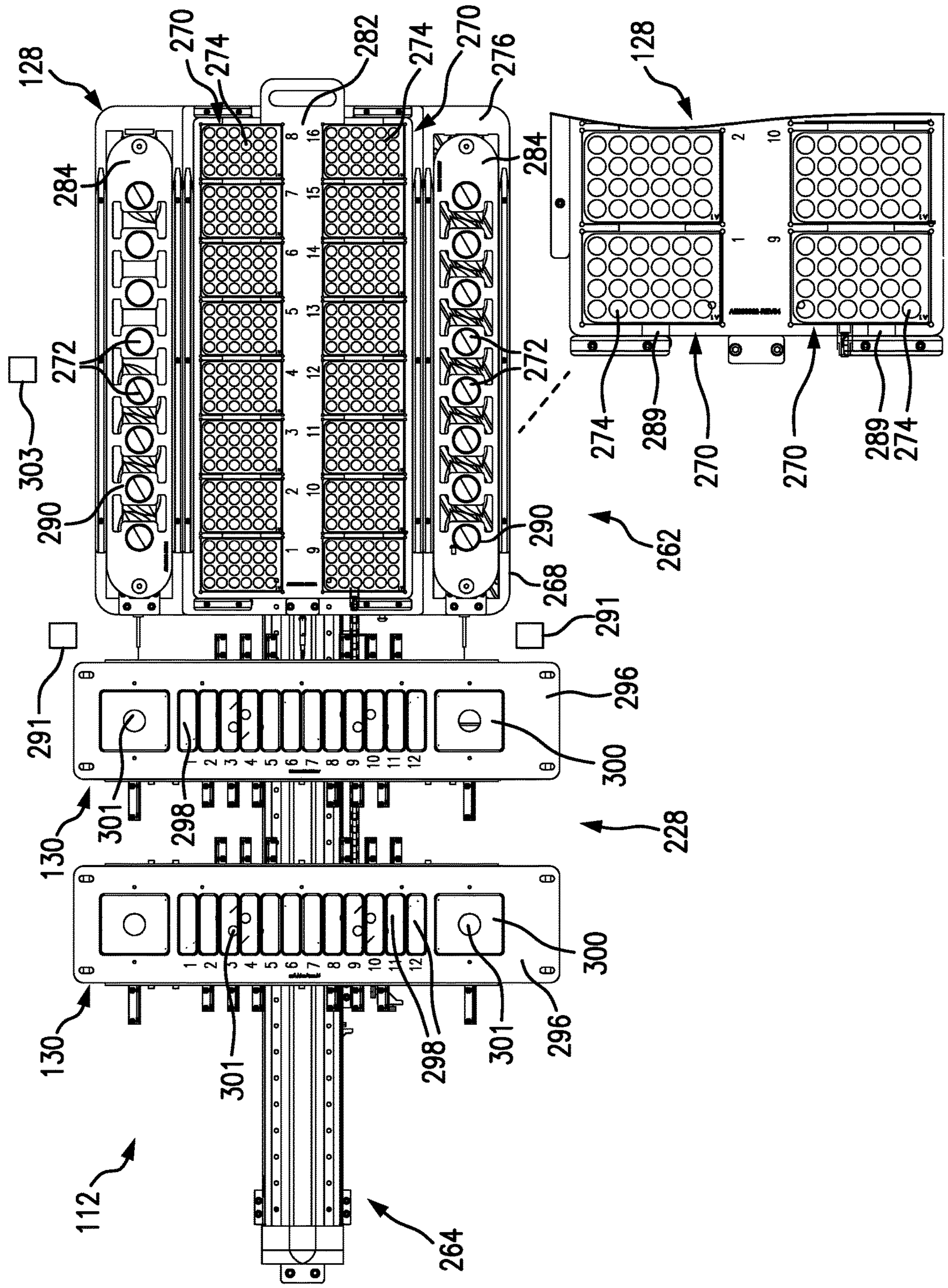
Figure 16:
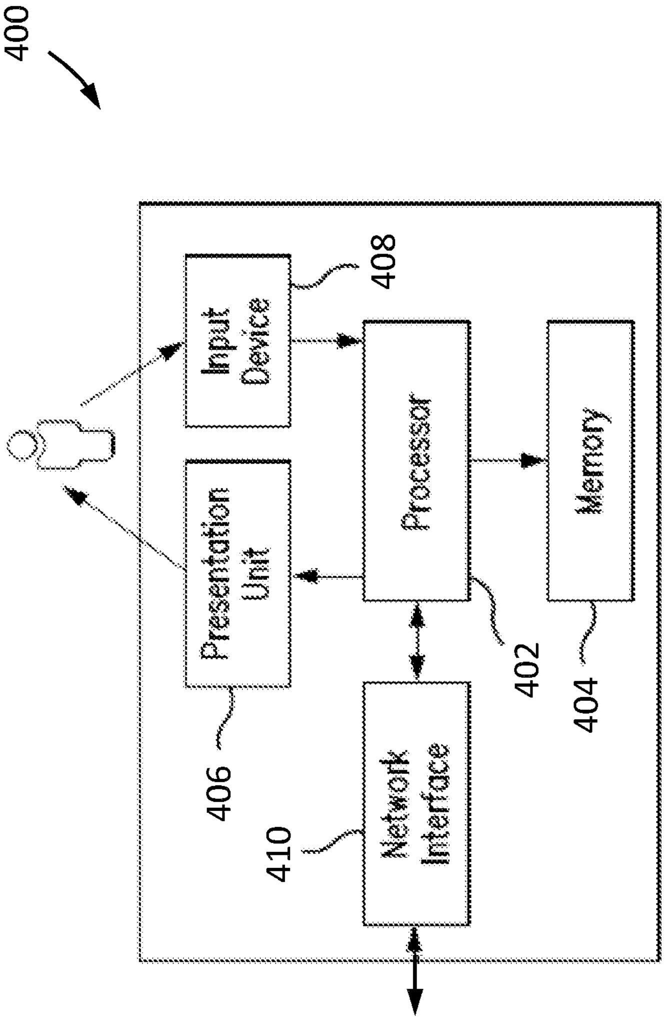
Figure 17:
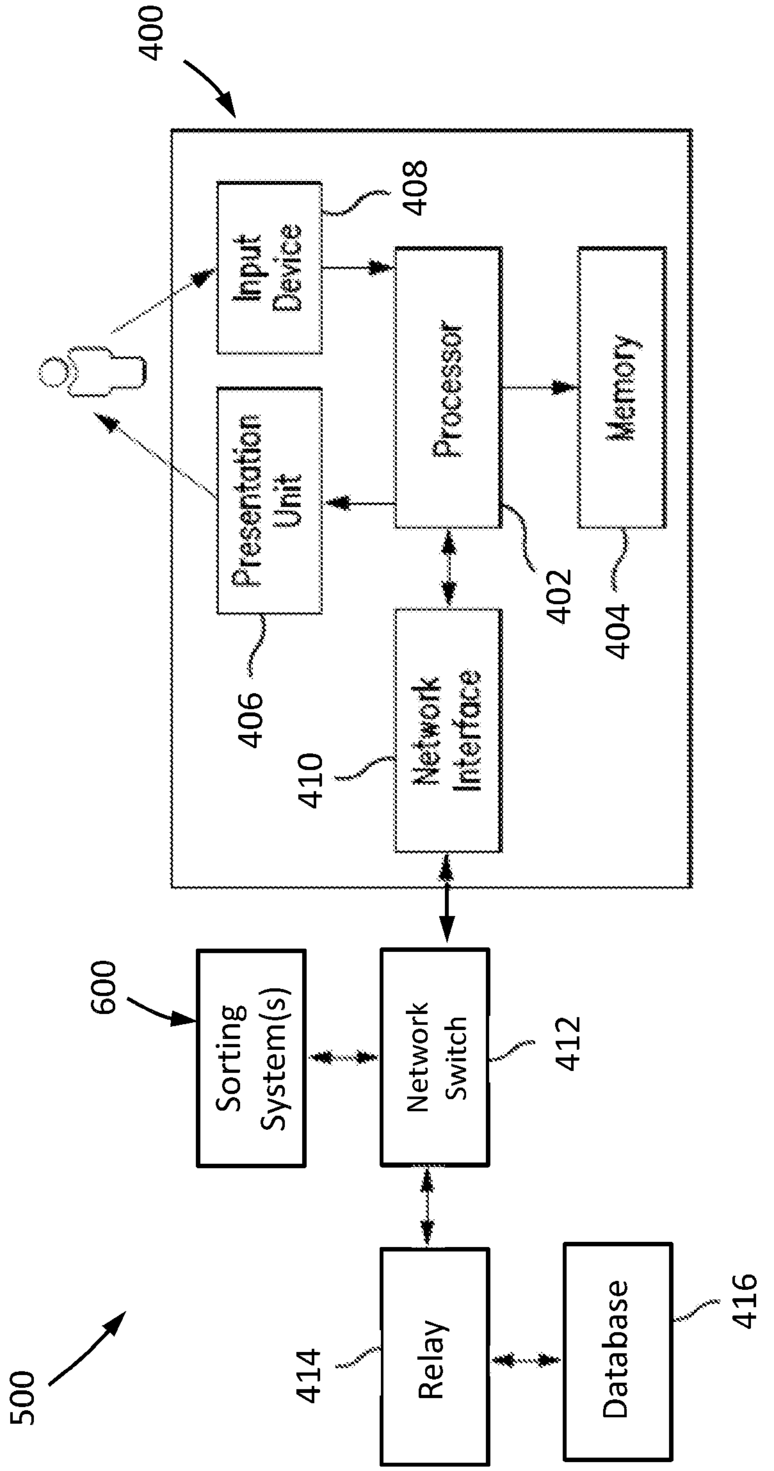

FIG. 7 includes an overhead view and two edge views of a tray configured for use with the cart of FIGS. 5 and 6;

FIG. 8 is a fragmentary perspective view of a tray subsystem of the sorting system of FIG. 1;

FIG. 9 is a fragmentary elevation view of the tray subsystem of the sorting system of FIG. 1;

FIG. 10 is a fragmentary perspective view of the docking station and the tray subsystem of the sorting system of FIG. 1;

FIG. 11 includes a perspective view of an extraction subsystem of the sorting system of FIG. 1 and a perspective view of a nozzle head plate of the extraction subsystem;

FIG. 12 is a fragmentary perspective view of a receiving fixture of the sorting system of FIG. 1, and into which the extraction subsystem of FIG. 11 is configured to release selected objects;

FIG. 13 is a fragmentary overhead view of the tray subsystem and the extraction subsystem of the sorting system of FIG. 1;

FIG. 14 is a fragmentary elevation view of a verification subsystem of the sorting system of FIG. 1;

FIG. 15 is an fragmentary overhead view of a collection subsystem of the sorting system of FIG. 1;

FIG. 16 is a block diagram of an example computing device in which a control system of the sorting system of FIG. 1 may be implemented to control operation of the sorting system; and FIG. 17 is a block diagram of an example architecture in which multiple sorting systems of the present disclosure may be interconnected, for example, share data.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

FIGS. 1-16 illustrate an example embodiment of an automated sorting system 100 including one or more aspects of the present disclosure. The illustrated system 100 is suitable for use in automatically (e.g., robotically) sorting small objects and depositing the sorted objects into selected receptacles based on particular attributes of each sorted object (e.g., characteristics and/or traits such as size, shape, color, composition, quality, weight, genetic traits, etc.). The objects may include any small objects, items, parts or products that are desired to be sorted or separated based on particular attributes of each sorted object (e.g., seeds and other agricultural products, pharmaceutical tablets or capsules, small electrical components, ball bearings, small food products, etc.). For example, in the illustrated embodiment, the sorting system 100 is configured to sort (without limitation) small objects such as seeds.

As shown in FIGS. 1-4, the example sorting system 100 generally includes a docking station 102, a tray subsystem 104, a de-lidding subsystem 106, an extraction subsystem 108, a verification subsystem 110, a collection subsystem 112, and a control system 114. The sorting system 100, then, and the components thereof, is/are automatically operated under control of the control system 114, with the control system 114 automatically coordinating operation of the docking station 102, the tray subsystem 104, the de-lidding subsystem 106, the extraction subsystem 108, the verification subsystem 110, and the collection subsystem 112 as described herein.

In general in the system 100, and as described in greater detail below, the docking station 102 is configured (e.g., structured and operable, etc.) to receive and hold a cart 116 (FIGS. 5 and 6) including a plurality of trays 118, where each tray 118 includes a lid 120 and a plurality of wells 122 each structured to retain a small object (FIGS. 7 and 10). In the example system 100, the plurality of wells are each structured to retain a small object that is a seed. However, as generally explained above, the system 100 is suitable for use in sorting any small object and is not limited to sorting seeds. Similarly, the structure of the wells 122 is not limited to retaining seeds and the wells 122 may be structured to retain any small object.

The tray subsystem 104 is configured to remove the trays 118 from the cart 116 when the cart 116 is retained by the docking station 102, and return the trays 118 to the cart 116 when use of the trays in the sorting system 100 is complete. The tray subsystem 104 may be configured to remove the trays 118 in any order (e.g., sequentially, non-sequentially, a predefined order, etc.) or at random. The example tray subsystem 104 is configured to remove the trays 118 one at a time, whereby the system 100 operates on one tray 118 at a given time. However, in one or more other embodiments, the tray subsystem 104 may be configured to remove a plurality of trays 118 at a time, whereby the system 100 may operate on more than one tray 118 at a given time.

The de-lidding subsystem 106 is configured to remove the lid 120 from each tray 118 removed from the cart 116 and, as necessary, store the lid 120 apart from (or independent of) the tray 118 (e.g., on the top of cart 116, etc.). However, the de-lidding subsystem 106 may also be configured to replace the lid 120 back on (or recouple the lid 120 to) the tray 118 (e.g., instead of storing the lid 120 on the cart 116, etc.). In connection therewith, the de-lidding subsystem 106 is configured to hold the lid 120 on one or more lid retention devices and, in particular in the illustrated embodiment, vacuum cups 212, while the sorting system 100 operates on the tray 118 and the seeds as described in more detail below (e.g., instead of storing the lid 120 on the cart 116, etc.) before replacing the lid 120 back on the tray 118. After the lid 120 is removed, the extraction subsystem 108 is configured to then extract one or more selected seeds from the tray 118 and release the extracted seed(s) to the collection subsystem 112. In so doing, the verification subsystem 110 is configured to confirm whether or not the extraction subsystem 108 has successfully removed the one or more seeds from the tray 118 (and conveyed the one or more seeds to the collection subsystem for sorting).

Components of the sorting system 100 (e.g. the de-lidding subsystem 106 and extraction subsystem 108, etc.) may be pneumatically operated using, for example, desired air flows, etc. Such pneumatic operations may apply, for example, to removing and storing the lid 120 from the tray 118 removed from the cart 116 and extracting and releasing one or more seeds from the tray 118 removed from the cart 116 (e.g., via vacuum processes, etc.). In addition, the sorting system 100 and components thereof are supported by various structures such as stationary braces, beams, platforms, pedestals, stands, etc. and include various couplings (e.g., valves, tubing connectors, etc.). Although such structures and/or couplings are necessary to the construction of the sorting system 100, description of their placement, orientation and interconnections are not necessary for one skilled in the art to easily and fully comprehend the structure, function and operation of the sorting system 100. Particularly, such structures are clearly illustrated throughout the figures and, as such, their placement, orientation and interconnections are easily understood by one skilled in the art.

With that said, in operation, the cart 116 may initially be moved from a non-docked location apart from the sorting system 100 into the docking station 102 of the sorting system 100 by way of casters, rollers or wheels 134 (FIGS. 5 and 6). The cart 116 also includes, and/or is constructed from, a ferrous or magnetic material, such that the cart may be magnetically retained by the docking station 102 in a docket position (or location), as described in greater detail below.

With additional reference to FIGS. 5-7, the tray 118 that may be held by the cart 116 includes the wells 122, wherein each well 122 is structured to retain a single seed. In addition, the tray 118 includes the lid 120 removably connected thereto. The lid 120 is configured to retain the seeds within the wells 122 of the tray 118. The lid 120 is also removably connected to the tray 118 using suitable connecting or fastening means. For example, the illustrated tray 118 includes a plurality of L-shaped spring clips 140 attached to opposing sides of the tray 118, and the lid 120 includes a plurality of mating cutouts 142. The lid 120 may then be installed on, or connected to, the tray 118 by positioning the lid 120 onto a top surface of the tray 118 such that the cutouts 142 are placed around the spring clips 140. The lid 120 may then be slid across the tray's top surface such that perimeter edges of the lid 120 slide under the spring clips 140, thereby removably connecting the lid 120 to, or retaining the lid 120 on, the tray 118. While this process may be performed manually or by a system other than system 100 (e.g., before the tray 118 is stored in the cart 116, etc.) it should be appreciated that the de-lidding subsystem 106 may be configured to carry out these operations in order to replace the lid 120 on the tray 118 after the de-lidding subsystem 106 removes the lid 120 from the tray 118, as part of a "re-lidding" action.

To remove the lid 120 from the tray 118, the process may be reversed, whereby the lid 120 is slid across the tray top surface (e.g., by the de-lidding subsystem 106 as described in more detail below, etc.) until the mating cutouts 142 align with the spring clips 140 such that the lid 120 may then be lifted or removed from the respective tray 118 (e.g., by the de-lidding subsystem 106, etc.).

The cart 116 includes a plurality of tray guides 136 disposed on (i.e., formed in or attached to) opposing sidewalls 138 of the cart 116. The tray guides 136 are structured and disposed on the opposing sidewalls 138 such that each of a plurality of trays 118 may be supported within the cart 116 by opposing tray guides 136 to thereby removably store each of the trays 118 within the cart 116 (see, also, FIG. 10). In one or more embodiments, the cart 116 may be selected from a plurality of like carts, wherein each cart retains different trays 118 and wherein each tray 118 again includes a plurality of desired seeds. In addition, the illustrated cart 116 is configured to retain twenty-four trays 118. In other embodiments, though, the cart 116 may be configured to retain a different number of trays 118. In the example cart 116, the tray guides 136 are disposed on the opposing sidewalls 138 such that the trays 118 are spaced generally evenly (or generally equally) apart. However, the trays 118 do not necessarily need to be disposed in a specific location within the cart 116 and may be disposed within the cart 116 in one or more other manners.

In one or more embodiments, the cart 116 may include a tray locking mechanism 144. The tray locking mechanism 144 may be configured (e.g., manually or by communication with the sorting system 100, control system 114, etc.) to engage the trays 118 positioned in the cart 116 and to retain the trays 118 within the cart 116 until such time as the tray locking mechanism 144 is operated (e.g., manually or by communication with the sorting system 100, control system 114, etc.) to disengage the trays 118 (e.g., for removal by the tray subsystem 104 or by personnel unloading trays 118 from the cart 116, etc.). The locking mechanism 144 may be any mechanism, device or assembly operable to retain the trays 118 within the cart 116 and release the trays 118 upon a disengaging operation of the locking mechanism 144. In one embodiment, the locking mechanism 144 includes a spring loaded, or otherwise biased, shaft 146 having a plurality of locking arms 148 radially extending from the shaft 146. The locking arms 148 may be spaced apart a distance equal to the spacing between adjacent tray guides 136 and the shaft 146 is biased upward, via a spring or other biasing device, to a locking position wherein each of the locking arms 148 may engage a tray 118 supported by a respective set of opposing tray guides 136 (although each set of opposing tray guides does not necessarily have a tray 118 supported thereon).

When the locking mechanism 144 of the cart 116 is in the locking position, each locking arm 148 may engage an appropriate one of a pair of handling channels 150 formed at opposing ends of each tray 118. The locking mechanism 144, when in the locking position, inhibits the trays 118 from moving forward in the cart 116 (or completely out of the cart 116). The locking mechanism 144, when in the locking position, also helps ensure that that a lip or handling channel 150 of each tray 118 of extends a predefined distance from the front frame of the cart 116 (FIGS. 5 and 6). In this manner, when the cart 116 is docked within the docking station 102, the handling bar 178 of the tray subsystem 104 may be navigated to a predetermined position in order to remove a tray 118 from the cart 116 as described in more detail below That said, the locking mechanism 144 may include a release lever 152 radially extending from the shaft 146 through a slot 153 formed in a back of the cart 116. In connection therewith, in one or more embodiments of the sorting system 100, the docking station 102 may then include a locking mechanism release actuator. In this manner, when the cart 116 is docked within the docking station 102, the release lever 152 may be positioned adjacent and in close proximity to the locking mechanism release actuator. The locking mechanism release actuator may be operable (e.g., under the control of the control system 114, etc.) to push downward on the release lever 152, opposing and overcoming the upward biasing force on the shaft 146, thereby disengaging the locking arms 148 from the handling channels 150 of each tray 118 retained within the cart 116. Accordingly, where the docking station 102 includes the release actuator, once the cart 116 is docked in the docking station 102, the locking mechanism 144 may be disengaged, via the release actuator, so that each of the trays 118 can be selectively removed from the cart 116 by the tray subsystem 104, as described in greater detail below. With that said, in one or more embodiments, the docking station 102 need not necessarily include the locking mechanism release actuator, and the cart 116 need not necessarily include the tray locking mechanism 144.

In addition to, or as an alternative to, the tray locking mechanism 144, a tray location and/or distance sensor 180 (FIG. 8) of the tray subsystem 104, as described below, is also configured to identify the vertical position of a tray 118 in the cart 116 and the distance to the tray 118 (e.g., from the tray location and/or distance sensor to the lip or a handling channel 150 of the tray 118, etc.), thereby providing the specific location to which the handling bar 178 of the tray subsystem 104 should navigate in order to remove the tray 118. In this manner, system 100 and/or control system 114 may measure how far the tray 118 is from the handling bar 178 and adjust accordingly.

The docking station 102 of the sorting system 100 also includes a cart locking mechanism and, in particular in this embodiment, an electromagnet 181 (FIG. 4) (e.g., an electromagnetic lock, etc.) (e.g., a safety-related electro magnet, etc.) configured to further help locate and retain the cart 116 in a specific position and orientation in the sorting system 100 relative to the tray subsystem 104, for example, such that cart 116 is positioned and oriented with a front of the cart 116 adjacent an ingress/egress window or region 154 of the tray subsystem 104 (see, also, FIGS. 10 and 13), and an exposed leading edge of each tray 118 adjacent (or extending into) the ingress/egress window 154 of the tray subsystem 104. In the illustrated embodiment, the electromagnet 181 is shown along an upper portion of the docket station 102, but could be located otherwise in other embodiments. The cart 116, then, includes a corresponding electromagnet and/or may be constructed, at least in part, from a ferrous material, with the electromagnetic and/or the ferrous material of the cart 116 being disposed such that the docking station 102 temporarily/releasably retains the cart 116 when the electromagnet 181 is powered, while the cart 116 is disposed within the docking station 102. In this manner, the tray subsystem 104 may interact with the trays 118 within the cart 116, as discussed in greater detail below. In connection therewith, it should be appreciated that an electromagnetic lock of the docking station 102 may include multiple electromagnets 181 in various embodiments. Each electromagnet 181, then, may be disposed and operable to locate and retain the cart 116 in a specific position and orientation relative to the tray subsystem 104 of the sorting system 100.

In other embodiments, means other than (or in addition to) magnets may be used to dock the cart 116 within the docking station 102 (e.g., guide arms configured to guide the cart 116 into the docking station 102, cart stabilizers (e.g., rollers (e.g., at the bottom of the cart 116, etc.), etc.) configured to engage (e.g., frictionally, etc.) the opposing sidewalls 138 of the cart 116 to locate and/or retain the cart 116 in the docked position, cart locks configured to secure the cart 116 within the docking station 102 (e.g., to extend from the cart 116 and engage the docking station 102, ground, etc.), etc.). In connection therewith, it should be appreciated that electromagnetic locks, guide arms, cart stylizers, cart locks, etc. may also help to laterally locate (or justify) the cart 116 to further mechanically define (or limit) the location of the trays 118 (e.g., the lips or handling channel 150, etc.) of the trays 118, whereby the handling bar 178 of the tray subsystem 104 may be navigated to a predetermined position in order to remove a tray 118 from the cart 116 (based on a consistent positioning of the cart 116 in the docking station 102) as described in more detail below.

Also in the illustrated embodiment, the example electromagnets 181 of the electromagnetic lock of the docking station 102 and/or of the cart 116 (e.g., electromagnetic material of the cart, etc.) also include RFID tags (e.g., RFID tag 179 of the cart 116 (FIG. 5) where a similar RFID tag may be associated with the docking station 102, etc. at or as part of the electromagnetic lock, etc.). The RFID tags are configured and disposed to ensure proper alignment of the electromagnets 181 of the docking station 102 and the electromagnets of the cart 116 and, therefore, the cart 116 docked within the docking station 102. For example, an RFID reader may be configured to detect the RFID tags (e.g., of the electromagnets on the cart 116) and transmit a signal to the control system 114, whereby the control system 114 may be configured to, based on the signal, determine that the cart 116 is properly aligned and compatible with the docking station 102. RFID tags on the cart 116 (e.g., included with electromagnets of the cart 116, etc.) may also be configured to restrict/allow the sorting system 100 from operating on the cart 116. For example, the RFID tags may include an identifier and the RFID reader may read the identifier from the RFID tags when the cart 116 is within the docking station 102 and transit the identifier to the control system 114, whereby the control system 114 may determine whether the identifier matches with an allowed identifier (e.g., as a basis to determine if an appropriate cart is in the docking station 102, etc.). In addition to the RFID tags of the electromagnetic lock, the docking station 102 may also include a cart sensor configured to detect whether the cart 116 has been inserted into the docking station 102 (e.g., proximity of the electromagnets 181 of the docking station 102 and the cart 116 (e.g., the cart 116 being within the docking station 102, etc.) and, in particular, whether the cart 116 is within sufficient distance of the electromagnets 181 such that powering of the electromagnets 181 may retain the cart 116 within the docking station 102 as described above, etc.). In so doing, the cart sensor is configured to communicate a signal to the control system 114, indicating whether the cart 116 has been inserted into the docking station 102.

The docking station 102 further includes a handling bar collision sensor 158 and a tray collision sensor 160 (FIG. 10). In connection therewith, the handling bar collision sensor 158 includes an emitter 162 and a receiver 164, and the tray collision sensor 160 includes an emitter 166 and a receiver 168. The tray collision sensor 160 is disposed and operable to detect out of position trays 118 in the cart 116 (e.g., trays extending slightly forward in the cart 116, etc.), and the handling bar collision sensor 158 is disposed and operable to detect proper positioning of handling assembly 172 in connection with removing the trays 118 from the cart 116 once the cart 116 is docked in the docking station 102. That said, the handling bar collision sensor 158 and tray collision sensor 160 may be implemented using any one or more sensors such as, for example, a photoelectric sensor, etc.

With reference now to FIGS. 8-10 and 13, the tray subsystem 104 of the sorting system 100 includes a translation assembly 124 and an elevator assembly 126. For each tray 118 removed from the cart 116, the translation assembly 124 is configured to position the removed tray 118 for removal of the lid 120 and for extraction of one or more seeds from the removed tray 118. The translation assembly 124 also is configured to return the tray 118 to the cart 116 after the one or more seeds are extracted from the tray 118.

The translation assembly 124 includes opposing rails 170. The rails 170 are configured to support and guide the tray 118 when the tray 118 is removed from the cart 116. The translation assembly 124 also includes a handling assembly 172, as well as a stage 174 to which the handling assembly 172 is mounted. The stage 174 is disposed between the rails 170 and generally extends (e.g., is configured to move, etc.) from one end of the translation assembly 124 to the other end. The handling assembly 172 includes a handling bar 178, the tray location and/or distance sensor 180, a tray presence sensor 182, a handling bar calibration sensor 184 (including an emitter 183 and a receiver 185), and a tray reader 186. The tray presence sensor 182, the handling bar calibration sensor 184, and the tray reader 186 are mounted to the handling assembly 172 via bracket 188. In one or more other embodiments, other handling assemblies may be used whereby the handling assembly 172 may be configured otherwise and/or may include fewer, additional, or alternative components.

The stage 174 of the translation assembly 124 is configured to bi-directionally move the handling assembly 172 along a Y-axis of the system 100 (e.g., a pneumatically, hydraulically or electrically controlled threaded shaft system, ball screw system, wire or cable pulley system, piston system, conveyor belt system, linear motor, etc.). In so doing, the handling assembly 172 is operable (in coordination with the elevator assembly 126) to selectively remove a tray 118 from the docked cart 116 (via the handling bar 178, as described below), and controllably position the removed tray 118 along the length of the rails 170 in a pick zone 190 of the tray subsystem 104, such that the lid 120 of the tray 118 may be removed by the de-lidding subsystem 106 and one or more seeds may be extracted from the tray 118 by the extraction subsystem 108. In connection therewith, the elevator assembly 126 is configured to selectively raise and/or lower the translation assembly 124. More particularly, the elevator assembly 126 includes a support 192 and an elevator 194. The support 192 is movably mounted to the elevator 194, and the translation assembly 124 is fixedly mounted to the support 192. The elevator 194 is operable to bi-directionally move the translation assembly 124 along a Z-axis of the system 100. That is, the elevator 194 is operable to raise and lower the support 192 and, in turn, the translation assembly 124. The elevator 194 may include any assembly, system or mechanism configured to controllably move the translation assembly 124 of the tray subsystem 104 bi-directionally along the Z-axis (e.g., a pneumatically, hydraulically, or electrically controlled threaded shaft system, ball screw system, wire or cable pulley system, piston system, conveyor belt system, linear motor, etc.).

With continued reference to in FIGS. 8-10 and 13, the handling bar 178 (e.g., a T-bar, etc.) of the handling assembly 172 is disposed at a distal end of the handling assembly 172 (i.e., the end nearest the docking station 102). The handling bar 178 is structured to fit within the handling channels 150 of the tray 118. The handling channels 150 each include a window 196 (i.e., a gap, space, or opening) (FIG. 7), which is sized to accommodate a neck portion 198 of the handling assembly 172. By coordinated operation of the elevator 194 and the stage 174, the handling bar 178 may be positioned within and engage the handling channel 150 (within window 196) of a select tray 118 within the docked cart 116. Via the engagement of the handling bar 178 within the handling channel 150 of the select tray 118, as the handling assembly 172 is operated along the stage 174, the handling assembly 172 may be controllably positioned to remove the select tray 118 from the cart 116, and position the removed tray 118 along the tray support rails 170 in the pick zone 190 (where the de-lidding subsystem 106 may then remove the lid 120 from the tray 118). That said, it should be appreciated that in other embodiments the window 196 may not be required, when other constructions of a handling bar 178 are utilized.

In the example system 100, to remove a selected tray 118 from a docked cart 116, the control system 114 controls the operation of the elevator 194 and the handling assembly translation stage 174 to move the handling assembly 172 at or near a leading end of the rails 170 such that the handling bar 178 is adjacent and slightly below the handling channel 150 of a selected tray 118. In connection therewith, the control system 114 is configured to position the handling bar 178 adjacent and slightly below the handling channel 150 of the selection tray 118 (e.g., a predefined distance from the front frame of the cart 116 and/or or a distance measured using the tray location and/or distance sensor 180, etc.).

The stage 174 is then operated to slightly move the handling assembly 172 toward the tray 118 such that the handling bar 178 is directly below the handling channel 150 of the selected tray 118. The elevator 194 is then operated to slightly raise the handling assembly 172 such that the window 196 of the handling channel 150 accommodates the neck portion 198 of the handling assembly 172 and the handling bar 178 is disposed within and engages the handling channel 150 of the selected tray 118. Subsequently, the stage 174 is operated to move the handling assembly 172 in the Y-direction away from the docked cart 116, whereby the handling bar 178, by way of its engagement with the handling channel 150, pulls the selected tray 118 out of the docked cart 116, such that the selected tray 118 is supported on the rails 170 of the translation assembly 124.

In one or more other embodiments, again, handling bar 178, handling assembly 172, and/or the handling channel 150 may be configured and/or operated differently. For example, the handling channel 150 need not necessarily include the window 196. For example, the handling assembly 172 and/or the handling bar 178 may be configured with a projection (or lip) (not shown) of a sufficient height at or near the end thereof (e.g., instead of as a T-bar, etc.), where the projection extends in a generally upward direction along the Z-axis of the system 100, such that the handling assembly 172 may be operated to move the projection in a generally upward direction into the handling channel 150, without requiring a window 196 of the handling channel 150 to accommodate a neck portion of the handling assembly 172.

That said, in connection with removing each tray 118 from the cart 116 in the example system 100, the tray reader 186 is configured to read an information device 200 for the tray 118. In the illustrated system 100, the information device 200 for each tray 118 is affixed to an exterior edge of the handling channel 150 of the tray 118. As such, once the cart 116 is docked, the elevator 194 of the tray subsystem 104 is configured (via the control system 114) to raise and/or lower the translation assembly 124 of the tray subsystem 104 (and, in turn, the tray reader 186 of the handling assembly 172) such that the tray reader 186 is positioned to read the information device 200 of one or more trays 118 stored in the cart 116, to thereby obtain further information identifying each of the trays 118 (e.g., a tray identifier (ID) for each tray 118, etc.).

The information device 200 for each tray 118 includes various information and data regarding or pertaining to the seeds residing in the wells 122 of the tray 118, as well as information and data regarding or pertaining the seeds residing in the wells 122 of the other trays 118, which are "grouped" together in one cart 116. For instance, the information device 200 for each tray 118 may provide coded information identifying each seed within the tray 118 (as well as every other tray 118 stored in the cart 116) and detailing particular attributes of each seed within every tray 118 stored in the cart 116 (e.g., characteristics and/or traits such as size, shape, color, composition, quality, weight, genetic traits, etc.) (broadly, seed identification data). The information device 200 for each tray 118 may also provide information identifying the location (e.g., Cartesian coordinates, etc.) of each seed within every tray 118 stored in the cart 116 and, in particular, the location of the well 122 in which each seed resides in each cart tray 118 (broadly, seed location data). Accordingly, when the cart 116 is docked within the docking station 102, the control system 114 may communicate with and control the translation assembly 124, the elevator assembly 126, and the tray reader 186 to read the information device 200 for a single tray 118 stored in the cart 116 and receive the information (e.g., seed identification data and seed location data, etc.) provided thereby for each and every tray 118 grouped into the cart 116.

The information read and received by the control system 114 from the tray reader 186 may then be utilized as data inputs to the one or more system control algorithms, programs, routines, or subroutines, executed by the control system 114, to control the operation of the sorting system 100 (e.g., the extraction of selected seeds from selected ones of the trays 118 stored in the cart 116, as described in greater detail below, etc.).

The information device 200 for each tray 118 may similarly include any machine-readable identification device, label or tag suitable for containing or storing information and data, readable or retrievable by the tray reader 186, regarding or pertaining to the trays 118 and the seeds residing in the wells 122 of the trays 118 (e.g., a radio frequency identification (RFID) tag or a bar code label, etc. from which the information/data may be received and interpreted via wireless communication such as optical signals (e.g., infrared signals, or magnetic fields); etc.). Similarly, the tray reader 186 may include any device suitable for reading the information devices 200 (i.e., retrieving the information/data contained in each information device 200, and communicating the retrieved information/data to the control system 114). For example, in one or more embodiments, the tray reader 186 may include an RFID tag reader or a bar code label reader, operable to read the information/data stored in the information device 200 for each tray 118 via wireless communication such as optical signals (e.g., infrared signals, or magnetic fields).

That said, the trays 118 do not need to include information devices 200 in all embodiments. For example, the position/location of each tray 118 within a given cart 116 may be known (e.g., by the control system 114). The information and data regarding or pertaining to the seeds residing in the wells 122 of the trays 118 may also be known (e.g., by the control system 114). The control system 114, then, may be configured to control operation of the tray subsystem 114 to remove the appropriate trays 118 from their known positions/locations in the cart 116. In addition, the trays 118 may be removed from recorded locations/positions within a cart 116 and stored in another recorded location/position within another cart 116, and the cart can then be stored in a recorded location. The control system 114, with knowledge of the carts 116, may then be configured to reference the various data to identify the trays 118.

In one or more other embodiments, again, the docking station 102 may include a cart reader disposed and configured to read an information device 156 of the cart 116 (e.g., affixed to a top surface of the cart 116, etc.) (e.g., a machine-readable identification device such as an RFID tag, bar code label, etc.). The information device 156 may include various information and/or data regarding or pertaining to the cart 116, the one or more trays 118 stored (or grouped) in the cart 116 and/or the particular seeds stored in the respective tray(s) 118. For example, in one or more embodiments, the information device 156 may include, provide, or be associated with a coded list identifying each tray 118 stored in the cart 116 (broadly, tray identification data). In this manner, when the cart 116 is docked, the control system 114 may communicate with and control the cart reader to read the information device 156 of the cart 116 and receive the information/data provided thereby. The information/data read and received from the cart reader may be utilized as data inputs to one or more system control algorithms, programs, routines, or subroutines executed by the control system 114 to control the operation of the sorting system 100. That said, the cart reader may include any device suitable for reading the information device 156 (i.e., retrieving the information/data contained in the information device 156, and communicating the retrieved information/data to the control system 114) (e.g., an RFID tag reader, a bar code label reader, an optical reader, etc.). The tray identification information acquired from each of the information devices 200 for the trays 118 may then be compared, by the control system 114, with the information acquired from the information device 156 for the cart 116 to verify that the cart 116 includes the correct trays 118 stored therein.

With continued reference to the example system 100, by way of the engagement of the handling bar 178 (or, e.g., the projection described above, etc.) with the handling channel 150 of the tray 118 (in order to remove the tray 118 from the cart 116), the handling assembly 172 may be operated along the Y-axis to remove and position the tray 118 anywhere along the length of the rails 170. And, the elevator 194 may be operated to raise and/or lower the removed tray 118 along the Z-axis, in order to position the removed tray 118 for de-lidding of the tray 118 and extraction of one or more selected seeds from the tray 118, as described in greater detail below.

With reference again to FIGS. 1-4, the de-lidding subsystem 106 is configured to automatically remove lid 120 from each tray 118 removed by the handling assembly 172 from the docked cart 116 and store the lid 120 apart from the tray 118 (e.g., on the top of the docked cart 116, etc.). However, as described above, the de-lidding subsystem 106 may also be configured to replace the lid 120 back on the tray 118 (e.g., instead of storing the lid 120 on the cart 116, etc.) by holding the lid 120 on vacuum (or suction) cups 212 while the sorting system 100 operates on the tray 118 and the seeds before replacing the lid 120 back on the tray 118.

In connection therewith, the de-lidding subsystem 106 includes a lid translation assembly 202 and a de-lidding assembly 204. The de-lidding assembly 204 is slidingly mounted to the lid translation assembly 202 and includes a pneumatic supply assembly 206, a linear actuator 208, and a cup head 210. The lid translation assembly 202 is operable to bi-directionally move the de-lidding assembly 204 (including the pneumatic supply assembly 206, the linear actuator 208, and the cup head 210) along the Y-axis, whereby the de-lidding assembly 204 may be moved laterally between positions directly above the pick zone 190 of the tray subsystem 104 (e.g., positions above the tray 118 removed from the cart 116 and positioned on the rails 170 of translation assembly 124 of the tray subsystem 104, etc.) and positions directly above the docked cart 116. That said, the lid translation assembly 202 of the de-lidding subsystem 106 may include a pneumatically, hydraulically or electrically controlled threaded shaft system, ball screw system, wire or cable pulley system, piston system, conveyor belt system, linear motor, or any other suitable positioning system configured to move the de-lidding assembly 204 along the length of the lid translation assembly 202.

The linear actuator 208 of the de-lidding assembly 204 is configured to raise and lower the cup head 210, as mounted to a distal end of the linear actuator 208 (i.e., the end nearest the rails 170 of the translation assembly 124 of the tray subsystem 104). In particular, the linear actuator 208 is configured to raise and lower the cup head 210 along the Z-axis. The cup head 210, then, includes a plurality of vacuum (or suction) cups 212 mounted thereto, to the underside of the cup head 210 (i.e., the side nearest the rails 170) (e.g., six vacuum cups, one vacuum cup, twelve vacuum cups, etc.). The vacuum cups 212 are configured to engage the lid 120 of the tray 118 during operation of the de-lidding subassembly 204 to remove the lid 120 from the tray 118 (e.g., when the tray 118 is removed from the cart 116 and positioned in the pick zone 190, etc.). In connection therewith, the pneumatic supply assembly 206 of the de-lidding assembly 204 includes a plurality of regulators connected to a vacuum source. The pneumatic supply assembly 206 is configured to then provide a vacuum from the vacuum source to each the vacuum cups 212, via the regulators, such that the de-lidding assembly 204 may selectively apply a vacuum, via the vacuum cups 212, to the lid 120 of the tray 118 in order to remove the lid 120. In so doing, in the illustrated embodiment, each of the regulators of the pneumatic supply assembly 206 is connected to one of the vacuum cups 212 and is configured to activate the corresponding vacuum cup 212 in a particular sequence, such that a controlled vacuum may be provided thereto for engaging and releasing a lid. In one example embodiment, the vacuum cups 212 of the cup head 210 may be divided into groups of two vacuum cups, where each group is then individually controlled in a particular actuation sequence to remove and replace a lid 120.

In addition, the elevator assembly 126 of the sorting system 100 is configured to raise or lower the translation assembly 124 such that the tray 118 is positioned at a particular height below the cup head 210 (i.e., a particular distance from the cup head 210) (e.g., within the pick zone 190, etc.). Then, with the tray 118 positioned directly beneath the cup head 210, the linear actuator 208 of the de-lidding assembly 204 is configured to lower the cup head 210 to a position such that the vacuum cups 212 are in contact with the lid 120 of the tray 118. The regulators are then configured to provide a vacuum at one or more of the vacuum cups 212, thereby retaining the lid 120 against the vacuum cups 212. The de-lidding subsystem 106 is then configured to slide the lid 120 across the tray's top surface, to disengage the L-shaped spring clips 140 of the tray 118 from the lid 120 (i.e., until the mating cutouts 142 of the lid 120 align with the spring clips 140, such that the lid 120 may then be lifted or removed from the tray 118). The linear actuator 208 is configured to then raise the cup head 210, thereby removing the lid 120 from the tray 118. Alternatively, the translation assembly 124 of the tray subsystem 104 may be configured to move the tray 118 along the Y-axis (i.e., until the mating cutouts 142 of the lid 120 align with the spring clips 140, such that the lid 120 may then be lifted or removed from the tray 118), and the elevator assembly 126 may be configured to then lower the translation assembly 124 of the tray subsystem 104, thereby separating the tray 118 and the lid 120. In either case, such operation slightly separates at least a portion of the lid 120 from the tray 118 to break any static electronic bond or vacuum formed between the lid 120 and the tray 118. It should be appreciated that valves that control the vacuum applied to the vacuum cups 212 during de-lidding may selectively control the vacuum applied to the vacuum cups 212 to help align the mating cutouts 142 of the lid 120 with the spring clips 140 and separate the lid 120 from the tray 118 and/or to form the lid 120 into a specific shape to more consistently align the lid 120 with the spring clips 140 (e.g., via positive air, suction, combinations thereof, etc.).

Once the lid 120 is removed from the tray 118, the linear actuator 208 of the de-lidding assembly 204 is configured to raise the cup head 210 and lift the lid 120 away from the tray 118, for example, until the lid 120 is higher than the top of the docked cart 116 (and any other lid(s) stacked thereon). Subsequently, or potentially concurrently or before, the lid translation assembly 202 is configured to move the de-lidding assembly 204 laterally along the Y-axis toward the docked cart 116 until the cup head 210 is at a position directly above the top of the docked cart 116 (and any lid(s) stacked thereon). The regulators are configured to then cut off the vacuum to the vacuum cups 212, such that the lid 120 is released onto the top of the docked cart 116 (and any lid(s) already stacked thereon). In connection therewith, regulators may be configured to control the valves that control the vacuum applied to the vacuum cups 212 during de-lidding in order to turn on a positive air pressure to the vacuum cups 212, to help release the lid 120 from the vacuum cups 212 onto the top of the docked cart 116. With that said, it should be appreciated that the de-lidding subsystem 106 may be configured to store the removed lid 120 at another location in other embodiments.

Next, with the tray 118 positioned in the pick zone 190 of the tray subsystem 104, and the lid 120 removed from the tray 118, the extraction subsystem 108 is configured to extract one or more selected seeds from the tray 118 and deposit the seed(s) into a selected seed receptacle of a receiving fixture 128 of the collection subsystem 112 (FIG. 12). The extraction subsystem 108 includes two transfer assemblies 218 (broadly, near and far transfer assemblies, relative to the docking station 102) extending between the tray subsystem 104 and the collection subsystem 112, and two extraction assemblies 220 (broadly, near and far extraction assemblies relative to the docking station 102) each movably mounted to one of the transfer assemblies 218 (and independently operable relative to each other). With that said, in one or more other embodiments, the extraction subsystem 108 may include a different number of transfer assemblies 218 and/or extraction assemblies 220 (e.g., a single transfer assembly 218 and a single extraction assembly 220, three transfer assemblies 218 and three extraction assemblies 220, etc.) within the scope of the present disclosure.

With additional reference to FIGS. 11 and 13, each transfer assembly 218 of the extraction subsystem 108 includes a carriage transporter 222 comprising tracks (or rails) extending between a positon above the translation assembly 124 of the tray subsystem 104 and, in particular, the pick zone 190 of the tray subsystem 104, and a position above funnel assemblies 130 of the collection subsystem 112 and, in particular, a drop zone 228 (FIG. 15) of the collection subsystem 112. Each extraction assembly 220 includes a carriage 234 that is movably mounted to the corresponding carriage transporter 222, a pneumatic supply assembly 224, and a nozzle head assembly 236. The carriage transporter 222 is configured to bi-directionally move the carriage 234 (and the extraction assembly 220), along an X-axis of the system 100 between positions above the pick zone 190 of the tray subsystem 104 and the drop zone 228 collection subsystem 112. In particular, the carriage 234 includes a base plate 238 and a back plate 240. The back plate 240 is mounted to a carriage bracket 242 of the transfer assembly 218 and extends substantially orthogonally from the base plate 238. The carriage bracket 242, then, is slidingly mounted to, or within, tracks of the carriage transporter 222, to thereby move the carriage 234 bi-directionally along the tracks of the carriage transporter 222, along the X-axis.

The nozzle head assembly 236 includes a nozzle head plate 244 and a support fixture 246 supporting the nozzle head plate 244. The nozzle head plate 244 includes an array of seed retention devices (e.g., individual seed retention devices, etc.) and, in particular in this embodiment, vacuum nozzles 230 (e.g., twenty-four vacuum nozzles, etc.). The vacuum nozzles 230 are geometrically arranged within the nozzle array such that the spacing between radial center points of adjacent vacuum nozzles 230 generally corresponds with the spacing between radial center points of adjacent wells 122 of the tray 118. The nozzle head plate 244 is disposed within the support fixture 246 such that the support fixture 246 generally envelopes the outer edges of the nozzle head plate 244, to help ensure that the nozzle head plate 244 does not sway (and to facilitate connection of the nozzle head plate 244 to the carriage 234, via the support fixture 246). The support fixture 246 also includes a plunger 247 that is configure to contact the tray 118 when the vacuum nozzles 230 extract seeds from the tray 118, thereby helping to accurately locate the tray 118 and ensure that the tray 118 does not pull up in the case of tips 232 of the vacuum nozzles 230 pulling up on (or applying negative pressure to) the tray 118.

In the illustrated embodiment, the nozzle head plate 244 is removably connected to the carriage base plate 238 via fastening means suitable for securely and stably connecting the nozzle head plate 244 to the carriage 234 in a fixed position (e.g., nuts, bolts, quick-release fasteners, magnets, etc.). In this manner, a given nozzle head plate 244 having a certain number of vacuum nozzles 230 (e.g., twenty-four, twelve, sixteen, thirty-six, forty-eight, etc.), of a specific size and spacing, may be easily removed and replaced (i.e., interchanged) with another nozzle head plate 244 having a different number and/or style (e.g., size, spacing, etc.) of vacuum nozzles 230. In particular in this embodiment, the nozzle head plate 244 is removably mounted to the base plate 238 of the carriage 234 via a magnetic connection. For instance, the nozzle head plate 244 includes a plurality of magnetic coupling inserts 250, and the base plate 238 of the carriage 234 may include similar inserts disposed in the interfacing surface of the base plate 238 with the nozzle head plate 244. The magnetic coupling inserts 250 of the nozzle head plate 244 are fabricated (i.e., have material properties), such that they are magnetically attracted to the magnetic coupling inserts disposed in the base plate 238. Moreover, the magnetic coupling inserts 250 of the nozzle head plate 244 and the inserts of the base plate 238 are located within the interfacing surfaces such that they will magnetically mate, or couple. The magnetic coupling inserts 250 and the insert of the base plate 238 may be configured to form a magnetic mating (or coupling) that will break away (or release) in case of a collision, thereby limiting damage to the sorting system 100.

In addition, to securely and stably connect the nozzle head plate 244 to the carriage 234 in a fixed position, the example base plate 238 of the carriage 234 and the example nozzle head plate 244 further include locating pins 252 (only one is visible in FIG. 11) that securely mate with receiving wells 254 formed in the opposing carriage base plate 238 and nozzle head plate 244. More particularly, when the nozzle head plate 244 is mounted to the base plate 238 of the carriage 234, as described above, the locating pins 252 securely mate with the receiving wells 254 to maintain the nozzle head plate 244 and the base plate 238 in a fixed position and orientation with respect to each other.

The pneumatic supply assembly 224 of the extraction assembly 220 is connected to a vacuum source (e.g., the same vacuum source to which the conduit of the de-lidding assembly 204 connects, or a different vacuum source, etc.), and includes multiple regulators 226 coupled thereto. Each of the regulators 226, then, is connected to one of the vacuum nozzles 230 (at an upper end portion of the nozzle 230, as viewed in FIG. 11, via a conduit and a quick coupling fixture, etc. (not shown)). In connection therewith, the pneumatic supply assembly 224 is configured to provide a vacuum from the vacuum source to the plurality of regulators 226 and, in turn, to one or more selected vacuum nozzles 230. As such, each regulator 226 is configured to activate the corresponding vacuum nozzle 230, such that a controlled vacuum may be provided at a selected vacuum nozzle 230, in order to extract a particular seed from a desired well of the tray 118 (when removed from the docked cart 116). In the illustrated embodiment, the pneumatic supply assembly 224 includes twenty-four regulators 226 corresponding to the twenty-four vacuum nozzles 230 (i.e., one regulator 226 for each vacuum nozzle 230). However, this is not required in all embodiments (e.g., one regulator may be connected to multiple vacuum nozzles, etc.).

In particular, the regulators 226 are configured to regulate vacuum pressure signals communicated, via vacuum lines, to a tip 232 of each respective vacuum nozzle 230. More particularly, a vacuum may be selectively provided to the tips 232 of selected vacuum nozzles 230 to extract (i.e., remove) one or more selected seeds from the removed tray 118. Once the selected seed(s) have been extracted, the regulators 226 are operable to maintain the vacuum at the respective nozzle tips 232 such that the extracted seed(s) are retained on the respective tips 232 while the nozzle head assembly 236 is moved, via the carriage transporter 222, from the pick zone 190 of the tray subsystem 104 to the drop zone 228 of the collection subsystem 112. The regulators 226 are then operable to discontinue the vacuum at the tips 232 of the selected vacuum nozzles 230, in order to release the seeds retained thereby, whereby the extracted seeds may deposited into selected receptacles of the receiving fixture 128 via the corresponding one of the funnel assemblies 130.

In addition, in one or more embodiments, the vacuum source that supplies the vacuum (i.e., a negative air pressure) to the pneumatic supply assembly may be selectively reversed (e.g., for a limited time period, etc.) in order to supply a positive air pressure (e.g., a pulsed positive air pressure, etc.) at the tips 232 of the vacuum nozzles 230 (broadly, seed release air). In this manner, any seeds retained at the tips 232 of selected vacuum nozzles 230 may be forcibly released by the seed release air. A positive air pressure may also be digitally controlled (e.g., in response to a user selection, etc.), thereby allowing the air pressure to serve a "clean out" function, whereby high positive air pressure may remove any debris that may be present in vacuum tips 232, vacuum nozzles 230, and/or vacuum lines.

Further, in one or more embodiments, each nozzle tip 232 may be customized to optimize handling of each seed as it is extracted from the tray 118 and deposited in the selected receptacle. For example, each nozzle tip 232 may be structured or formed to accommodate the shape of the wells 122 of the tray 118 removed from the cart 116. For instance, if the wells 122 have a shallow, rounded, concave shape, each nozzle tip 232 may be structured or formed to have wider rounded convex shape such that each nozzle tip 232 operates more efficiently when extracting a seed from the wells 122. Alternatively, if the wells 122 have a deeper, cylindrical, flat bottom shape, each nozzle tip 232 may be structured or formed to have narrow, cylindrical shape with a flat distal end such that each nozzle tip 232 operates more efficiently when extracting a seed from the wells 122.

Additionally, in one or more embodiments, each nozzle tip 232 may include a screen-like device having a plurality of openings spaced apart such that the seeds can be extracted without damaging the seed. Each nozzle tip 232 also includes a spring (or other configuration or other resilient feature) that is configured to be automatically vertically and/or horizontally adjusted within the nozzle tip 232 (such that the tip 232 is generally adjustable in multiple directions (e.g., such that the tip is not rigid, etc.)), thereby allowing seeds with a wide range of thicknesses to be picked up and retained by each nozzle tip 232 at the same time without damage to the seeds, nozzle tips 232, or other components of the sorting system 100. For instance, each nozzle tip 232 may include an accordion-type spring construction whereby the nozzle tip 232 is capable of collapsing or deforming in a vertical direction (upon encountering a certain resistance, etc.) and/or deforming in a horizontal direction to enable slight movement of the nozzle tip 232 in picking different objects of different sizes (and to also allow generally self-centering of the nozzle tip 232 into the wells 122 to help ensure successful extraction of an object). Furthermore, in one or more embodiments, each nozzle tip 232 may be interchangeable to meet the handling preferences or requirements of various different seeds or characteristics of various different wells or trays.

In one or more embodiments, each nozzle 230 may additionally, or alternatively, include and/or be configured with a spring, whereby the nozzle 230 (including the tip 232) is capable of moving (or adjusting) in a vertical direction (upon encountering a certain resistance, etc.) to enable movement of the nozzle 230 itself in picking different objects of different sizes (e.g., movement of about 0.5 inches, movement of less than about 0.5 inches, movement of greater than about 0.5 inches, etc.). In one or more embodiments, the spring of each nozzle 230 may be configured to allow the nozzle 230 (and nozzle tip 232) to move up and down in a vertical direction a much larger distance than allowed by the spring feature included in the nozzle tip 232.

Moreover, the extraction subsystem 108 is further configured to move the transfer assemblies 218 and the extraction assemblies 220 bi-directionally along the Z-axis. In this manner, the extraction subsystem 108 may raise and/or lower the vacuum nozzles 230 along the Z-axis for extraction of the one or more selected seeds from the removed tray 118 and/or for release of the one or more seeds into the funnel assemblies 130 of the collection subsystem 112 as needed.

Referring now to FIG. 15, the collection subsystem 112 of the system 100 generally includes a loading zone 262, in which the receiving fixture 128 is positioned into the system 100, and the drop zone 228, in which the extraction subsystem 108 is configured to release the selected seed(s) extracted from the removed tray 118. The collection subsystem 112 also includes a translation assembly 264 extending between the loading zone 262 and the drop zone 228, and configured to move the receiving fixture 128 from the loading zone 262 to the drop zone 228 (and vice versa). The loading zone 262 includes a loading door 266 (FIGS. 1-4) configured to be moved (e.g., manually, automatically, etc.) between an open and closed position. When the loading door 266 is in the open position, the receiving fixture 128 may be loaded onto and received by a stage 268 (e.g., via releasable clips, etc.) of the translation assembly 264, whereby the translation assembly 264 is configured to bi-directionally move the stage 268 (and, thus, the receiving fixture 128 disposed thereon) along the Y-axis between the loading zone 262 and the drop zone 228. With that said, in one or more other embodiments, the receiving fixture 128 may be fixed to the translation assembly 264 (e.g., via the stage 268). In addition, the illustrated loading door 266 also includes (or is associated with) a safety interlock unit 267 (e.g., one or more sensors, etc.) (FIG. 1) configured to sense whether the loading door 266 is open or closed and to communicate one or more signals to the control system 114 indicating whether the loading door 266 is open or closed. For example, when the sorting system 100 is in operation (e.g., extracting or releasing seeds, etc.) and receives the signal indicating the loading door 266 is open, the control system 114 may be configured to halt operation of the sorting system 100.

With additional reference to FIG. 12, the receiving fixture 128 generally includes a plurality of receptacles (e.g., wells, containers, bulk containers, tubes, cups, boxes, etc.), with each receptacle structured to receive and accommodate one or more seeds (i.e., a single seed per receptacle (e.g., per well, etc.) or multiple seeds per receptacle (e.g., per bulk container)) extracted from the trays 118 and released at the drop zone 228 of the collection subsystem 112. More particularly, in the illustrated embodiment, the receiving fixture 128 includes a plurality of trays 270 and a plurality of bulk containers 272. The example containers 272 may include envelopes or packets, where each envelope or packet is structured to accommodate seeds in bulk. Each tray 270 also includes a plurality of wells 274 each structure to accommodate a single seed.

The receiving fixture 128 also includes a base 276, a platform 282, and a plurality of supports 278, 280 fixed between the base 276 and the platform 282, thereby supporting the platform 282 above the base 276. The platform 282, then, is generally defined by panels 284 positioned over the containers 272, and a stage removably supporting the trays 270. Each panel 284 includes a plurality of openings and a plurality of tubes fixed to the openings, where each opening and corresponding tube align with and extend generally into a corresponding one of the containers 272 (where the containers 272 are positioned in corresponding ones of slots defined below the panel 284). As such, when the containers 272 are positioned in the slots of the receiving fixture 128, an opening of the container 272 may be disposed around the tube of the corresponding panel 284 and then a bottom of the container 272 may be inserted into the slot (whereby the container 272 is generally retained in the receiving fixture 128).

Notwithstanding the above, in one or more other embodiments, the receiving fixture 128 may be any fixture structured to be retained (e.g., removably retained, etc.) within the collection subsystem 112 and to provide or receive a plurality of receptacles having any desired form or structure. In such embodiments, the receiving fixture 128 may include any fixture structured to retain a plurality of the receptacles for collecting seeds. Additionally, in such embodiments, the receptacles may be any type of devices, apparatus or structures suitable for receiving extracted seeds. The receptacles may include envelopes, containers, tubes, cups, boxes, reservoirs, or any other vessel suitable for receiving and retaining the extracted seeds. For example, one or more of the trays 270 may include a multi-reservoir planter-ready tray. In such embodiments, the tray(s) may include a plurality of plant-ready cups or reservoirs included in, formed in, or disposed in the multi-reservoir indexing tray. Each plant-ready cup or reservoir may include soil or other organic compound suitable and ready for planting seeds. As another example, the receptacles may include one or more discard cans structured to receive selected extracted seeds. In this manner, some the seeds within a tray 118 removed from a docked cart 116 may be sorted for further use (e.g., planting), whereas others may be sorted into the discard cans to be disposed.

With continued reference to FIGS. 12 and 15, each container 272 and each tray 270 includes a receptacle tag 289 (e.g., similar to information device 200, etc.). Each receptacle tag 289 may be affixed to the respective container 272 or tray 270 and include various information and data regarding or pertaining to, the respective receptacles (i.e., the respective container 272 or the respective wells 274 of the respective tray 270). For example, the information and data for each receptacle tag 289 may include identification information for each receptacle within the receiving fixture 128 (e.g., within the respective tray 270, for the respective container 272, etc.). Each receptacle tag 289 may include any machine-readable identification device, label or tag suitable for containing or storing information and data, readable or retrievable by a reader communicatively connected to the control system 114, regarding or pertaining to the respective receptacles (e.g., a RFID tag, a bar code, etc.).

The collection subsystem 112, then, includes receptacle tag readers 291 communicatively connected to the control system 114. Each receptacle tag reader 291 may include any device suitable for reading the receptacle tags 289 and communicating the receptacle data (e.g., the identification and location information described above, etc.) to the control system 114, which may then store data as receptacle data for use during execution of one or more seed extraction and delivery subroutines, as described in greater detail below. For example, in one or more embodiments, the receptacle tag readers 291 may each include a device configured to read a two-dimensional matrix code or other machine-readable label, tag or device, such as an RFID tag reader or a bar code label reader, etc. In this manner, when the receiving fixture 128 (and/or trays 270 and/or containers 272) are loaded into the collection subsystem 112, the control system 114 may communicate with and control the receptacle tag readers 291 to read each receptacle tag 289 and receive the information thereby provided.

As generally described above, then, the stage 268 of the translation assembly 264 of the collection subsystem 112 is structured to removably retain the receiving fixture 128 when the receiving fixture 128 is loaded thereon. In this manner, the translation assembly 264 may be operated to bi-directionally move the receiving fixture 128 along the Y-axis between the loading zone 262 and the drop zone 228.

The drop zone 228 of the collection subsystem 112 includes the funnel assemblies 130, which are structured and disposed such that seeds released by the nozzle head assemblies 236 of the extraction subsystem 108 are directed into the receiving fixture 128, when the receiving fixture 128 is positioned, by the translation assembly 264 of the collection subsystem 112, in the drop zone 228 under the funnel assemblies 130. The funnel assemblies 130 are each fixedly mounted to the structure of the sorting system 100 apart from the receiving fixture 128, whereby the tips 232 of the vacuum nozzles 230 of the extraction assembly 220 and/or the receiving fixture 128 may be positioned relative to the funnel assemblies 130 to release the selected seeds extracted from the removed tray 118 into the funnel assemblies 130, such that the seeds may be directed by the funnel assemblies 130 into selected receptacles of the receiving fixture 128. In connection therewith, each of the funnel assemblies 130 generally corresponds to a different one of the opposing extraction assemblies 220, such that each of the extraction assemblies 220 is generally operable to release seeds into the corresponding one of the funnel assemblies 130.

Each of the funnel assemblies 130 includes a funnel fixture 296 defining a plurality of funnels. More specifically, each funnel fixture 296 includes twelve well funnels 298 and two bulk container funnels 300 disposed at known, fixed locations within the funnel fixture 296 and, more broadly, the collection subsystem 112. Each well funnel 298 is structured, operable, and disposed within the funnel fixture 298, to direct one or more seeds deposited therein by the extraction assembly 220 to selected wells 274 of selected trays 270 of the receiving fixture 128, when the selected wells 274 are aligned, by the translation assembly 264 of the collection subsystem 112, directly beneath the well funnel 298. Similarly, each bulk container funnel 300 is structured, operable, and disposed within the funnel fixture 296 to direct one or more seeds deposited therein by one or more vacuum nozzles 230 to selected bulk containers 272 of the receiving fixture 128 (via the respective orifices defined in the panels 284), when the selected orifices are aligned, by the translation assembly 264 of the collection subsystem 112, directly beneath the bulk container funnel 300. With that said, in one or more other embodiments, the funnel fixture 296 may be structured differently, for example, to include different types, numbers, and/or arrangements of funnels.

The funnels 298 and 300 of the funnel fixture 296 each includes a gating mechanism 301 that is operable, under the control of the control system 114, to stage delivery of one or more seeds into the plurality of receptacles of the receiving fixture 128. In connection therewith, the gating mechanism 301 for each funnel 298, 300 includes a gate that is independently operable, under the control of the control system 114, to move between an open and closed position.

When the gate is in a closed position, any seed(s) released into the funnel 298, 300 by the vacuum nozzles 230 of the extraction assembly 220 are retained within the funnel 298, 300. When the gating mechanism 301 is operated, under the control of the control system 114, to move the gate to an open position (or keep the gate in an open position), any seed(s) retained within the funnel 298, 300 or deposited into the funnel 298, 300 are released from the funnel 298, 300. In this manner, one or more seeds may be "staged" within each funnel 298, 300, whereby multiple seeds destined for different receptacles of the receiving fixture 128 may be released by the vacuum nozzles 230 of the extraction assembly 220 into the funnels 298, 300 and "staged" for release into the intended receptacles, in order to facilitate efficient collection and distribution of selected seeds extracted from the tray 118 removed from the docked cart 116.

As an example, one or more vacuum nozzles 230 of the extraction subsystem 108 may be operated, in coordination with the translation assembly 264 of the collection subsystem 112 and with the gating mechanism 301 of a first funnel 298, 300 to release a first set of one or more selected seeds into the first funnel 298, 300 (e.g., when the corresponding closed, etc.), and to subsequently release a second set of one or more selected seeds into a second funnel 298, 300 (e.g., when the corresponding gate is closed, etc.). The gating mechanism 301 of the first funnel 298, 300 may then be operated, in coordination with the translation assembly 264 of the collection subsystem 112 to open the corresponding gate of the first funnel 298, 300 and release the one or more selected seeds retained within the first funnel 298, 300 into a selected receptacle of the receiving fixture 128 (e.g., into a selected bulk container 272 or a selected well 274 of a selected tray 270, etc.). The gating mechanism 301 of the second funnel 298, 300 may then be operated, in coordination with the translation assembly 264 of the collection subsystem 112 to open the corresponding gate of the second funnel 298, 300 and release the selected one or more seeds retained within the second funnel 298, 300 into another given receptacle of the receiving fixture 128.

Further, a width of each funnel 298, 300 (i.e., along the Y-axis) is approximately equal to a width of the array of vacuum nozzles 230 of the corresponding extraction assembly 220 that is operable along the X-axis (FIG. 4), such that any particular vacuum nozzle 230 in the array is operable, under the control of the control system 114, to release a seed retained by the tip 232 thereof into any one of the funnels 298, 300 of the correspond funnel fixture 296, without the need to movably position the array of the vacuum nozzles 230, or the funnel fixture 296 along the Y-axis to align with the vacuum nozzles 230 in the array.

For illustrative purposes, each funnel assembly 130 in FIG. 15 may include well funnels 298 numbered 1-12. Well funnel numbers 1-6, then, are structured and disposed such that the gating mechanisms 301 thereof may release seeds into staggered well numbers 1-6 of any two adjacent columns of any one of the trays 270 (numbered 1-8) in the receiving fixture 128 (e.g., well one of column one of tray number 1, well two of column two of tray number 1, well three of column one of tray number 1, etc.), when said columns are disposed along the Y-axis, by operation of the translation assembly 264, in alignment with (i.e., directly beneath) well funnel numbers 1-6. Well funnel numbers 7-12 are similarly structured and disposed, with regard to the trays 270 numbered 9-16 in the receiving fixture 128. In this manner, where an array of vacuum nozzles 230 is operated to extract and retain twenty-four selected seeds from a removed tray 118, the array may be operated in coordination with the gating mechanisms 301 of the funnels 298, 300 of the corresponding funnel fixture 296, to release, in any particular order, twelve of the seeds into the funnels 298, 300, whereby the seeds are retained by the gating mechanism 301 within the funnels 298, 300 of the funnel fixture 296. In turn, the translation assembly 264 of the collection subsystem 112 may be operated, in coordination with the gating mechanisms 301 of the well funnels 298, 300 of the funnel fixture 296, to position selected wells 274 of selected trays 270 of the receiving fixture 128 for receipt of selected seeds retained by the gating mechanisms 301 within the selected well funnels 298, 300.

With that said, while the above example is described in relation to particular quantities and arrangements of vacuum nozzles, funnels (e.g., well funnels), gating mechanisms, trays, and receptacles (e.g., wells), it should be appreciated that the present disclosure is not limited to such quantities and arrangements. It should also be appreciated that operation of the extraction subsystem, vacuum nozzles, gating mechanisms, and translation assembly of the collection subsystem is not limited to the disposition of seeds into two consecutive columns of receptacles of a particular tray or trays. Rather, the above illustrated example is intended to illustrate a manners by which the receptacles of a receiving fixture may align with funnels of a funnel assembly and by which vacuum nozzles may release seeds into funnels for staged delivery to the receiving fixture.

The collection subsystem 112 may also include one or more digital imaging devices 303 (e.g., cameras, etc.) disposed adjacent the receiving fixture 128 and configured to capture digital image data of the receiving fixture 128 and, in particular, each receptacle of the receiving fixture 128 and communicate the captured image data to the control system 114 (FIG. 15). The control system 114 is configured to then execute a verification algorithm of one or more system control algorithms, programs, routines, or subroutines, to analyze the received image data of the receiving fixture 128 and determine, for each of the selected receptacles, whether the appropriate seeds have been deposited in the correct receptacles (e.g., the correct well 274 of the correct tray 270 and/or the correct bulk container 272 of the correct panel 284, etc.). In connection therewith, the one or more digital imaging devices 303 of the collection subsystem 112 may include any X-ray based, magnetic based, sonic based, light based or laser based imaging device, or any other device suitable for verifying that that the appropriate seeds have been deposited in the selected receptacles of the receiving fixture 128. In various embodiments, this determination may be made by the control system 114 based on, for example, the sorting project selection data described herein and/or a determination by the control system 114, based on the image data received from the verification subsystem 110, of the correct receptacles for receiving the seeds as described herein. In the event that the control system 114 determines that a seed has been deposited into an incorrect receptacle of the receiving fixture or that a selected receptacle does not include a correct seed, the control system 114 may execute a "re-pick" to ensure that the correct seed is deposited into the correct receptacle and/or cause an alert message to be displayed via the presentation unit 406 indicating that there has been an error with the seed deposits.

With reference again to FIGS. 1-4, the collection subsystem 112 includes an auxiliary loading door 302 disposed adjacent the drop zone 228 of the collection subsystem 112. The auxiliary loading door 302 is movable between an open and closed position, whereby the receiving fixture 128 is accessible via the auxiliary loading door 302 when the receiving fixture 128 is disposed by the translation assembly 264 of the collection subsystem 112 in the drop zone 228. In connection therewith, the receiving fixture 128 is accessible (e.g., during operation, or a pause in operation, of the sorting system 100; etc.) via the auxiliary loading door 302 to remove or change out receptacles (e.g., one or more bulk containers 272 or one or more trays 270, etc.). In one or more embodiments, the collection subsystem 112 may include a safety interlock unit (e.g., a sensor, etc. similar to interlock unit 267; etc.) configured to sense whether the auxiliary loading door 302 is in an open or closed position and communicate one or more signals to the control system 114 indicating whether the auxiliary loading door 302 is in an open or closed position. For example, when the sorting system 100 is in operation (e.g., extracting seeds, etc.) and the control system 114 receives one or more signals from the safety interlock unit indicating the auxiliary loading door 302 in an open position, the control system 114 may be configured to send one or more control signals to the sorting system 100 to cause the sorting system 100 to halt operation. As another example, when the sorting system 100 is in operation or paused during operation and the control system 114 receives one or more signals from the safety interlock unit indicating the auxiliary loading door 302 is in an open position (which indicates a potential change in receptacles), the control system 114 may be configured to send one or more control signals to the receptacle tag readers 291 to cause the receptacle tag readers 291 to scan (or begin scanning) the receptacle tags 289.

The collection subsystem 112 may also include one or more receiving fixture sensors. In connection therewith, the receiving fixture sensors may include a packet presence sensor, a bulk panel presence sensor, a tray collision sensor, and/or a tray panel presence sensor. When present, the receiving fixture sensors may be disposed and operable within the collection subsystem 112 to detect appropriate loading of the receiving fixture 128 within the collection subsystem 112. That said, such receiving fixture sensors may be implemented using any one or more of a variety of sensors (e.g., photo electric sensors, contact switches, etc.).

Figure 4:
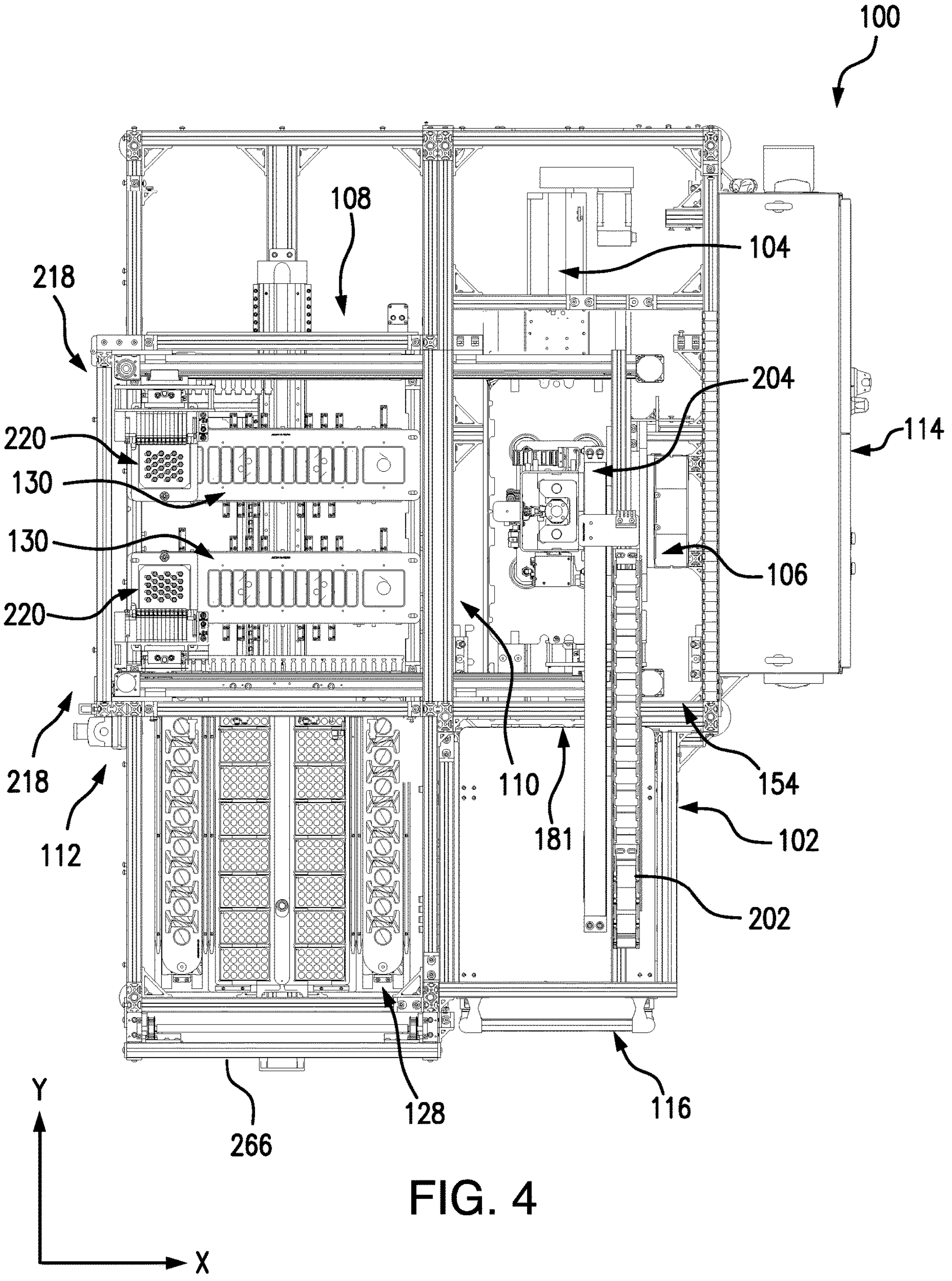
FIG. 4 is an overhead view of the sorting system of FIG. 1.

With reference now to FIGS. 4 and 15, the verification subsystem 110 is generally disposed between the tray subsystem 104 and the drop zone 228 of the collection subsystem 112 and adjacent the extraction subsystem 108, such that the vacuum nozzles 230 of the extraction assemblies 220 pass through or by the verification subsystem 110 when the extraction subsystem 108 is operated to extract selected seeds from a removed tray 118 and move the extraction assemblies 220 from the pick zone 190 of the tray subsystem 104 to the drop zone 228 of the collection subsystem 112, to release the selected seeds into selected receptacles of the receiving fixture 128. In connection therewith, the control system 114 is configured to verify, using the verification subsystem 110, that the vacuum nozzles 230 selected for activation actually extracted seeds from the tray 118 and actually are retaining seeds thereon (e.g., via imaging, etc.). In this manner, the control system 114 may determine that the appropriate seeds are removed from the tray 118. The verification subsystem 110 may include any X-ray based, magnetic based, sonic based, light based or laser based imaging device, or any other device suitable for verifying that each activated vacuum nozzle 230 in fact retains a seed.

The verification subsystem 110 includes an imaging zone 304, having therein a plurality of light sources 306 and two digital imaging devices 308 (e.g. cameras, etc.) disposed generally below the light sources 306 for imaging the array of vacuum nozzles 230 of each extraction assembly 220. In the imaging zone 304, the plurality of light sources 306 are operable to illuminate the tips 232 of the vacuum nozzles 230 in the array (and the seeds retained thereby) when the vacuum nozzles 230 pass over the imaging zone 304. And, the digital imaging devices 308, then, are configured to capture digital image data of the tips 232 of the vacuum nozzles 230 and communicate the captured data to the control system 114.

The control system 114 is configured to then execute a verification algorithm of one or more system control algorithms, programs, routines, or subroutines, to analyze the received image data and determine whether a seed is in fact retained on the tip 232 of each vacuum nozzle 230 selected for activation. For example, utilizing data identifying the location (e.g., Cartesian coordinates, etc.) of each nozzle tip 232 within the array of the nozzle head plate 244, the control system 114 may be configured to analyze the captured image data to determine whether the location of the tip 232 of each vacuum nozzle selected for activation to extract a seed from a tray 118 includes data indicative of the seed. In one or more embodiments, the control system 114 may be configured to further execute a verification algorithm of one or more system control algorithms, programs, routines, or subroutines, to analyze the receive image data and determine a characteristic and/or trait for the seed retained on each tip 232 of the vacuum nozzles 230 selected for activation (e.g., size, shape, color, composition, quality, weight, genetic traits, etc.), and potentially determine a receptacle for receiving the seed based on the determine characteristic and/or trait.

In any case, the image data and/or the determined characteristic and/or trait may be recorded by the control system 114 regardless of the analysis and used for later analysis (e.g., determining germination based on size or shape of a seed, etc.). The control system 114 may also be configured to utilize the image data in conjunction with previously captured data (e.g., on other upstream systems) to verify that the imaged seed(s) is correct. For example, if a seed separates from its shell, the image data metrics may be inconsistent with previously recorded values. This inconsistency may then trigger a "re-pick" to ensure that the seed itself (and not just the shell) is retrieved. The control system 114 may also be configured to utilize the image data to identify any handling errors where the seed(s) ended up in a well 122 of a tray 118 for which the seed was not intended.

In one or more embodiments, if the image data of the location of any of the nozzle tips 232 activated to extract a seed indicates that a seed is not retained on the tip 232 (e.g., that a seed was missed or not present in the well 122 to being with, etc.), the sorting system 100 may be operable to deposit the selected seeds that were extracted by nozzle tips 232 into the selected receptacles (e.g., via the funnel assembly 130) as described herein. Then, subsequently, the sorting system 100 may be operable to reattempt to extract the "missed" seed. Reattempting to extract any "missed" seed may be repeated any desirable number of times (e.g., twice, etc.). After the desired number of reattempts, the sorting system 100 may be operable to cease attempting to extract the particular seed if the misses continue (e.g., due to the seed not being present to begin with, etc.).

Subsequently in the system 100, once the desired seeds are removed from the tray 118, the de-lidding subsystem 106 may be operated to replace the lid 120 back on the tray 118, prior to replacing the tray 118 into the docked cart 116 (e.g., when the sorting system 100 does not extract each and every seed in the wells 122 of the removed tray 118, etc.). In connection therewith, the de-lidding subsystem 106 is configured to replace the lid 120 on the tray in a manner that is generally the reverse of the manner by which the lid 120 was removed from the tray 118. And, the handling assembly 172 and the elevator assembly 126 may then be operated to position the rails 170 of the translation assembly 124 along the Z-axis adjacent opposing tray guides 136 of the docked cart 116 (from which the tray 118 was removed) in a desired position and push the tray 118 onto the guides 136, thereby replacing the removed tray 118 back into the docked cart 116 (at a desired position in the cart 116 along the Z-axis).

In one or more embodiments, the extraction subsystem 108 may include one or more digital imaging devices 261 (e.g., cameras, etc.) (FIG. 13) configured to capture digital image data of the tray 118 and, in particular, each well 122 of the tray 118 (before the lid 120 is replaced back on the tray 118 and before the tray 118 is replaced into the docked cart 116) and to communicate the captured image data to the control system 114. The control system 114 is configured to then execute a verification algorithm of one or more system control algorithms, programs, routines, or subroutines, to analyze the received image data of the tray 118 and determine, for each well 122 of the tray 118, whether the well still contains an object. In connection therewith, the one or more digital imaging devices 261 of the extraction subsystem 110 may include any X-ray based, magnetic based, sonic based, light based or laser based imaging device, or any other device suitable for verifying whether any wells 122 of the tray 118 still contain objects. In the event that the control system 114 determines that one or more wells 122 of the tray 118 still contain an object(s), the control system 114 may be configured to send one or more control signals to the sorting system 100 to cause the extraction subsystem 108 to remove the remaining seed(s) from the well(s) 122 of the tray 118 (before the lid 120 is replaced back on the tray 118 and before the tray 118 is replaced into the docked cart 116). In various embodiments, the removal process is generally consistent with the initial seed extraction process described herein and the remaining seed(s) may be deposited into, for example, one or more discard cans of the receiving fixture 128 or elsewhere.

In the sorting system 100, the control system 114 may be considered a computing device consistent with computing device 400 illustrated in FIG. 16. The computing device 400 may include, for example, one or more servers, workstations, personal computers, laptops, tablets, smartphones, PDAs, etc. In addition, the computing device 400 may include a single computing device, or it may include multiple computing devices located in close proximity or distributed over a geographic region, so long as the computing devices are specifically configured to function as described herein. In the sorting system 100, the control system 114 is consistent with the computing device 400, whereby it may be considered as including, or being implemented in, the computing device 400, and whereby it may be coupled to (and in communication with) one or more networks. However, the control system 114 should not be considered to be limited to the computing device 400, as described below, as different computing devices and/or arrangements of computing devices may be used (see, e.g., FIG. 17). In addition, different components and/or arrangements of components may be used in other computing devices.

With that said, the illustrated computing device 400 (as representative of the control system 114, for example) includes a processor 402 and a memory 404 coupled to (and in communication with) the processor 402. The processor 402 is generally configured to execute all functions of the control system 114 to automatically, or robotically, control the operation of the sorting system 100, as described herein. The processor 402 may include one or more processing units (e.g., in a multi-core configuration, etc.). For example, the processor 402 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 404, as described herein, is one or more devices that permit data, instructions, etc. to be stored therein and retrieved therefrom. The memory 404 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 404 may be configured to store, without limitation, software packages or programs, algorithms or subroutines (e.g., algorithms or subroutines to control operation of the sorting system 100 and components thereof as described herein, verification algorithms or subroutines as described herein, etc.), and digital information, data, look-up tables, spreadsheets, and/or databases (e.g., look-up tables, spreadsheets, or databases structured to store sorting project selection data, seed identification data, seed location data, tray identification data, default configuration values, project specific values, etc.), etc., and/or other types of data (and/or data structures) suitable for use as described herein. Furthermore, in various embodiments, computer-executable instructions may be stored in the memory 404 for execution by the processor 402 to cause the processor 402 to perform one or more of the functions described herein, such that the memory 404 is a physical, tangible, and non-transitory computer readable storage media. Such instructions often improve the efficiencies and/or performance of the processor 402 and/or other computer system components configured to perform one or more of the various operations herein. It should be appreciated that the memory 404 may include a variety of different memories, each implemented in one or more of the functions or processes described herein.

In the example embodiment, the computing device 400 also includes a presentation unit 406 that is coupled to (and is in communication with) the processor 402 (however, it should be appreciated that the computing device 400 could include output devices other than the presentation unit 406, etc.). The presentation unit 406 outputs information, data, and/or graphical representations (e.g., alert messages, etc.), visually, for example, to a user of the computing device 400 and/or sorting system 100, etc. And, various interfaces (e.g., as defined by network-based applications, etc.) may be displayed at computing device 400, and in particular at presentation unit 406, to display such information. The presentation unit 406 may include, without limitation, a liquid crystal display (LCD), a light-emitting diode (LED) display, an organic LED (OLED) display, an "electronic ink" display, speakers, etc. In some embodiments, presentation unit 406 includes multiple devices.

In addition, the computing device 400 includes an input device 408 that receives inputs from the user (i.e., user inputs) such as, for example, project specific values, sorting project selection data, etc. The input device 408 may include a single input device or multiple input devices. The input device 408 is coupled to (and is in communication with) the processor 402 and may include, for example, one or more of a keyboard, a pointing device, a mouse, a stylus, a RFID reader, bar code reader, another reader, a touch sensitive panel (e.g., a touch pad or a touch screen, etc.), another computing device, and/or an audio input device. In addition, in various example embodiments, a touch screen, such as that included in a tablet, a smartphone, or similar device, behaves as both a presentation unit and an input device. In one or more embodiments, the computing device 400 may further include a removable media reader (not shown) for reading information and data from and/or writing information and data to removable electronic storage media such as floppy disks, compact disks, DVD disks, zip disks, flash drives or any other computer readable removable and portable electronic storage media. In one or more embodiments, the removable media reader may include an I/O port utilized to read external or peripheral memory devices such as flash drives or external hard drives.

Further, the illustrated computing device 400 also includes a communication interface coupled to (and in communication with) the processor 402 and the memory 404. In the example computing device 400, the communication interface is a network interface 410, which may include, without limitation, a wired network adapter, a wireless network adapter (e.g., a near field communication (NFC) adapter, a Bluetooth adapter, etc.), an RFID reader, a mobile network adapter, or other device capable of communicating with one or more different networks and/or components of one or more different networks (e.g., cart readers, tray readers, receptacle tag readers, sensors, elevators, regulators, pneumatic supply assemblies, nozzle head elevation systems, actuators, elevators, translation assemblies, transfer assemblies, gating mechanisms, etc.).

For example, in one or more embodiments, the computing device 400 (e.g., the processor 402, etc.) may be communicatively connectable, via the network interface 410, to a remote server network (e.g., a local area network (LAN), etc.), via a wired or wireless link. In this manner, the computing device 400 may communicate with the remote server network to upload and/or download data, information, algorithms, software programs, and/or receive operational commands (e.g., for operation of the sorting system 100, etc.). In addition, in one or more embodiments, the computing device 400 may be configured to access the Internet to upload and/or download data, information, algorithms, software programs, etc., to and from Internet sites and network server In one or more embodiments, the computing device 400 may include one or more system control algorithms, programs, routines, or subroutines, or programs stored in the memory 404 and executed by the processor 402. The one or more system control algorithms, programs, routines, or subroutines may include instructions to utilize the seed selection data and receptacle data input to the control system 114 prior to initiation of the operation of the sorting system 100, the seed identification data acquired by the tray reader 186, and other inputs from various components and sensors of the various systems, subsystems, and assemblies of the sorting system 100 to automatically operate the sorting system 100 as described herein.

The control system 114, as implemented in the computing device 400, executes one or more sorting system control algorithms (i.e., computer executable instructions) to control operation of the sorting system 100 to automatically sort seeds from trays 118 of the cart 116 into the receiving fixture 128, as described herein. In connection therewith, the control system 114 is described below as executing the one or more sorting system control algorithms to control operation of the sorting system 100 to automatically sort seeds.

When the sorting system 100 is powered on (e.g., via a switch, via the input device 408 of the control system 114, etc.), the control system 114 executes one or more sorting system control algorithms to initialize the sorting system 100 (broadly, executes an initialization routine). In the initialization routine, the control system 114 is configured to set default values for the sorting system 100, for example, based on default configuration values stored in memory 404 of the control system 114. In one or more embodiments, the default configuration values may include, for example, default values related to the air pressure of the sorting system 100 and/or default values related to the operation of the tray subsystem 104, the extraction subsystem 108, and/or the collection subsystem 112.

Default air pressure values may include, for example, default air pressure required for one or more air sources for the sorting system 100. Such sources may include the one or more vacuum sources input to the pneumatic supply assembly 206 of the de-lidding assembly 204 and/or the pneumatic supply assembly 224 of each extraction assembly 220 and/or one or more air sources for operation of any pneumatically controlled positioning systems (e.g., for the translation assembly 124 of the tray subsystem 104; the lid translation assembly 202 of the de-lidding subsystem 106; the transfer assembly 218 of the extraction subsystem 108 (e.g., for the carriage transporters 222 and/or the nozzle head elevation systems, etc.); the translation assembly 264 of the collection subsystem 112; and/or the linear actuator 208 of the de-lidding subsystem 106, in one or more embodiments where the foregoing components are pneumatically controlled; etc.).

Default tray subsystem values may include, for example, default velocity, acceleration, deceleration, and/or jerk of the elevator 194, which, as described above, is operable to raise and/or lower a removed tray 118 along the Z-axis. Default tray subsystem values may additionally, or alternatively, include default velocity, acceleration, deceleration, and/or jerk of the handling assembly 172 of the tray subsystem 104, which, as described above, is operable to bi-directionally move a removed tray 118 along the Y-axis.

Default tray subsystem values may further include default tray handling values, such as a default tray reader offset value, a handling bar Z-axis calibration distance, and/or a default handling bar collision sensor distance. In general, the tray reader offset value is the offset along the Y-axis from the handling bar collision sensor 158 to put the handling bar 178 of the handling assembly 172 in a position for the tray reader 186 to read the information device 200 of each tray 118 in the docked cart 116 (e.g., so that the tray reader 186 does not trigger the handling bar collision sensor 158, etc.). The handling bar Z-axis calibration distance is the distance along the Z-axis between an edge of the handling bar calibration plate, as described above, and the handling bar calibration sensor 184 (e.g., for enabling removal of the tray 118 from the cart 116, etc.). And, the handling bar collision sensor distance is the distance along the Y-axis between the face of the calibration plate (i.e., the surface of the plate facing the docking station 102) and the handling bar calibration sensor (e.g., for enabling removal of the tray 118 from the cart 116, etc.).

Default extraction subsystem values may include, for example, default velocity, acceleration, deceleration, and/or jerk of the carriages 234 (and, thus, the extraction assemblies 220 and nozzle head assemblies 236) of the extraction subsystem 108, which, as described above, are operable to bi-directionally move the extraction assemblies 220 along the X-axis. Default extraction subsystem values may additionally, or alternatively, include default velocity, acceleration, deceleration, and/or jerk of the extraction subsystem 108 (e.g., a vacuum nozzle elevation position system thereof, etc.) to bi-directionally raise and lower the vacuum nozzles 230 along the Z-axis. It should be appreciated that such values may be set to apply for all carriages 234 and position systems or, instead, may be set individually for each carriage 234 and position system.

Default collection subsystem values may include, for example, default velocity, acceleration, deceleration, and/or jerk of the stage 268 for the receiving fixture 128 of the collection subsystem 112, which, as described above, is operable to bi-directionally move the receiving fixture 128 along the Y-axis.

With continued reference to the initialization routine, the control system 114 is also configured to receive a signal from the sorting system 100 and, in particular, the cart sensor, indicating whether the cart 116 has been inserted into the docking station 102. When the control system 114 receives a signal indicating that the cart 116 has been inserted into the docking station, the control system 114 executes one or more sorting system control algorithms to cause the docking station 102 to retain the cart 116 in the docking station 102 and to determine that the cart 116 is actually retained (or latched) in the docking station 102 (broadly, a docking subroutine). In particular, when the control system 114 receives a signal via the cart sensor indicating that the cart 116 has been inserted into the docking station 102, the control system 114 is configured to send (e.g., via the network interface 410, etc.) one or more control signals to the sorting system 100 and, in particular, the electromagnets 181 of the docking station 102, to cause the electromagnets 181 to turn on, in order to removably retain (i.e., dock) the cart 116 within the docking station 102, as described above. Conversely, when the control system 114 does not receive a signal indicating that the cart 116 has been inserted into the docking station, the control system 114 is configured to cause the presentation unit 406 to display (or sound) an alert message to a user to dock the cart 116 in the docking station 102.

With that said, in one or more instances of the docking subroutine, even where the cart 116 has been inserted into the docking station 102 (thereby triggering the cart sensor) and the electromagnets 181 have been turned on, the cart 116 may not be actually latched to the docking station 102. In such instances, the control system 114 is configured to determine whether the electromagnets 181 have actually latched the cart 116 to the docking station 102. When the electromagnets 181 have not latched the cart 116 to the docking station 102, the control system 114 is configured to cause the presentation unit 406 to display an alert message to re-dock the cart 116 in the docking station 102. When the control system 114 determines that the cart 116 is actually docked in the docking station 102 (e.g., based on the cart sensor, etc.), the control system 114 is configured to end the docking subroutine.

Next in the initialization routine, when the control system 114 determines that that the cart is actually docked in the docking station 102 and ends the docking subroutine, the control system 114 is configured to execute a safety subroutine. In connection therewith, the control system 114 is configured to determine whether one or more signals received from the safety interlock unit 267 for the loading door 266 and the safety interlock unit for the auxiliary loading door 302 indicate that the loading door 266 and the auxiliary loading door 302 are in a closed position. If the signals received from the loading door sensor and/or the auxiliary loading door sensor indicate that either door 266, 302 is in the open position, the control system 114 is configured to cause an alert message to be displayed via the presentation unit 406 to ensure that the loading door 266 and the auxiliary loading door 302 are in a closed position and to reset a safety mechanism, for example, of the sorting system 100. When the safety mechanism is reset and the loading door 266 and the auxiliary loading door 302 are in the closed position, the control system 114 is configured to end the safety subroutine.

After the safety mechanism is reset and the loading door 266 and the auxiliary loading door 302 are in the closed position, the control system 114 is configured to execute a system enablement subroutine. In connection therewith, the control system 114 is configured to turn on the one or more vacuum sources (e.g., the one or more vacuum sources connected to the pneumatic supply assembly 206 of the de-lidding subsystem 106 and the pneumatic supply assembly 224 of the extraction subsystem 108, etc.). The control system 114 is also configured to enable the various components that drive the sorting system 100 (e.g., the translation assembly 124 and elevator 194 of the tray subsystem 104; the lid translation assembly 202 and the linear actuator 208 of the de-lidding subsystem 106; the transfer assembly 218 and nozzle head elevation system of the extraction subsystem 108; and the translation assembly 264 of the collection subsystem 112; etc.). When the one or more vacuum sources are turned on and the drive components are enabled, the control system 114 is configured to end the system enablement subroutine.

Continuing with the initialization routine, when the system enablement subroutine is ended, the control system 114 is configured to execute a system check subroutine. In connection therewith, the control system 114 is configured to determine whether one or more signals received from the tray collision sensor 160 of the tray subsystem 104 indicate that the tray collision sensor 160 has been triggered. When the tray collision sensor 160 has been triggered, the control system 114 is configured to cause the presentation unit 406 to display an alert indicating that a tray has collided in (or unacceptably extended into) a region of the docking station 102 and instructing to re-dock the cart 116 in the docking station 102 and/or reinsert the tray to the cart 116. When the tray collision sensor 160 has not been triggered, the control system 114 is configured to determine whether one or more signals received from the handling bar collision sensor 158 of the docking station 102 indicate that that the handling bar collision sensor 158 been triggered. When the handling bar collision sensor 158 has been triggered, the control system 114 is configured to cause the presentation unit 406 to display an alert indicating that a handling bar collision has occurred in a region and instructing to re-dock the cart 116, etc.

In addition, when the tray collision sensor 160 of the tray subsystem 104 has not been triggered, the control system 114 is configured to determine whether one or more signals received from the tray collision sensor of the collection subsystem 112 indicate that the tray collision sensor of the collection subsystem 112 has been triggered. When the tray collision sensor of the collection subsystem 112 has been triggered, the control system 114 is configured to cause the presentation unit 406 to display an alert indicating that a collision of the of a tray 270 of the receiving fixture 128 has been detected and instructing to remediate the collision and then re-load the receiving fixture 128 (and/or trays 118 and/or containers 272). When the tray collision sensor of the collection subsystem 112 has not been triggered, the control system 114 is configured to determine whether the air pressure (e.g., the air pressure set in the initialization routine based on the default configuration value, etc.) of the vacuum sources is correct and, in particular, within one or more limits. When the air pressure is not correct, the control system 114 is configured to cause the presentation unit 406 to display an alert indicating that the air pressure is outside of limits and instructing to correct the issue or alert a technician. When the air pressure is correct, the control system 114 is configured to end the system check subroutine.

Also in the initialization routine, when the system check subroutine is ended, the control system is configured to execute a homing subroutine. In connection therewith, the control system 114 is configured to execute the homing subroutine with respect to the tray subsystem 104 and the collection subsystem 112. With regard to the tray subsystem 104, the control system 114 is configured to home the handling assembly 172 of the tray subsystem 104 along the Z-axis and, in particular, to send one or more control signals to the elevator 194 to cause the elevator 194 (and, thus, the handling assembly 172) to descend (or, potentially rise) to a height that is approximately the height of the lowest tray 118 in the docked cart 116. After homing the handling assembly 172 along the Z-axis, the control system is configured to home the handling assembly 172 along the Y-axis. In connection therewith, the control system 114 is configured to send one or more control signals to the translation assembly 124 to cause the handling assembly to move along the Y-axis in a direction away from the docked cart 116, such that the handling bar 178 is a sufficient distance from the docked cart 116 so as to not interfere or contact the docked cart 116 or any trays 118 therein.

Concurrently with homing of the handling assembly 172 along the Y-axis, the control system 114 is configured to home the de-lidding assembly 204 of the de-lidding subsystem 106 and the extraction assembly 220 of the extraction subsystem 108. In connection therewith, the control system 114 is configured to send one or more control signals to the de-lidding subsystem 106 and, in particular, the linear actuator 208 of the de-lidding assembly 204, to cause the linear actuator 208 to raise the cup head 210 along the Z-axis (e.g., such that the cup head 210 is disposed at a height sufficient to allow selected trays 118 to be removed from the docked cart 116, etc.). The control system 114 is then configured to send one or more control signals to the extraction subsystem 108 and, in particular, the vacuum nozzle elevation systems, to raise, as necessary, the transfer assemblies 218 of the extraction subsystem 108, the carriage transporters 222, the extraction assemblies 220, the carriages 234, the nozzle head assemblies 236 (and, thus, the vacuum nozzles 230), the nozzle head plates 244, and/or the vacuum nozzles 230 along the Z-axis, such that the vacuum nozzles 230 are disposed at a height sufficient to allow any of the selected trays 118 to be removed from the docked cart 116. The control system 114, then, is configured to confirm that the linear actuators have raised the cup head 210 and the vacuum nozzles 230 as necessary and/or intended (e.g., based on one or more the sensors described herein in communication with the control system 114, other sensors in the system 100, etc.). When the cup head 210 and the vacuum nozzles 230 have not been raised as necessary and/or intended, the control system 114 is configured to cause the presentation unit 406 to display an alert instructing to check the linear actuator 208 of the de-lidding assembly 204 and/or the vacuum nozzles 230 for interference and alert a technician. When the cup head 210 and the vacuum nozzles 230 have been raised as necessary and/or intended, the control system 114 is configured to then home the extraction assemblies 220 of the tray subsystem along the X-axis.

Concurrently with homing the tray subsystem 104, the de-lidding subsystem 106, and the extraction subsystem 108, the control system 114 is configured to execute the homing subroutine with respect to the collection subsystem 112. In connection therewith, the control system 114 is configured to send one or more control signals to the collection subsystem 112 and, in particular, the translation assembly 264 of the collection subsystem 112, to cause the stage 268 of the translation assembly 264 (where the receiving fixture 128 may be loaded) to move along the Y-axis toward and into the loading zone 262 of the collection subsystem 112.

When homing of the tray subsystem 104, the de-lidding subsystem 106, the extraction subsystem 108, and the collection subsystem 112 is complete, the control system 114 is configured to determine whether the homing subroutine was successful (e.g., based on one or more sensors, etc.). When the homing subroutine is not successful, the control system 114 is configured to cause the presentation unit 406 to display an alert indicating that homing failed and instructing to alert a technician. When the homing subroutine is successful, the control system 114 is configured to end the homing subroutine.

With continued reference to the initialization routine, after the homing subroutine has ended, the control system 114 is configured to execute a system calibration subroutine to calibrate the sorting system 100 and various components thereof and to determine whether the calibration subroutine was successful (e.g., based on one or more sensors, etc.). When the system calibration subroutine is successful, the control system 114 is configured to end the system calibration subroutine and, in turn, the initialization subroutine, thereby initializing the sorting system 100 to run.

After the sorting system is initialized, the control system 114 is configured execute a run routine. In connection therewith, the control system 114 causes the presentation unit 406 to display an alert instructing to ensure that the cart 116 is docked and that the receive fixture 128 is loaded in the collection subsystem 112. A user of the sorting system 100 may then dock the cart 116 and/or load the receiving fixture 128 in the collection subsystem 112 (e.g., via the loading door 266, etc.), if the cart 116 is not already docked and/or the receiving fixture 128 is not already loaded. In any event, the control system 114 is then configured, in the run routine, to determine whether the cart 116 is docked and whether the receiving fixture 128 is loaded in the collection subsystem 112. To determine whether the cart 116 is docked, the control system 114 may be configured to execute one or more parts of the docking subroutine describe above. To determine whether the receiving fixture 128 is loaded (and/or trays 118 and/or containers 272 thereof), the control system 114 may be configured to determine whether one or more signals received from the collection subsystem 112 and, in particular, from one or more receiving fixture sensors (e.g., the packet presence sensor, the bulk panel presence sensor, the tray collision sensor, and/or the tray panel presence sensor, etc.) indicate that the receiving fixture 128 (and/or trays 118 and/or containers 272 thereof) is loaded within the collection subsystem 112.

When the cart 116 is docked and the receiving fixture 128 (and/or trays 118 and/or containers 272 thereof) is loaded within the collection subsystem 112, the control system 114 may be configured to send one or more control signals to the sorting system 100 and, in particular, the tray subsystem 104 and, in particular, the tray reader 186 of the tray subsystem 104, to cause the tray reader 186 read the information and data from the information device 200 of each tray 118 and/or to cause the tray presence sensor 182 to sense whether a tray 118 is present and/or not present within each pair of tray guides 136 (broadly, slots) of the cart 116. It should be appreciated that in order to read the information and data from the information device 200 for each tray 118 and/or sense whether a tray 118 is present and/or not present within each slot of the cart 116, the control system 114 is configured to send one or more control signals to the tray subsystem 104 and, in particular, the elevator 194, to cause the elevator 194 to move (i.e., raise or lower) the translation assembly 124 of the tray subsystem 104 (and, thus, the tray reader 186 mounted to the handling assembly 172) along the Z-axis to read the information device 200 of each tray 118.

It should also be appreciated that the control system 114 may be configured to send one or more control signals to the translation assembly 124, as necessary, to move the handling assembly 172 (and, thus, the tray reader 186) along the Y-axis toward the docking station 102, in order to position the handling assembly 172 (and, thus, the tray reader 186 and/or tray presence sensor 182 mounted thereto) to read the information device 200 of each tray 118 and/or sense whether a tray 118 is present and/or not present within each slot of the cart 116 as the elevator 194 moves (i.e., raises or lowers) the tray reader 186 and/or the tray presence sensor 182 along the Z-axis to scan and/or sense each tray 118 (e.g., from the bottom of the cart 116 to the top of the cart 116, from the top of the cart 116 to the bottom of the cart 116, etc.).

The control system 114, then, may be configured to receive the information and data read by the tray reader 186, which may be acquired by the tray reader 186 from an information device 200 of a single tray 118 (e.g., the bottom tray 118) in the cart 116) (e.g., a coded list identifying each and every one of the trays 118 stored in the cart 116, etc. and coded information identifying each seed within each and every tray 118 stored in the cart 116 and detailing particular attributes of each seed within each and every tray 118 stored in the cart 116; information identifying the location (e.g., Cartesian coordinates) of each seed within trays 118 and, in particular, the location of the wells 122 of each and every tray 118 in which the seeds stored in the trays 118 reside, etc.).

The control system 114 may be configured to process the received information and data read by the tray reader 186 in comparison to the information from the tray presence sensor 182 to determine whether each slot of the cart 116 includes a tray 118 as intended (or does not include a tray 118 as intended). If the a slot of the cart 116 includes a tray 118 but is not supposed to include the tray or does not include a tray but is supposed to include a tray 118 (as determined by the information from the tray presence sensor 182 and from the information device 200), the control system 114 may be configured to detect a fault condition and send one or more control signals to the sorting system 100 to unlock the tray locking mechanism 144 and to cause the presentation unit 406 to alert the user to add the correct tray 118 to the slot of the cart 116 or remove the incorrect tray 118 from the slot of the cart, as appropriate.

Separately, in connection with causing the sorting system 100 to scan the receiving fixture 128, the control system 114 is configured to send one or more control signals to the collection subsystem 112 and, in particular, the receptacle tag readers 291, to cause the receptacle tag readers 291 to read the information and/or data from the receptacle tag 289 (e.g., bar code label, etc.) for (e.g., affixed to, etc.) each tray 270 and/or container 272 of the receiving fixture 128. The control system 114, then, is configured to receive the information and data read by the receptacle tag readers 291 (e.g., identification information for each container 272, tray 270, and/or well 274 of the tray 270, whereby the control system 114 may then assign a location to each container 272, tray 270, and/or well 274 of the tray 270 within the receiving fixture 128 and store the information and data read by the receptacle tag readers 291 and assigned locations as receptacle data (e.g., in a memory 404 of the control system 114, etc.), etc.).

Based on the information and data read by the tray reader 186 from the information device 200 for one or more trays 118 (e.g., the bottom tray 118), as received by the control system 114, as well as the receptacle data, the control system 114 is configured to execute one or more sorting system algorithms to verify the information and data. For example, the control system 114 may be configured to compare tray identification information acquired from the information device 200 for each tray 118 to the information acquired from the information device 156 for the cart 116, to verify that the cart 116 includes the correct trays 118, as well as the correct number of trays 118, stored therein. In addition, to verify the information and data acquired from the receptacle tags 289 (of the trays 270 and containers 272 in the receiving fixture 128), the control system 114 may be configured to similarly compare the information and data received from the receptacle tags 289 to the tray identification information acquired from the information device 200 for each tray 118 and the information acquired from the information device 156 for the cart 116, to ensure the correct trays 270 and containers 272 are loaded.

In one or more embodiments, when the information and data is successfully verified, the control system 114 may be configured to set project specific values for operation of the sorting system 100 described herein (e.g., based on a user input and/or a configuration file stored in a memory 404 of the control system 114, etc.). Example project specific values may include, without limitation, pressure for the seed release air and/or a time period for which the seed release air is applied to the tip 232 of each vacuum nozzles 230 selected to release a seed retained thereby (broadly, seed release time). Project specific values may vary, for example, based on the type of seeds being sorted (e.g., based on the seeds being sorted being corn seeds, etc.). Example project specific values may also include, without limitation, a pick offset. The pick offset generally defines a distance along the Z-axis into which a tip 232 of a vacuum is to be inserted into a removed tray 118 and, more particularly, a well 122 of the tray 118, to extract a seed. The pick offset may be based, for example, on the type of seed being sorted or a characteristic of the wells 122 (e.g., the depth of the wells 122, etc.). Further, the project specific values may vary or be adjusted on an individual seed-by-seed basis, whereby the sorting system 100 may be configured to operate differently depending on the seed.

With continued reference to the run routine, when the information and data is successfully verified and/or when the project specific values are set, the control system 114 is configured to utilize the tray identification data, seed identification data, and seed location data, received from the tray reader 186 as described above, to remove one or more selected trays 118 from the docked cart 116 (e.g., sequentially, non-sequentially, in a predefined order, at random, etc.). In connection therewith, the control system 114 is configured to utilize sorting project selection data to cause the tray subsystem 104 to remove the selected trays 118 from the cart 116, such that each removed tray 118 contains one or more seeds that are to be sorted into the receiving fixture 128.

More particularly, the sorting project selection data defines selected seeds stored in the cart 116 that are to be extracted and deposited (i.e., sorted) into the receiving fixture 128, as well as the particular receptacle of the receiving fixture 128 into which each seed is to be deposited. And, as described above, the seed identification data identifies each seed within each tray 118 of the cart 116, while the seed location data indicates the location of each identified seed with each tray 118. Utilizing the seed identification data, the control system 114, then, is configured to send one or more control signals to the sorting system 100 and, in particular, the tray subsystem 104, to cause the handling assembly 172 to remove one or more selected trays 118, as described above, that include one or more selected seeds defined in the sorting project selection data.

Then during the run routine, when a selected tray 118 is removed from the cart 116 during the run routine, the control system executes a seed extraction and delivery subroutine. In connection therewith, the control system 114 is configured to send one or more control signals to the sorting system 100 and, in particular, the tray subsystem 104 to cause the handling assembly 172 to position the tray 118 along the Y-axis directly under the cup head 210 of the de-lidding subsystem 106. At, or about, the same time, the control system 114 may also be configured, in one or more embodiments, to additionally, or alternatively, send one or more control signals to the de-lidding subsystem 106 to cause the lid translation assembly 202 of the de-lidding subsystem 106 to position the de-lidding assembly 204 (and, thus, the cup head 210) along the Y-axis directly above the removed tray 118. The control system 114 is configured to then send one or more control signals to the de-lidding subsystem 106 to cause the de-lidding assembly to remove the lid 120 from the tray 118 as described above.

Before the control system 114 sends one or more control signals to the sorting system 100 to cause the lid 120 to be removed from the tray 118, the control system 114 may be configured to send one or more control signals to the sorting system 100 (e.g., to the tray presence sensor 182, etc.) to cause the sorting system 100 to send information or data to the control system 114 indicating whether the tray 118 is actually present and positioned (e.g., in connection with the handling assembly 172, etc.) for removal of the lid 120 by the de-lidding subsystem 106. When the information or data indicates that the tray 118 is not present and/or positioned as such, the control system 114 may be configured to detect a fault condition and send one or more control signals to the sorting system 100 to unlock the tray locking mechanism 144 and to cause the presentation unit 406 to alert the user that there was a "tray pull" error and instruct the user to inspect the trays 118 and load the proper trays 118 into the cart 118 with lids 120, as appropriate.

Further, after the sorting system 100 and, in particular, the de-lidding subsystem 106 is operated to remove the lid 120 from the tray 118, the control system 114 may be configured to send one or more control signals to the sorting system 100 (e.g., to the tray presence sensor 182, etc.) to cause the sorting system 100 to send information or data to the control system 114 indicating whether the tray 118 is still present (e.g., in connection with the handling assembly 172, etc.), thereby indicating whether the tray 118 itself was inadvertently lifted by the de-lidding subsystem 106 during de-lidding (e.g., due to the tray not actually including a lid 120, etc.). When the information or data indicates that the tray 118 is not present and/or positioned as such, the control system 114 may be configured to detect a fault condition and send one or more control signals to the sorting system 100 to unlock the tray locking mechanism 144 and alert the user that there was a "de-lid error" error and to cause the presentation unit 406 to instruct the user to retrieve the tray 118, inspect the tray 118, and/or load the proper trays 118 (e.g., with lids 120, etc.) into the cart 116.

When the lid 120 is removed from the removed tray 118, the control system 114 is configured to send one or more control signals to the extraction subsystem 108 to raise the extraction assemblies 220 to an elevation along the Z-axis such that the arrays of vacuum nozzles 230 are disposed above the tray 118 (e.g., as shown in FIG. 13, etc.). The control system 114 is also configured to send one or more control signals to the extraction subsystem 108 and, in particular, the carriage transporters 222 to move the extraction assemblies 220 along the X-axis into the pick zone 190 (e.g., as shown in FIG. 13, etc.).

The control system 114 is further configured to send one or more control signals, as needed, to the extraction subsystem 108 and/or the tray subsystem 104, to cause near and far carriage transporters 222 (relative to the docking station 102) to position the near and far extraction assemblies 220, in coordination with causing the handling assembly 172 to position the removed tray 118, such that at least one predetermined vacuum nozzle 230 of the array of each extraction assembly 220 is in alignment with a predetermined well 122 of the removed tray 118 in the pick zone 190. In connection therewith, the extraction assembly 220 farthest along the Y-axis from the docking station 102 is referred to as the far extraction assembly 220, while the extraction assembly 220 closest along the Y-axis to the docking station 102 is referred to as the near extraction assembly 220. And, this positioning of the near and far extraction assemblies 220 is generally referred to as the extraction start position.

The near and far arrays of vacuum nozzles 230 each include twenty-four vacuum nozzles 230. The vacuum nozzles 230 of the far array are generally disposed to align with an array of up to twenty four wells, while the vacuum nozzles 230 of the example near array are generally disposed to align with a different array of up to twenty four wells. In this manner, the near and far extraction assemblies 220 may be operated along the X-axis, in coordination with operation of the handling assembly 172, to position the tray 118 along the Y-axis, to extract seeds from the different wells 122 in a substantially concurrent fashion.

As shown in FIG. 13, the tray 118 includes five hundred and seventy-six wells 122 and, in particular eighteen staggered rows each having thirty-two wells 122 (matching the arrangement of the vacuum nozzles 230 of the extraction assemblies 220). The control system 114 is configured to cause the near carriage transporter 222 to position the near extraction assembly 220, in coordination with causing the handling assembly 172 to position the removed tray 118, such that vacuum nozzle number four, for example, is in direct alignment along the X- and Y-axis with well number thirty two in the first row of the tray 118. The control system 114 is also configured to cause the far carriage transporter 222 to position the far extraction assembly 220, in coordination with causing the handling assembly 172 to position the removed tray 118, such that overall vacuum nozzle number twenty-nine (i.e., nozzle number five of the far extraction assembly 220), for example, is in direct alignment along the X- and Y-axis with well number one in the second row of the tray 118. In this manner, the control system 114 may be configured in one or more embodiments to send one or more control signals to the extraction assemblies 220 and/or the handling assembly 172 to cause the selected vacuum nozzles 230 to align with seeds identified in the sorting project selection data in their respective well 122, using the extraction start position as a point of reference, in order to extract the seeds identified in the sorting project selection data.

With continued reference to the seed extraction and delivery subroutine, when the near and far arrays of vacuum nozzles 230 and the removed tray 118 are in the extraction start position, the control system 114 is configured to send one or more control signals to the tray subsystem 104 to cause the handling assembly 172 to move the removed tray 118 along the Y-axis to position one or more of the selected seeds, as defined in the sorting project selection data, in alignment with one or both of the near and far nozzle head assemblies 236. In coordination therewith, the control system 114 is also configured to send one or more control signals to the extraction subsystem 108 to cause one or both of the near and far nozzle head assemblies 236 to move along the X-axis, as needed, to locate one or more selected seeds, as defined in the sorting project selection data, directly beneath and in close proximity to one or more tips 232 of one or both of the near or far arrays of vacuum nozzles 230 (broadly, the selected vacuum nozzles). That is, the tip 232 of each selected vacuum nozzle 230 is directly above a corresponding one of the wells 122 of the removed tray 118 and in close proximity to the one or more respective selected seeds, as defined in the sorting project selection data, residing in the corresponding wells 122.

In one or more embodiments, the control system 114 may be alternatively, or additionally, configured to send one or more control signals to the extraction subsystem 108 to cause one or both of the near and far nozzle head assemblies 236 to move along the X-axis to position one or more of the selected seeds, as defined in the sorting project selection data, in alignment with one or both of the near and far nozzle head assemblies 236. The control system may then be configured to send one or more control signals to the tray subsystem to cause the handling assembly 172 to move the removed tray 118 along the rails 170 of the translation assembly, as needed, to position one or more selected seeds, as defined in the sorting project selection data, directly beneath and in close proximity to the selected vacuum nozzles 230. That is, the tip 232 of each selected vacuum nozzle 230 is directly above a corresponding one of the wells 122 and in close proximity to the one or more respective seed residing in each of the corresponding wells 122.

With that said, it should be appreciated that either before, concurrently, or after the control system 114 sends the one or more control signals to cause the tip 232 of each selected vacuum nozzle 230 to be directly above a corresponding well 122 and in close proximity to the one or more respective seeds, as defined in the sorting project selection data, in each of the corresponding wells 122, the control system 114 may be configured to send one or more control signals to the extraction subsystem 108 to lower one or more of the near and far arrays of vacuum nozzles 230 along the Z-axis, such that the tips 232 of the vacuum nozzles 230 are at an elevation near the elevation of the top of the removed tray, yet free to move along the X-axis without contacting the tray 118, wells 122, or seeds therein. Alternatively, or additionally, the control system 114 may be configured to send one or more control signals to the tray subsystem 104 to cause the elevator 194 to raise the removed tray 118 along the Z-axis to an elevation near the elevation of the of the tips 232 of the nozzles 230, such that the top of the tray 118, wells 122, and seeds therein are at an elevation near the elevation of the tips 232 of the nozzles 230, yet free to move along the Y-axis without contacting the tips 232 of the vacuum nozzles 230.

It should also be appreciated that, when one or more selected seeds, as defined in the sorting project selection data, are positioned directly beneath and in close proximity to the tips 232 of the selected vacuum nozzles 230, the control system 114 may be configured in one or more embodiments to send one or more control signals to the tray subsystem 104 to cause the elevator 194 to slightly raise the removed tray 118 such that the tip 232 of each selected vacuum nozzle 230 lightly contacts the seed residing in each of the corresponding wells 122.

With continued reference to the seed extraction and delivery subroutine, after the control system 114 causes the tip 232 of each selected vacuum nozzle 230 to be directly above a corresponding well 122 and in close proximity to the one or more selected seeds, as defined in the sorting project selection data, in each of the corresponding wells 122 (or concurrently therewith), the control system 114 is configured to send one or more control signals to command the selected regulators 226 that correspond to the selected vacuum nozzles 230 to communicate a vacuum pressure to the tip 232 the selected vacuum nozzles 230 corresponding to the one or more seeds selected for extraction, as defined in the sorting project selection data. In this manner, one, some or all of the vacuum nozzles 230 may be activated by the control system 114 (i.e., one, some or all of the nozzles 230 may be provided with a vacuum pressure at the respective tip 232, depending on the number of corresponding seeds that are to be extracted). Although a single nozzle 230 can be activated to extract a single seed, extraction of the one or more seeds is generally described herein in the plurality.

When the selected vacuum nozzles 230 are activated by the control system 114, the activated vacuum nozzles 230 extract the corresponding seeds from the corresponding wells 122 of the removed tray 118. That is, the provided vacuum draws, or sucks, the corresponding seeds into contact with the tip 232 of the activated vacuum nozzles 230, such that the corresponding seeds are free from the respective wells 122 and slightly above a top surface of the removed tray 118. The regulators 226 under command of the control system 114, then, are operable such that the vacuum pressure provided at the tip 232 of each activated vacuum nozzle 230 is modulated to exert sufficient force to extract the respective seed without damaging the respective seed. The extracted seeds are retained, or held, in contact with the respective nozzle tips 232 until the seeds are deposited into the selected receptacles, as described in greater below.

In the embodiments where the control system 114 causes the removed tray 118 to be raised slightly and/or the vacuum nozzles 230 to be lowered slightly, such that the selected seeds are in light contact with the tips 232 of the selected vacuum nozzles 230 prior to activation of the selected nozzles 230, after the selected vacuum nozzles 230 are activated, the control system 114 is configured to send one or more control signals to cause the removed tray 118 to be lowered slightly and/or the arrays of vacuum nozzles 230 to be raised slightly, such that the corresponding seeds are extracted from the removed tray 118, whereby the corresponding seeds are free from the respective wells 122 and slightly above the top surface of the removed tray 118.

After the selected vacuum nozzles 230 are activated and the selected seeds are extracted, the control system 114 may be configured to send one or more control signals to raise the arrays of the vacuum nozzles 230 to an elevation along the Z-axis (broadly, a transport elevation), such that arrays of vacuum nozzles 230 are free to be transported along the X-axis from the pick zone 190 to the drop zone 228, without interference (e.g., with components of the verification subsystem 110 and the funnel assemblies 130, etc.).

After the selected seeds have been extracted, and the arrays of vacuum nozzles 230 have been further raised to a transport elevation, the control system 114 may be configured to send one or more control signals the extraction subsystem 108 to cause one or both of the carriage transporters 222 to transport one or both of the carriages 234 and, thus, one or both of the arrays of vacuum nozzles 230 (including the extracted seeds retained on the respective tips of the activated vacuum nozzles 230) through the verification subsystem 110. More specifically, the control system 114 is configured to cause one or both of the carriage transporters to move one or both of the arrays of vacuum nozzles 230, and the extracted seeds retained by the tips of the activated vacuum nozzles 230, to a position directly above the imaging zone 304 of the verification subsystem 110, which is located between the tray subsystem 104 and collection subsystem 112.

When one or both of the arrays of vacuum nozzles 230 are at a position directly above the imaging zone 304, the control system 114 executes a verification subroutine. In connection therewith, the control system 114 may be configured to send one or more control signals to the verification subsystem 110 to activate the light sources for each array of vacuum nozzles above the imaging zone 304, such that the tips 232 of the vacuum nozzle 230 in each array above the imaging zone 304 (and any seeds retained therein) are illuminated. The control system 114, then, is configured to send one or more control signals to the verification subsystem 110 to cause the digital imaging device 308 for each illuminated array of vacuum nozzles 230 to capture digital image data for the tips 232 of the illuminated vacuum nozzle 230 (and any seeds retained therein) and transmit the digital image data to the control system 114. When the control system 114 receives the digital image data, the control system 114 is configured to analyze the digital image data and determine whether the tip 232 of each activated vacuum nozzle 230 includes a seed and, potentially, determine one or more characteristics and/or traits for the seed.

In the event that the control system 114 determines, based on the digital image data, that a tip 232 of one or more activated vacuum nozzles does not retain a seed (i.e., that the seed was "missed") the control system 114 is configured to continue the seed extraction and delivery subroutine, as described in greater detail below, with respect to the vacuum nozzles 230 that are actually retaining seeds, as determined by the verification subroutine. Then, subsequently, the control system 114 is configured to send one or more control signals to the sorting system 100 to cause the sorting system

100 to reattempt extraction of the "missed" seed(s) in a manner consistent with the above. It should be appreciated that the control system 114 may cause the sorting system to repeat the reattempted extraction of the "missed" seed any desired number of times (e.g., two times, three times, etc.). When the seed is not extracted, as determined by the verification subroutine, after the desired number of reattempts, the sorting system 100 may then stop attempting to extract the "missed" seed.

With continued reference to the extraction and delivery subroutine, after executing the verification subroutine, the control system 114 is configured to continue with the extraction and delivery subroutine to cause the extraction subsystem 108 to deliver the one or more seeds retained by the tips 232 of the activated nozzles 230 to one or more selected receptacles of the receiving fixture 128. In connection therewith, the control system 114 is configured to coordinate operation of the extraction subsystem 108 and the collection subsystem 112 to selectively deposit the extracted seeds into one or more of the receptacles of the receiving fixture via the funnel assembly 130.

More particularly, the control system 114 is configured to utilize receptacle data (e.g., received and assigned by the control system 114 prior in the run routine as described above, etc.) and/or the tray identification and/or seed identification data acquired by the tray reader 186 to deposit each of the extracted seeds into selected one or more receptacles of the receiving fixture 128. For example, extracted seeds may be deposited into the selected one or more receptacles such that seeds having the same or similar attributes (e.g., characteristics and/or traits such as size, shape, color, composition, quality, weight, genetic traits, etc.) are deposited into the same receptacle (e.g., bulk containers, packets, or envelopes 272, etc.) or the same trays 270 containing different receptacles (e.g., wells 274, etc.). In addition, in one or more embodiments, the control system 114 may be configured to catalogue, for each receptacle and/or tray 270, the identity and/or characteristics of each seed deposited therein, thereby providing an index of seeds sorted into the receiving fixture 128.

With that said, to deposit the extracted seeds into the receptacles of the receiving fixture 128 via the funnel fixtures 296 of the funnel assembly 130, the control system 114 controls and coordinate the operation of the extraction subsystem 108 and the collection subsystem 112 (potentially, in coordination with the gating mechanisms 301 of the funnels of the funnel fixtures 296). In connection therewith, the control system 114 is generally configured to send one or more control signals to the extraction subsystem 108 to cause one or both of the near and far carriage transporters 222 to transport one or both of the near and far carriages 234 and, thus, one or both of the near and far arrays of vacuum nozzles 230 (including the extracted seeds verifiably retained on the respective tips of the activated vacuum nozzles 230), from the position above the imaging zone 304 of the verification subsystem 110 to the drop zone 228 of the collection subsystem 112, such that the tips 232 of one or more vacuum nozzles 230 of one or both of near and far arrays are positioned at, or near, a location directly above one or more funnels 298, 300 of the corresponding funnel fixture 296. Before, concurrently, or thereafter, the control system 114 may be configured to, as necessary, send one or more control signals to the extraction subsystem 108 to lower one or both of the near and far arrays of vacuum nozzles, such that the tips 232 of the vacuum nozzles 230 are at an elevation in close proximity to the upper surface of the near and/or far funnel fixtures 296.

At, or around, the same time, the control system 114 may be configured to, as necessary, send one or more control signals to the collection subsystem 112 to cause the receiving fixture 128 to be positioned along the Y-axis, such that the receiving fixture 128 is positioned in the drop zone 228 of the collection subsystem 112. As described in more detail below, the control system 114 is generally configured to then send one or more control signals to the extraction subsystem 108 to cause the vacuum provided to the activated vacuum nozzles 230 retaining the selected seeds to be terminated, in coordinating with operation of the gating mechanism(s) 301 of one or more funnels of the corresponding funnel fixture 296, thereby causing the selected seeds to be released into, released from, and/or retained by one or more of the funnels 298, 300 of the corresponding funnel fixture 296.

More specifically, utilizing known, fixed locations of the vacuum nozzles 230 within the array of the nozzle head plate 244, together with the known, fixed locations of the funnels 298, 300 and the receptacle data corresponding to the receiving fixture 128 (e.g., including a location (e.g., Cartesian coordinates, etc.) for each receptacle and/or tray 270 of the receiving fixture 128, etc.), the control system 114 may be configured to, as necessary, send one or more control signals to the extraction subsystem 108 and/or the collection subsystem 112 to coordinate operation of the extraction subsystem 108 and/or the collection subsystem to position the tips 232 of one or more activated vacuum nozzles 230 in alignment with (i.e., directly above) one or more selected funnels 298, 300 of the funnel fixture 296 and/or to position one or more selected receptacles of the receiving fixture in alignment with (i.e., directly beneath) the one or more selected funnels 298, 300, such that one or more seeds released by the one or more activated vacuum nozzles 230 may be directed into the one or more selected receptacles of the receiving fixture (e.g., upon release or in connection with a particular staging facilitated by coordinated operation of the gating mechanisms 301 of the selected funnels as described in greater detail above, etc.).

With that said, the control system 114 is configured to send one or more control signals to the collection subsystem 112 to cause the translation assembly 264 of the collection subsystem 112 to move the receiving fixture along the Y-axis, as needed, to position one or more selected wells or bulk containers 272 in alignment (i.e., directly beneath) with the bottoms of one or more selected bulk container funnels 300 and/or one or more selected well funnels 298. In one or more embodiments, the bottom opening of each funnel 298, 300 may be sized to be slightly smaller than the outer dimensions of the wells 274 and/or the orifices 290 of the bulk panels 284 of the receiving fixture 128, such that one or more seeds released from the funnels may be deposited directly into the selected wells 274 and/or bulk containers 272.

Concurrently therewith, before, or after the receiving fixture 128 is aligned with the funnel fixture as described above, the control system 114 is configured to send one or more control signals to the extraction subsystem 108 to cause the nozzle head plate 244 and, in particular, the array of vacuum nozzles 230 to move along the X-axis, as needed, to locate the tips 232 of selected activated vacuum nozzles 230 in the array in alignment (i.e., directly above) and in close proximity to the top opening of the one or more selected well funnels 298 and/or the one or more selected bulk funnels 300 of the funnel fixture 296. In one or more embodiments, the top opening of each funnel 298, 300 may be sized to be slightly larger than the outer dimensions of the array of vacuum nozzles and/or the nozzle head plate 244, such that the tip 232 of each selected activated nozzle 230 in the array is positioned directly above and in close proximity to the top opening of the selected funnel top opening.

When one or more selected activated vacuum nozzles 230 in the array are positioned directly above one or more selected funnels 298, 300, the control system 114 is configured to send one or more control signals to the extraction assembly 220 to cause the one or more selected activated nozzles 230 to deactivate (i.e., terminate the vacuum pressure supplied to selected activated nozzles 230), thereby releasing selected seed(s) retained by the tips 232 of the selected activated vacuum nozzles 230 into the top opening of the selected funnel(s) 298, 300. In one or more embodiments, when the vacuum pressure is terminated for the selected activated nozzles 230, the control system 114 may be configured to send one or more control signals to the extraction assembly 220 to cause the pneumatic supply assembly 224 to supply seed release air (e.g., a pulsed positive air pressure, etc.) to the tips 232 of the selected activated nozzles, thereby forcibly releasing the selected seed(s) into the top opening of the selected funnel(s) 298, 300.

In one or more embodiments, the control system 114 is configured, as needed, to send one or more control signals to the gating mechanisms 301 of the selected funnels, to coordinate operation of the gating mechanisms 301 of the selected funnels. For example, when one or more selected receptacles is not in alignment along the Y-axis with one or more selected funnels from which selected seed(s) are to be deposited therein, the control system 114 may be configured to, as needed, send one or more control signals to the gating mechanisms 301 of the selected funnel(s) to cause the gates of the selected funnel(s) to close (or remain closed), thereby allowing the selected seed(s) released by the selected activated nozzle(s) 230 to be staged by the gating mechanisms 301 (e.g., until the selected receptacles are in alignment with the selected funnel, etc.). What's more, where one or more other selected activated vacuum nozzles 230 retain one or more other selected objects intended for a different selected receptacle (e.g., in the same row, etc.), the control system 114 may be configured to send one or more control signals the extraction subsystem 108 and collection subsystem to cause the above-described operations to generally be repeated with respect to aligning the other selected activated vacuum nozzles 230 with the top openings of the selected funnel(s) and coordinating operation of the gating mechanism(s) 301 of the selected funnel(s) to retain the other selected seed(s) when released into the selected funnel(s) by the other selected activated vacuum nozzles 230.

With that said and based on the disclosure herein, it will be appreciated that that the selected activated vacuum nozzles 230 and the receiving fixture 128 may be positioned to align with various funnels 298, 300 of the funnel fixture 296 in a variety of sequences, and the gating mechanisms 301 of the funnels may be operated in a variety of sequences, in order to efficiently deliver all of the selected seeds extracted from the removed tray 118 into the intended receptacles of the receiving fixture 128.

In any event, when the selected receptacles into which the selected seeds released by the selected vacuum nozzles 230 are intended to be deposited are in alignment with the selected funnels 298, 300 into which the selected seeds have been released and/or in which the selected objects have been retained, the control system 114 is configured to cause the selected seeds to be funneled and/or deposited into the selected receptacles, such that, for example, seeds having the same or similar attributes (e.g., characteristics and/or traits such as size, shape, color, composition, quality, weight, genetic traits, etc.) are deposited into the same tray 270 or the same bulk container 272. However, it should be appreciated that each tray and/or bulk container need not necessary include seeds having the same or similar attributes (e.g., where a particular mix of seeds is intended for a particular tray 270 or bulk container 272, etc.).

The process of releasing and depositing objects into the receiving fixture 128 is then repeated with respect to one or more other selected activated vacuum nozzles 230 and/or one or more other selected receptacles of the receiving fixture 128, until all the extracted seeds have been deposited into the respective selected receptacles. The control system 114 may then be configured to send one or more control signals to the extraction subsystem 108 to cause the array of vacuum nozzles 230 to move back to a position above the pick zone 190 of the tray subsystem 104. Then, if sorting projection selection data defines one or more other subsequent seeds for extraction from the removed tray 118, the control system 114 is configured to send one or more control signals to the sorting system 100 to cause the subsequent selected seeds to be extracted and deposited into selected receptacles of the receiving fixture via selected funnels 298, 300 of the receiving fixture in a manner consistent with that described above.

Once all the selected seeds have been extracted from the removed tray 118 and deposited into the receiving fixture 128, as defined by sorting project selection data, the control system is configured to send one or more control signals to the tray subsystem 104, as described above, to place the removed tray 118 back into the cart 116. In one or more embodiments, if the tray 118 still includes one or more seeds in the wells 122 thereof, the control system 114 is configured to send one or more control signals to the de-lidding subsystem 106 and/or tray subsystem 104, consistent with the above, to replace the lid 120 on the tray 118 before the tray 118 is placed back into the cart 116.

Thereafter, if needed, based on the sorting project selection data, the tray identification data, and/or the seed identification data, the control system 114 is configured to send one or more control signals to the tray subsystem 104 to cause a subsequent tray 118 (containing one or more further seeds defined in the sorting project selection data) to be removed from the cart 116. The control system 114 is then configured to send one or more control signals to the sorting system to cause selected seeds to be extracted and deposited into selected receptacles of the receiving fixture, as described above. This process is generally repeated until the sorting system 100 has extracted and deposited (i.e., sorted), all the selected seeds defined in the sorting project selection data (e.g., by removing subsequent trays including other seeds, etc.).

In one or more embodiments, the control system 114 may be configured to determine whether the trays 270 and bulk containers 272 of the receiving fixture 128 have received all of the seeds intended for receiving fixture 128 (i.e., whether the receiving fixture 128 is complete). When the receiving fixture 128 is complete, the control system 114 may be configured to cause the presentation unit 406 to display an alert message to reload the receiving fixture 128 with new trays 270 and/or bulk containers 272 or, potentially, to reload the collection subsystem 112 with a new receiving fixture 128, before the further seeds are extracted from a subsequent tray 118.

In one or more embodiments, the control system 114 may be configured to continue with the extraction and delivery subroutine until each and every seed has been extracted from the trays 118 of the cart 116. In connection therewith, the control system may be configured, as needed, to display the alert message to reload the receiving fixture 128 with new trays 270 and/or bulk containers 272 or, potentially, to reload the collection subsystem 112 with a new receiving fixture 128, to accommodate the seeds stored in the various trays 118 of the cart 116.

FIG. 17 illustrates an architecture 500 in which multiple sorting systems (including the sorting system 100) may be implemented in communication (e.g., in a network arrangement, etc.). In the architecture 500, the control system 114 of the sorting system 100 may again be implemented in the computing device 400 (whereby the computing device 400 may be representative of the control system 114, whereby the control system 114 is consistent with the computing device 400, etc.), and is in further combination with a network switch 412, a relay 414, and a database 416. Here, each of the network switch 412, the relay 414, and the database 416 may be considered and/or implemented in a computing device consistent with the computing device 400 (as explained in more detail with reference to FIG. 16). In connection therewith, then, the control system 114 (as implemented in the computing device 400, for example) is configured to communicate (e.g., via the network interface 410, etc.) with the relay 414 via the network switch 412 to which the relay 414 is connected. The control system of one or more other sorting systems 600 (where each of the other sorting system(s) 600 may be substantially the same as the control system 100) may then also be in communication with the relay 414, via the network switch 414 (such that the relay 414 may be in communication with multiple different sorting systems in the architecture 500, via the network switch 412).

The example relay 114 includes or is in communication with the database 416 (e.g., a database local to the relay 414, etc.), and which is configured to issue control signals (e.g., run instructions from the database 416, etc.) to the control system 114 of the sorting system 100, and to the other control system of any of the other sorting systems 600 coupled thereto, in order to cause the sorting system 100 (and the other sorting systems 600) to operate as described herein (e.g., in response to scanning a tray 118 at the respective sorting system, etc.). Then, when each sorting system is in operation (e.g., to extract and deposit objects from a tray 118 into a receiving fixture 128, etc.), each sorting system and, in particular, the corresponding control system of the sorting system, may be configured to communicate data (e.g., run or state data (e.g., an identification of the objects that have been processed; an identification of the objects that have remain in trays; imaging results (e.g., captured data from the imaging devices of extraction, verification, and collection subsystems 108, 110, and 112; results of the analyses based on the data captured from the imaging devices herein; etc.); etc.), etc.) to the relay 414. The data communicated to the relay 414 from each sorting system may then be stored by the relay 414, in the database 416. The relay 414 is then configured to communicate data stored in the database 416 (e.g., the run or state data, etc.) to the appropriate other sorting system(s) in the architecture 500 with regard to status and/or further processing of objects in a given tray and/or in a given cart. In this manner, the data stored in the database 416 and, in particular, the run or state data, is accessible to the control system of each of the sorting systems in the architecture 500 in communication with the relay 414, regardless of whether the data originated from the sorting system actually accessing the data or another sorting system, or otherwise.

In this manner, for example, the objects in the trays 118 of the cart 116 docked with the sorting system 100 may subsequently be sorted by another sorting system 600 in the architecture 500. In connection therewith, state data for the given sorting project (e.g., representing the status of the sorting project at the time the cart 116 was removed from the sorting system 100, etc.) may be stored by the corresponding control system 114 at a location accessible by the other sorting systems 600 of the architecture and, in particular, in the database 416, such that each sorting system has access to the state that the sorting project (or cart 116) was in when paused, ended, etc., regardless of the particular one of the sorting systems acting on the trays 118 of the cart 116 when paused. Accordingly, a sorting project for a cart 116 may be started on one sorting system and then completed on another sorting system.

In one or more embodiments, the relay 414 may be configured to communicate with a network (e.g., a network to which the relay 414 is connected, etc.) in order to update the database 416 with data from a central database connected to the network (e.g., to update the database 416 with offloading orders (e.g., orders for sorting projects that have been completed using the sorting systems, etc.), etc.). The relay 416 may also be configured to send results of sorting projects completed using the sorting systems to the central database.

With that said, the cart 116 for a project may also be removed from the docking station 102 of the sorting system 100, and sorting for the seeds in the trays 118 of the cart 116 may be finished at a later time, using either the same sorting system 100 or a different sorting system 100 in the architecture 500.

Further, as can be appreciated, by way of the above routines, a user (or operator) of the sorting system 100 may be provided with particular data regarding the status of the system 100 and the status of any operations of the system 100. What's more, when the system 100 is operating to sort seeds from the trays 118 in the cart 116, the system 100 is configured, via the control system 114, to provide time estimates (or other timers or countdowns) to the user for completion of each of the different sorting operations and/or for completion of all sorting operations. In this way, the operation of the system 100 is substantially automated, with user intervention required only when alert messages are issued, etc.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups thereof, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" and the phrase "at least one of" includes any and all combinations of one or more of the associated listed items.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A seed sorting system comprising:

a tray subsystem configured to remove a tray from a cart;

a docking station configured to retain the cart in the seed sorting system, to thereby allow the tray subsystem to remove the tray from the cart, the docking station including:

at least one sensor configured to align the cart with the docking station;

at least one locking mechanism configured to retain the cart in the seed sorting system, the at least one locking mechanism including multiple electromagnets each comprising a radio frequency identification (RFID) tag configured to align the electromagnets with corresponding electromagnets of the cart; and at least one sensor configured to identify a position of the tray in the cart;

a de-lidding subsystem configured to remove a lid from the tray, after the tray is removed from the cart;

an extraction subsystem including an array of seed retention devices configured to extract one or more seeds from the tray, after the lid is removed from the tray;

a collection subsystem including a funnel assembly and a receiving fixture, the funnel assembly fixedly mounted to the sorting system apart from the receiving fixture, the funnel assembly configured to receive the one or more seeds from the array of seed retention devices of the extraction subsystem;

wherein the funnel assembly includes multiple funnels arranged along a length of the funnel assembly for receiving the one or more seeds from the array of seed retention devices, and wherein the extraction subsystem is operable to move the array of seed retention devices a distance spanning at least the length of the funnel assembly so that the array of seed retention devices can access each of the multiple funnels;

wherein a width of the funnel assembly is equal to a width of the array of seed retention devices; and a translation assembly configured to move the receiving fixture relative to the funnel assembly and align each of a plurality of receptacles of the receiving fixture with a corresponding one of the funnels of the funnel assembly, to thereby direct the one or more seeds received by the funnel assembly into at least one of the plurality of receptacles of the receiving fixture.

2. The seed sorting system of claim 1, wherein the tray subsystem is further configured to return the tray to the cart after the one or more seeds are extracted from the tray; and wherein the de-lidding subsystem is further configured to:

store the lid removed from the tray on the cart and independent of the tray; and recouple the lid removed from the tray after the one or more seeds are extracted from the tray and before the tray is returned to the cart.

3. The seed sorting system of claim 1, further comprising a verification subsystem adjacent the extraction subsystem, the verification subsystem configured to verify that the one or more seeds have been extracted from the tray by the extraction subsystem.

4. The seed sorting system of claim 1, wherein the tray subsystem includes a translation assembly and an elevator assembly;

wherein the translation assembly is configured to:

remove the tray from the cart;

position the tray for removal of the lid by the de-lidding subsystem;

position the tray for extraction of the one or more seeds from the tray by the extraction subsystem; and return the tray to the cart when the one or more seeds have been extracted from the tray by the extraction subsystem; and wherein the elevator assembly is configured to:

raise or lower the translation assembly for removal of the tray from the cart by the translation assembly; and/or raise or lower the translation assembly for positioning the tray for removal of the lid by the de-lidding subsystem and for extraction of the one or more seeds from the tray by the extraction subsystem.

5. The seed sorting system of claim 4, wherein the tray subsystem further includes at least one imaging device configured to capture at least one image of the tray prior to the tray being returned to the cart, in order to verify that the one or more seeds were extracted from the tray.

6. The seed sorting system of claim 1, wherein the de-lidding subsystem includes a de-lidding assembly and a translation assembly;

wherein the de-lidding assembly is slidingly mounted to the translation assembly and includes:

at least one lid retention device;

a pneumatic supply assembly configured to provide a vacuum from a vacuum source to the at least one lid retention device for use in removing the lid from the tray; and a linear actuator configured to raise and/or lower the at least one lid retention device; and wherein the translation assembly is configured to move the de-lidding assembly between a position above the translation assembly and a position above the cart.

7. The seed sorting system of claim 1, wherein the extraction subsystem includes a transfer assembly and an extraction assembly;

wherein the extraction assembly is movably mounted to the transfer assembly, and wherein the extraction assembly includes:

the array of seed retention devices;

a pneumatic supply assembly including at least one regulator configured to:

provide a vacuum from a vacuum source to the seed retention devices, in order to extract the one or more seeds from the tray; and release the one or more seeds extracted from the tray into the funnel assembly of the collection subsystem; and at least one plunger configured to contact the tray and inhibit movement of the tray as the one or more seeds are extracted from the tray by the seed retention devices via the vacuum;

wherein the extraction assembly is configured to move, via the transfer assembly, between a position above the tray subsystem and a position above the funnel assembly of the collection subsystem.

8. The seed sorting system of claim 7, further comprising a verification subsystem adjacent the extraction subsystem, the verification subsystem configured to capture image data of the at least one seed retention device, in order to verify that the one or more seeds extracted from the tray are correct.

9. The seed sorting system of claim 1, further comprising a control system configured to send one or more control signals to the translation assembly to move the receiving fixture relative to the funnel assembly and align the plurality of receptacles of the receiving fixture with the funnels of the funnel assembly.

10. The seed sorting system of claim 1, wherein the plurality of receptacles includes a plurality of trays and a plurality of bulk containers, each of the plurality of trays including a plurality of wells.

11. The seed sorting system of claim 1, wherein each of the multiple funnels includes a gating mechanism structured and operable to stage delivery of the one or more seeds received by the funnel assembly into the at least one receptacle.

12. The seed sorting system of claim 11, wherein the plurality of receptacles includes a tray having a plurality of wells and a plurality of bulk containers; and wherein the multiple funnels include at least one well funnel and at least one bulk container funnel, the at least one well funnel structured and disposed to align with a selected one of the wells of the tray and the at least one bulk container funnel structured and disposed to align with one of the bulk containers.

13. The seed sorting system of claim 1, wherein the tray subsystem includes a handling bar configured to engage the tray to remove the tray from the cart and at least one sensor configured to detect a position of the handling bar relative to the tray.

14. An automated method for sorting seeds using a seed sorting system, the method comprising:

removing at least one tray of seeds from a cart including multiple trays, at the seed sorting system;

removing, by a de-lidding assembly, a lid from the at least one tray, after the at least one tray is removed from the cart, and positioning, by the de-lidding assembly, the removed lid on the cart away from the removed at least one tray;

extracting one or more seeds from the at least one tray and transporting the one or more seeds to at least one funnel assembly fixedly mounted in the seed sorting system;

moving, by an automated translation assembly of the seed sorting system, a seed receiving fixture relative to the at least one funnel assembly and aligning the seed receiving fixture with the at least one funnel assembly based on one or more control signals provided by a control system of the seed sorting system;

receiving the one or more seeds into the at least one funnel assembly and directing the one or more seeds, by the at least one funnel assembly, to the seed receiving fixture.

15. The method of claim 14, further comprising returning the lid, by the de-lidding assembly, from the cart to the at least one tray, after the one or more seeds are extracted from the at least one tray, and returning the at least one tray and lid to the cart.

16. The method of claim 14, wherein removing the lid from the at least one tray includes removing, by at least one lid retention device, the lid from the at least one tray.

17. The method of claim 14, wherein the method further comprises:

capturing image data of the at least one seed retention device; and based on the image data, verifying that that the one or more seeds extracted from the at least one tray are correct.

18. The method of claim 14, further comprising:

aligning, using at least one first sensor, the cart with a docking station of the seed sorting system;

retaining the cart in a docking station of the seed sorting system, by at least one locking mechanism; and identifying, using at least one second sensor, a position of the at least one tray in the cart prior to removing the at least one tray of seeds from the cart.

19. The method of claim 14, further comprising:

capturing, by at least one imaging device, image data of the at least one tray; and verifying, based on the captured image data, that the one or more seeds have been extracted from the at least one tray.

20. The method of claim 14, further comprising actuating a gating mechanism of each of multiple funnels of the at least one funnel assembly to stage delivery of the one or more seeds received by the at least one funnel assembly into selected receptacles of the seed receiving fixture.

21. A seed sorting system comprising:

a tray subsystem configured to remove a tray from a cart;

a de-lidding subsystem configured to remove a lid from the tray, after the tray is removed from the cart, and store the lid removed from the tray on the cart and independent of the tray;

an extraction subsystem including an array of seed retention devices configured to extract one or more seeds from the tray, after the lid is removed from the tray;

a collection subsystem including a funnel assembly and a receiving fixture, the funnel assembly fixedly mounted to the sorting system apart from the receiving fixture, the funnel assembly configured to receive the one or more seeds from the array of seed retention devices of the extraction subsystem;

wherein the funnel assembly includes multiple funnels arranged along a length of the funnel assembly for receiving the one or more seeds from the array of seed retention devices, and wherein the extraction subsystem is operable to move the array of seed retention devices a distance spanning at least the length of the funnel assembly so that the array of seed retention devices can access each of the multiple funnels;

a translation assembly configured to move the receiving fixture relative to the funnel assembly and align each of a plurality of receptacles of the receiving fixture with a corresponding one of the funnels of the funnel assembly, to thereby direct the one or more seeds received by the funnel assembly into at least one of the plurality of receptacles of the receiving fixture;

wherein the tray subsystem is further configured to return the tray to the cart after the one or more seeds are extracted from the tray; and wherein the de-lidding subsystem is further configured to recouple, to the tray, the lid removed from the tray, after the one or more seeds are extracted from the tray and before the tray is returned to the cart.

22. A seed sorting system comprising:

a tray subsystem configured to remove a tray from a cart;

a de-lidding subsystem configured to remove a lid from the tray, after the tray is removed from the cart, the de-lidding subsystem including a translation assembly and a de-lidding assembly slidingly mounted to the translation assembly, the de-lidding assembly including:

at least one lid retention device;

a pneumatic supply assembly configured to provide a vacuum from a vacuum source to the at least one lid retention device for use in removing the lid from the tray; and a linear actuator configured to raise and/or lower the at least one lid retention device; and wherein the translation assembly is configured to move the de-lidding assembly between a position above the translation assembly and a position above the cart;

an extraction subsystem including an array of seed retention devices configured to extract one or more seeds from the tray, after the lid is removed from the tray;

a collection subsystem including a funnel assembly and a receiving fixture, the funnel assembly fixedly mounted to the sorting system apart from the receiving fixture, the funnel assembly configured to receive the one or more seeds from the array of seed retention devices of the extraction subsystem;

wherein the funnel assembly includes multiple funnels arranged along a length of the funnel assembly for receiving the one or more seeds from the array of seed retention devices, and wherein the extraction subsystem is operable to move the array of seed retention devices a distance spanning at least the length of the funnel assembly so that the array of seed retention devices can access each of the multiple funnels;

a translation assembly configured to move the receiving fixture relative to the funnel assembly and align each of a plurality of receptacles of the receiving fixture with a corresponding one of the funnels of the funnel assembly, to thereby direct the one or more seeds received by the funnel assembly into at least one of the plurality of receptacles of the receiving fixture.

23. A seed sorting system comprising:

a tray subsystem configured to remove a tray from a cart;

a de-lidding subsystem configured to remove a lid from the tray, after the tray is removed from the cart;

an extraction subsystem including a transfer assembly and an extraction assembly movably mounted to the transfer assembly, the extraction assembly including:

an array of seed retention devices configured to extract one or more seeds from the tray after the lid is removed from the tray;

a pneumatic supply assembly including at least one regulator configured to:

provide a vacuum from a vacuum source to the seed retention devices, in order to extract the one or more seeds from the tray; and release the one or more seeds extracted from the tray into the funnel assembly of the collection subsystem; and at least one plunger configured to contact the tray and inhibit movement of the tray as the one or more seeds are extracted from the tray by the seed retention devices via the vacuum;

a collection subsystem including a funnel assembly and a receiving fixture, the funnel assembly fixedly mounted to the sorting system apart from the receiving fixture, the funnel assembly configured to receive the one or more seeds from the array of seed retention devices of the extraction subsystem;

wherein the funnel assembly includes multiple funnels arranged along a length of the funnel assembly for receiving the one or more seeds from the array of seed retention devices, and wherein the extraction subsystem is operable to move the array of seed retention devices a distance spanning at least the length of the funnel assembly so that the array of seed retention devices can access each of the multiple funnels;

wherein the extraction assembly of the extraction subsystem is configured to move, via the transfer assembly, between a position above the tray subsystem and a position above the funnel assembly; and a translation assembly configured to move the receiving fixture relative to the funnel assembly and align each of a plurality of receptacles of the receiving fixture with a corresponding one of the funnels of the funnel assembly, to thereby direct the one or more seeds received by the funnel assembly into at least one of the plurality of receptacles of the receiving fixture.

* * * * *